US008270048B2

(12) United States Patent
Nishikawa

(10) Patent No.: US 8,270,048 B2
(45) Date of Patent: Sep. 18, 2012

(54) METHOD OF GENERATING COLOR SEPARATION DATA AND IMAGE PROCESSING APPARATUS

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1179 days.

(21) Appl. No.: 10/913,543

(22) Filed: Aug. 9, 2004

(65) Prior Publication Data

US 2005/0052670 A1 Mar. 10, 2005

(30) Foreign Application Priority Data

Aug. 11, 2003 (JP) ................................. 2003-291871

(51) Int. Cl.
*H04N 1/46* (2006.01)
*H04N 1/60* (2006.01)
*G03F 3/08* (2006.01)

(52) U.S. Cl. ......... 358/515; 358/1.9; 358/500; 358/518; 358/520; 382/167; 382/264

(58) Field of Classification Search .................. 358/500, 358/1.9, 520, 515; 382/167
See application file for complete search history.

(56) References Cited

U.S. PATENT DOCUMENTS

| 5,650,942 A * | 7/1997 | Granger .................... 358/500 |
| 5,960,161 A * | 9/1999 | Bloomberg et al. ........... 358/1.9 |
| 5,988,791 A | 11/1999 | Miyashita et al. .............. 347/43 |
| 6,270,189 B1 | 8/2001 | Miyashita et al. .............. 347/43 |
| 6,934,054 B1 * | 8/2005 | Hilsdorf et al. ................ 358/1.9 |
| 6,956,672 B1 * | 10/2005 | Huang et al. ................... 358/1.9 |
| 7,088,479 B2 * | 8/2006 | Fujita ............................ 358/536 |
| 7,103,216 B2 * | 9/2006 | Okamoto ...................... 382/167 |
| 7,116,441 B1 * | 10/2006 | Matsuoka ..................... 358/1.9 |
| 7,190,487 B2 * | 3/2007 | Dalrymple et al. ........... 358/1.9 |
| 7,336,392 B2 * | 2/2008 | Kakutani ...................... 358/1.9 |
| 2001/0024302 A1 * | 9/2001 | Fujita ............................ 358/536 |
| 2003/0081831 A1 * | 5/2003 | Fukao et al. .................. 382/167 |
| 2003/0098986 A1 * | 5/2003 | Pop ................................ 358/1.9 |
| 2003/0234943 A1 * | 12/2003 | Van Bael ....................... 358/1.9 |

FOREIGN PATENT DOCUMENTS

| JP | 8-85219 A | 4/1996 |
| JP | 2000-32284 A | 1/2000 |

* cited by examiner

Primary Examiner — Akwasi M Sarpong
(74) Attorney, Agent, or Firm — Fitzpatrick, Cella, Harper & Scinto

(57) ABSTRACT

The present invention extends an entire reproducible gamut by generating color separation data effectively utilizing the particularly high saturation and lightness of a particular color ink. Color separation data uses three types of inks including a particular color ink red and basic color inks yellow and magenta at the maximum saturation point of a hue R. On a low-lightness side with respect to the maximum saturation point, a reproducible color space can be extended by adding a cyan ink or the like to the above inks. In a high-lightness are, the reproducible color space can be extended by using the particular color ink red. Further, the entire gamut of a low-lightness side of this hue can be extended.

29 Claims, 74 Drawing Sheets

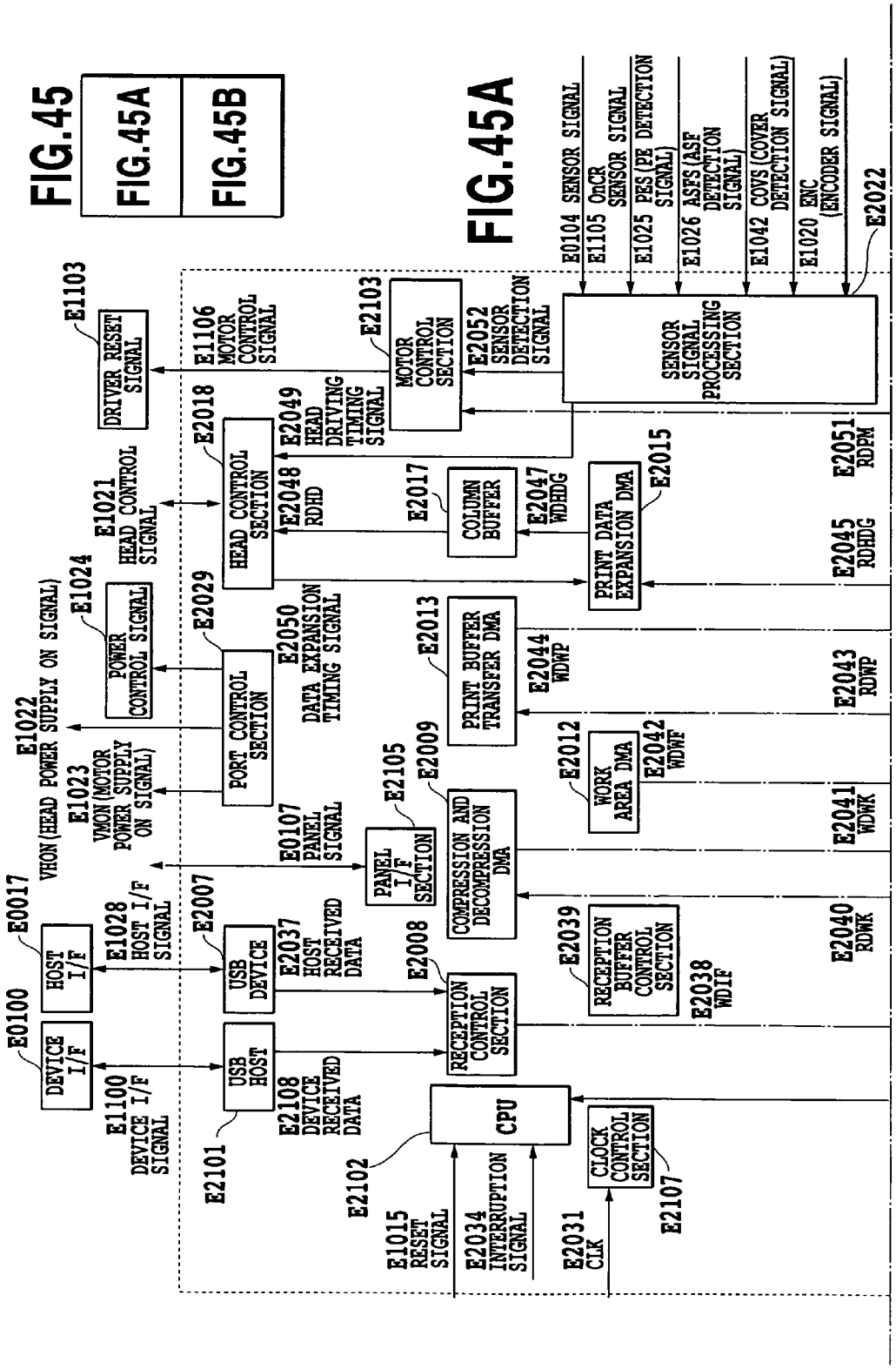

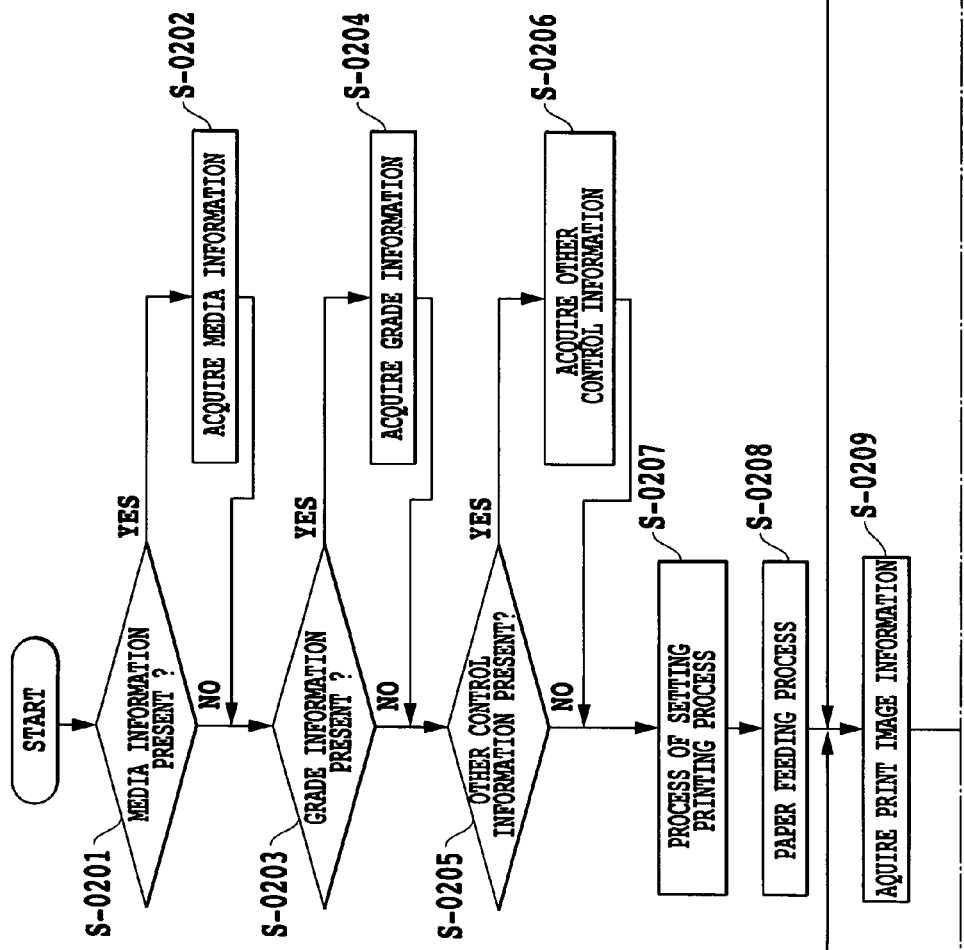

METHOD OF GENERATING COLOR SEPARATION DATA AND IMAGE PROCESSING APPARATUS

BACKGROUND OF THE INVENTION

1. Field of the Invention

The present invention relates to a method of generating color separation data and an image processing apparatus, and specifically, to generation of color separation data in the case that printing materials of particular colors are used for a printing apparatus.

2. Description of the Related Art

If printing materials used in a printing apparatus are, for example, cyan, magenta, yellow, and black inks or toners, then to generate print data, image processing is carried out to convert image data for R, G, and B into color separation data for C, M, Y, and K corresponding to the respective printing materials. The conversion process is normally executed using a look up table (LUT). Specifically, the contents of the table specify how to generate color separation data, that is, which combination of printing materials are to be used for a certain combination of R, G, and B data.

In the field of printing using inks or toners, it is known to use printing materials of what are called particular colors such as red, orange, green, and blue in addition to printing materials of cyan, magenta, yellow, and black, which are normally used, in order to expand the color gamut that can be reproduced by a printing apparatus, for example, to allow colors of a higher saturation to be reproduced.

Japanese Patent Application Laid-Open No. 2000-32284 describes a conventional example of a method of generating color separation data when such particular colors are used. In this case, color separation data is generated so that the gamut of the printing apparatus is reproduced using black and inks of two or three other colors including particular colors. For example, as shown in FIG. 68, for an a*b* plane in an L*a*b* space, color separation data (M, R, and K) and (Y, R, and K) is generated so as to reproduce a gamut k bounded by the hue M of a magenta ink and the hue R of a red ink and a gamut 1 bounded by the hue Y of a yellow ink and the hue R, using a combination of magenta, red, and black inks and a combination of yellow, red, and black inks, respectively. This document uses such combinations of color separation data to reduce the number of color pieces that need to be subjected to colorimetry in order to create an LUT. This also makes it possible to reduce the maximum amount of printing materials used in the printing apparatus.

However, the generation of color separation data described in Japanese Patent Application Laid-Open No. 2000-32284 simply reproduces the gamut of a saturation higher than that achieved by a printing material system not using any particular colors, by using, for a particular color printing material, the hue of this printing material and hues which are close to this hue and which are located on its respective sides (along a hue coordinate in color space). That is, the particular color printing material can realize a higher saturation or lightness than the basic-color printing materials of yellow, magenta, and cyan (and black) that are normally used. However, this method gives no advantages other than being suitable for reproduction of high saturations or the like with the limited hues mentioned above.

The inventor has made the present invention by attempting not only to use the particular color printing materials with the particular hues to obtain a high saturation as described above but also effectively to utilize the particularly high saturation and lightness of the particular color printing materials to expand the entire reproducible gamut.

SUMMARY OF THE INVENTION

An object of the present invention is to provide a method of generating color separation data and an image processing apparatus which effectively utilize the particularly high saturation and lightness of the particular color printing materials to expand the entire reproducible gamut.

In the first aspect of the present invention, there is provided a color separation data generation method for generating color separation data, which is used for a printing apparatus and corresponds to printing materials including a particular color printing material, for a predetermined gamut, and in which is generated the respective color separation data corresponding to first and second printing materials and to a printing material of the particular color, for a color at a maximum saturation in a predetermined hue_that is reproduced by mixing the first and second printing materials of respective colors in hues on both sides of a hue of the particular color, in the predetermined gamut.

Preferably, the method may further generate the color separation data corresponding to a printing material other than the first, second and particular color printing materials for a lower lightness side area of the maximum saturation in the predetermined hue, in the predetermined gamut.

In the second aspect of the present invention, there is provided an image processing apparatus that generates color separation data, which is used for a printing apparatus and corresponds to printing materials including a particular color printing material, for a predetermined gamut, where the image processing apparatus generates the respective color separation data corresponding to first and second printing materials and to a printing material of the particular color, for a color at a maximum saturation in a predetermined hue that is reproduced by mixing the first and second printing materials of respective colors in hues on both sides of a hue of the particular color, in the predetermined gamut.

Preferably, the image processing apparatus may further generate the color separation data corresponding to a printing material other than the first, second and particular color printing materials for a lower lightness side area of the maximum saturation in the predetermined hue, in the predetermined gamut.

With the above configuration, in the predetermined gamut, for a color having the maximum saturation of a predetermined hue that can be reproduced by mixing the first and second printing materials of colors of hues located on respective sides of a hue having the color of the particular color printing material, color separation data is generated which corresponds to the first and second printing materials and the particular color printing material, respectively. Accordingly, in an area in which a lightness such as a maximum saturation point is relatively high, the particular color printing material can be used to extend the reproducible color space. Further, by using the particular color printing material for a low-lightness side of the predetermined hue, it is possible to expand the entire gamut using the high lightness and saturation of the particular color printing material.

As a result, the entire reproducible gamut can be expanded utilizing the particularly high saturation and lightness of the particular color printing material.

The above and other objects, effects, features and advantages of the present invention will become more apparent

BRIEF DESCRIPTION OF THE DRAWINGS

FIG. 4 is a diagram showing a comparison, in a space defined by lightness and saturation, of a gamut realized by the particular color ink red with a gamut reproduced by a monitor of a personal computer or the like;

FIG. 45 is a diagram showing a relationship between FIGS. 45A and 45B; and

FIGS. 45A and 45B are block diagrams showing the internal configuration of an ASIC;

FIG. 53 is a flow chart illustrating a sequence executed by the printing apparatus applied according to the embodiment of the present invention when the apparatus is powered on;

DETAILED DESCRIPTION OF THE PREFERRED EMBODIMENTS

The preferred embodiments of the present invention will be described below in detail with reference to the drawings.

The term "particular colors" as used herein refers in a broad sense to colors different from the hues of yellow, magenta, and cyan (which correspond to printing materials of the basic colors). In a narrow sense, in a CIE-L*a*b* color space, the term "particular color" refers to a color that can express a lightness higher than that of a color reproduction area expressed on a print medium using a combination of two of the basic-color printing materials of magenta, yellow, and cyan and which indicates a hue angle in a color reproduction area expressed by the combination of two printing materials. Alternatively, in the CIE-L*a*b color space, "particular color" refers to a color that can express a lightness and a saturation higher than those of the color reproduction area expressed on the print medium using a combination of two of the basic-color printing materials magenta, yellow, and cyan and which indicates the hue angle in the color reproduction area expressed by the combination of two printing materials.

In the present invention, it is preferable to use printing materials of the "particular colors" in the above narrow sense, but printing materials of the "particular colors" in the broad sense may also be used.

First Embodiment (Summary of Print System)

Figure 1:
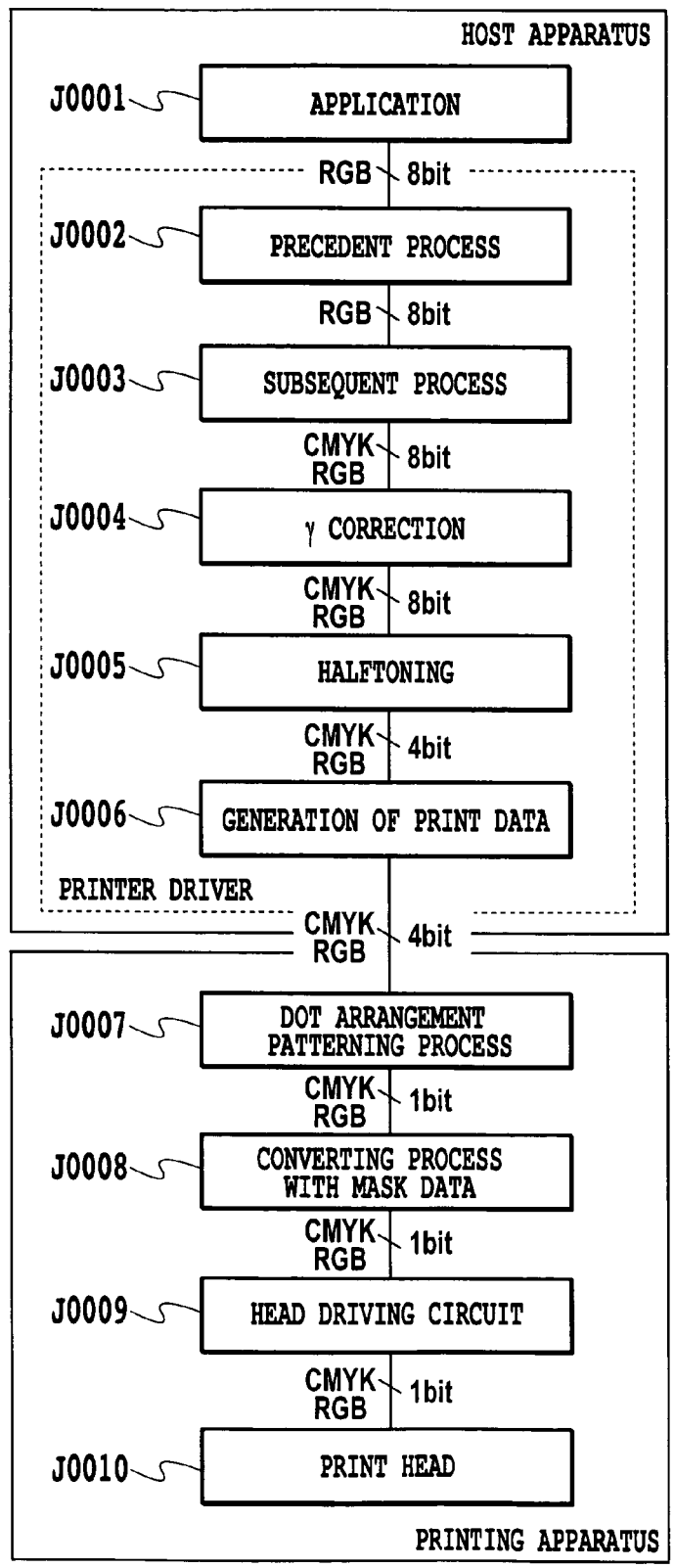
FIG. 1 is a block diagram showing the configuration of a print system according to a first embodiment of the present invention.

FIG. 1 is a block diagram showing the configuration of a print system according to a first embodiment. A printer according to the present embodiment executes printing using basic-color inks of cyan, magenta, yellow, and black and particular color inks of red, green, and blue. Thus, the printer uses print heads that eject these seven color inks. As shown in FIG. 1, the print system according to the present embodiment is composed of a printer operating as a printing apparatus using the particular color inks and a personal computer (PC) operating as a host apparatus or an image processing apparatus.

Programs operated by an operating system in the host apparatus include an application and a printer driver. The application J0001 executes a process of creating image data printed by the printer. The image data or data not undergoing editing or the like can be loaded into the PC via various media. The PC according to the present embodiment can use a CF card to load image data in, for example, a JPEG format which has been photographed using a digital camera. The PC can also load image data in, for example, a TIFF format which has been read using a scanner and image data stored in a CD-ROM. The loaded data is displayed on a monitor of the PC and is then, for example, edited or processed via the application J0001 to create image data R, G, and B in conformity with, for example, an sRGB standard. Then, in response to a print instruction, the image data is passed to the printer driver.

The printer driver according to the present embodiment has processes including a precedent process J0002, a subsequent process J0003, γ-correction J0004, half-toning J0005, and print data creation J0006. The precedent process J0002 performs mapping of a gamut. The precedent process J0002 according to the present embodiment uses a three-dimensional LUT containing the mapping relationship for mapping a gamut reproduced by image data R, G, and B in conformity with the sRGB standard into a gamut reproduced by the printer of the present print system and also uses an interpolation operation to convert 8-bit image data R, G, and B into data R, g, and B in the gamut of the printer. On the basis of the data R, G, and B having undergone the above described gamut mapping, the subsequent process J0003 executes a process of determining color separation data Y, M, C, K, R, G, and B corresponding to a combination of inks that reproduces colors indicated by the data. In the present embodiment, this process uses both three-dimensional LUT and interpolation operation similarly to the precedent process. The γ-correction J0004 performs a converting operation on the gradation value of data on each color of the color separation data determined by the subsequent process J0003. Specifically, a one-dimensional LUT corresponding to the gradation characteristic of each color ink for the printer used in the present system is used to execute a conversion such that the color separation data is linearly associated with the gradation characteristic of the printer. The half toning J0005 executes quantization in which each of the 8-bit color separation data Y, M, C, K, R, G, and B is converted into 4-bit data. In the present embodiment, an error diffusion method is used to convert 8-bit data into 4-bit data. The 4-bit data is used as indices indicating an arrangement pattern for a patterning process for a dot arrangement in the printing apparatus. Finally, the print data creation process J0006 creates print data composed print image data containing the 4-bit index data as well as print control information. The above described processes of the application and printer driver are executed by a CPU in accordance with corresponding programs. In this case, the programs are read from a ROM or a hard disk. A RAM is used as a work area in executing the processes.

The printing apparatus executes a dot arrangement patterning process J0007 and a mask data converting process J0008 in connection with data processing. The dot arrangement patterning process J0007 arranges dots in accordance with a dot arrangement pattern corresponding to the 4-bit index data (gradation value information), the print image data, for each pixel corresponding to an actual print image. In this manner, a dot arrangement pattern is assigned to each pixel expressed by the 4-bit data; the dot arrangement pattern corresponds to the gradation value of the pixel. This defines a dot to be turned on or off for each of the plurality of areas in the pixel. Then, ejection data "1" or "0" is placed in each area in one pixel. One-bit ejection data thus obtained is subjected by the mask data conversion process J0008 to a mask process. Specifically, ejection data for each scan required to print a scanning area of a predetermined width is generated with a process using a mask corresponding to each scan. The ejection data Y, M, C, L, R, G, and B for each scan is transmitted to a head driving circuit at appropriate times. Thus, a print head J0010 is driven to eject the respective inks in accordance with the ejection data. The dot arrangement patterning process and mask data converting process in the printing apparatus are executed under a CPU constituting a control section of the printing apparatus, using exclusive hardware circuits. These processes may be executed by the CPU in accordance with the programs or by, for example, the printer driver in the PC. That is, any processing form may be used in applying the present invention as is apparent from the description below.

The above-described printer according to the present embodiment uses red, green, and blue as particular color inks. These particular color inks can preferably express a higher saturation and lightness than secondary colors of the same hues produced by mixing two of the basic color inks of yellow, magenta, and cyan. However, the present invention is not limited to this aspect. The inks have only to be able to express a lightness higher than at least the secondary colors. That is, the particular color that can be suitably used in the present embodiment refers to a color that has, in the CIE-L*a*b color space, a lightness higher than that of the color reproduction area expressed on the print medium using a combination of two of the basic-color printing materials of magenta, yellow, and cyan and which indicates the hue angle in the color reproduction area expressed by the combination of two printing materials. The particular color can preferably express a saturation higher than that of the above stated color reproduction area.

The particular color ink red according to the present embodiment can express a saturation and a lightness higher than those of a color space that can be reproduced by input image data R, U, and B in conformity with the sRGB standard for monitors and the like. In the present embodiment, the printer, using the inks as printing materials, will be described. However, the description is also valid for a printer or a copy machine using other printing materials such as toners except for descriptions inherent in the inks, as is also apparent from the following description.

In the present specification, the inks as printing materials will be expressed using the ordinary English words, cyan, magenta, yellow, black, red, and green. The color or its data or hue will be denoted as one English capital letter such as C, M, Y, K, R, and G or a combination of one English capital letter and one English small letter. Specifically, C denotes a cyan color or its data or hue, M denotes a magenta color or its data or hue, and Y denotes a yellow color or its data or hue. K denotes a black color or its data or hue, and R denotes a red color or its data or hue. G denotes a green color or its data or hue, and B denotes a blue color or its data or hue.

Moreover, in the present specification, the term "pixel" refers to a minimum unit that can be expressed using gradations or a minimum unit to be subjected to image processing of multi-valued data of multiple bits (the precedent process, subsequent process, γ correction, half toning, and the like, which are mentioned above). In a dot arrangement patterning process, one pixel corresponds to a pattern of 2×4 frames. Each frame in one pixel is defined as an area. The "area" is a minimum unit for which each dot is turned on or off. In connection with this, the "image data" in the precedent process, subsequent process, or γ correction represents a set of pixels to be processed. Each pixel is data containing an 8-bit gradation value. The "image data" in half toning represents image data itself to be processed. In the half toning according to the present embodiment, image data containing the 8-bit gradation value is converted into image data (index data) containing 4-bit gradation values.

A detailed description will be given of the above print system according to the present embodiment as well as its processing block or element.
(Precedent Process)

The precedent process according to the present embodiment reads lattice point data using an LUT and carries out an interpolation process on the basis of the lattice point data to convert input data R, G, and B in conformity with the sRGB standard and to generate data R, G, and B whose gamut is transformed, as previously described in FIG. 1. The LUT for the precedent process stores, as lattice point data for the LUT, output data R, G, and B realizing a mapped color reproduction area that is the final result of mapping, described below. That is, the conversion relationship indicated by the LUT represents the contents of the implementation of the gamut converting method according to the present embodiment. However, of course, the implementation of the gamut converting method is not limited to such a form as uses an LUT. For example, a mathematic operation based on an equation expressing the above conversion relationship is performed on the input data R, G, and B to obtain gamut-converted data.

Figure 2:
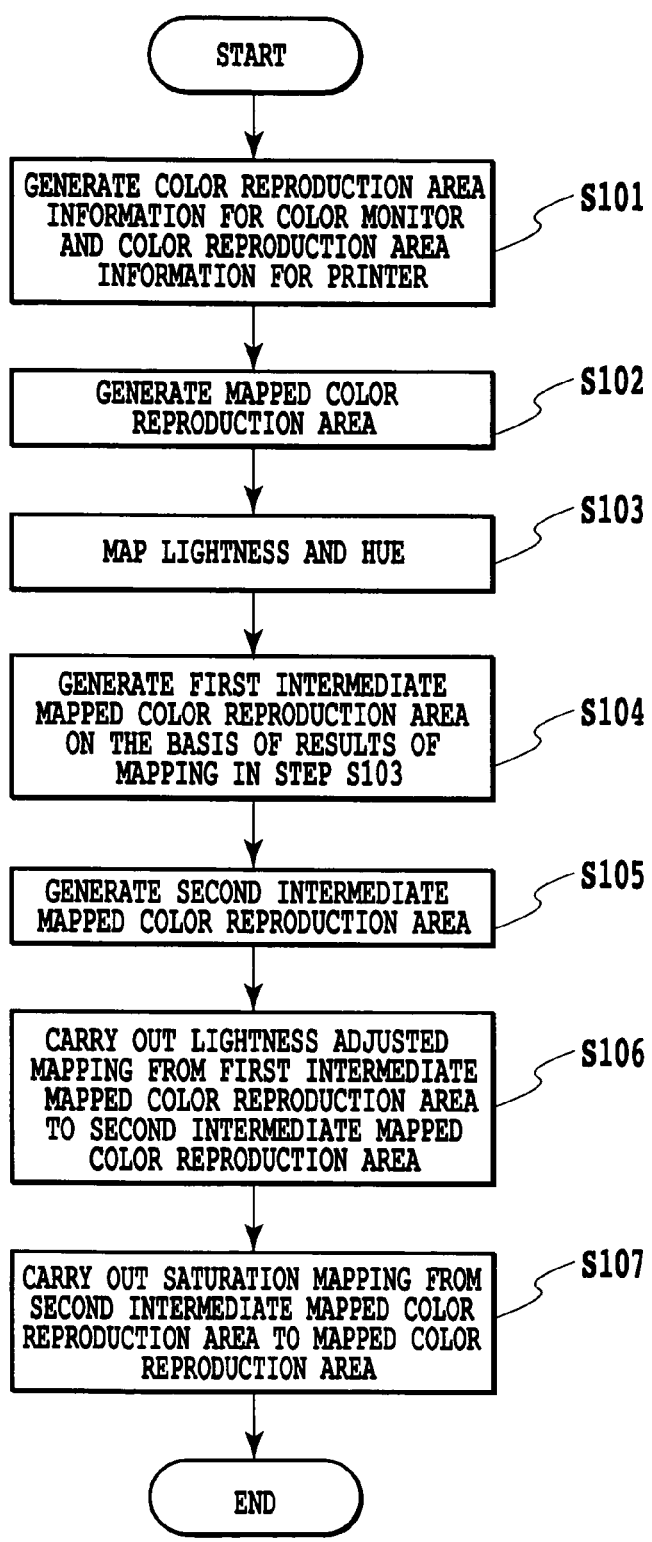
FIG. 2 is a flow chart showing a process of generating lattice point data for an LUT according to the embodiment of the present invention.

FIG. 2 is a flow chart showing a process of generating lattice point data for the LUT according to the present embodiment.

In this process, first, for a color reproduction area for image data created by the application J0001, shown in FIG. 1, and displayed on a monitor, mapping is executed to mainly reduce the lightness of a low-saturation area to generate a first intermediate mapped reproduction area. Then, for the first intermediate mapped reproduction area, mapping is executed to mainly increase the lightness of a high-saturation area to generate a second intermediate mapped reproduction area. Finally, for the second intermediate mapped reproduction area, mapping is executed to adjust the saturation to generate a final mapped color reproduction area substantially matching the color reproduction area of the printer (printing apparatus). The gamut conversion realized by the above mappings are executed by identifying lattice points using input data R, G, and B specifying the color reproduction area of the monitor and outputting, as lattice point data, output data R, G, and B associated with the identified lattice points and specifying the final mapped color reproduction area. Further, in the generation of an LUT, the mappings are executed in the CIEL*a*b*, which is an even color space. Finally, the values of L*a*b* obtained are associated with the data R, G, and B to obtain lattice point data.

In the description below of a process of generating lattice point data, the hue Rs of a red ink, a printing material of a particular color according to the present embodiment, will be illustrated and the above mappings will be described. As described above, the red ink can make the gamut of the printer winder than that of the monitor in the hue Rs and its nearby hues except for a low lightness part. For the other hues, lattice point data can be generated by executing mappings as in the case of the process shown below, as is apparent from the description below.

In FIG. 2, first, in step S101, the following information is obtained: color reproduction area information specified by data R, U, and B from the application J0001 (FIG. 1) such as data for the color monitor as well as color reproduction area information for the printer. These pieces of information are obtained and then stored in a predetermined memory before the present LUT generating process. Further, these pieces of information are specified for the CIEL*a*b* space. The color reproduction area information for the color monitor is composed of an L*a*b* value for each lattice point specified by the data R, G, and B. Then, in step S102, boundaries in a mapped color reproduction area that is the final result of the mappings are generated. This color reproduction area boundaries are substantially similar to those in the color reproduction area of the printer according to the present embodiment.

Figure 3:
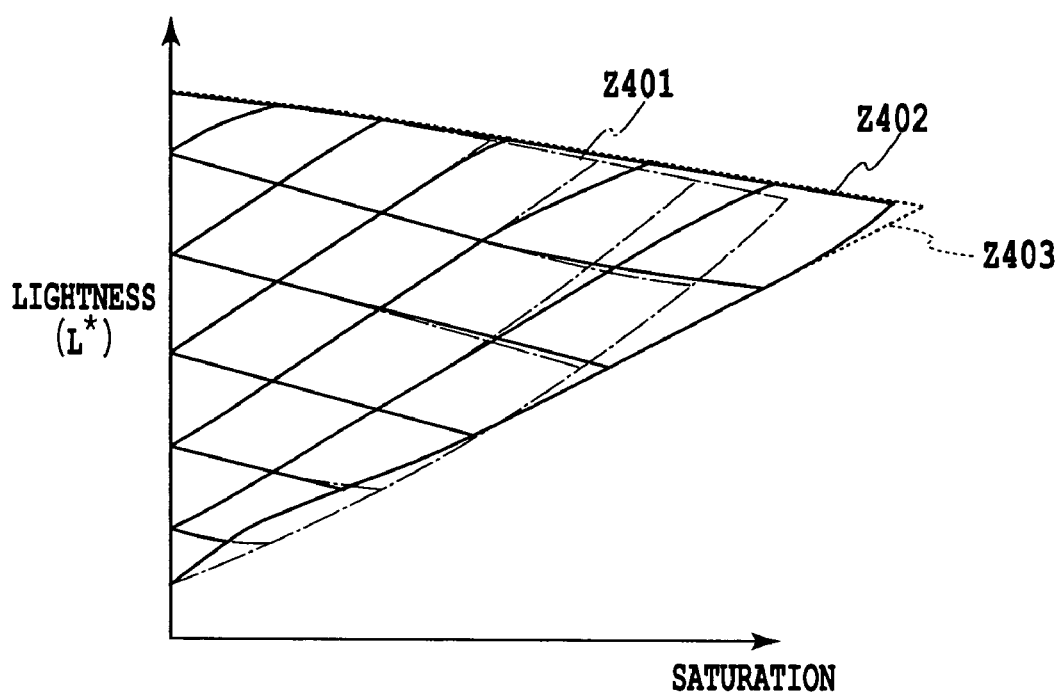
FIG. 3 is a diagram showing a color reproduction area of a color monitor, a color reproduction area of a printer, and a final mapped color reproduction area for the hue Rs of a particular color ink red according to the above embodiment.

FIG. 3 shows the color reproduction area of the monitor, the color reproduction area of the printer, and the final mapped color reproduction area, for the hue Rs. In this figure, Z401 denotes the color reproduction area of the monitor (the gamut enclosed by an alternate long and short dash line). Z402 denotes the final mapped color reproduction area (the gamut enclosed by a solid line). Z403 denotes the color reproduction area of the printer (the gamut enclosed by a broken line). The mapped color reproduction area Z402 substantially matches the color reproduction area Z403 of the printer. The figure indicates that for this hue Rs, the color reproduction area Z403 of the printer is wider than the color reproduction area Z401 of the monitor except for a low-lightness part.

Figure 4:
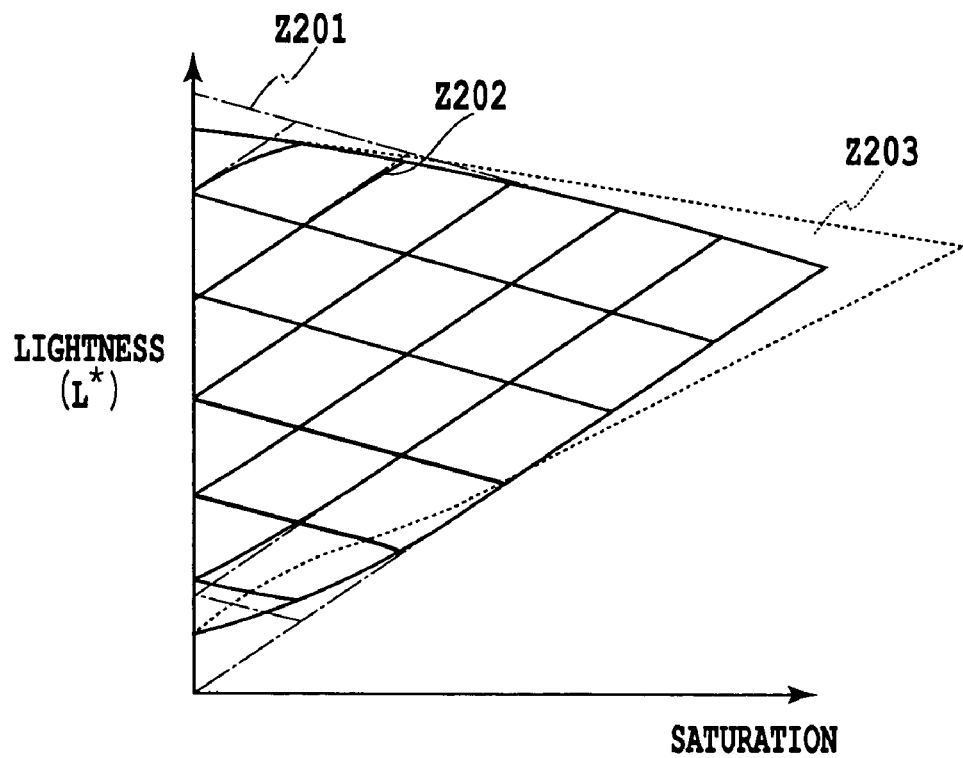

In step S103, a mapping for the lightness and hue is executed on the monitor color reproduction area to generate a first intermediate mapped reproduction area. The mapping will be described later in detail. Now, the mapping will be described in brief with reference to FIG. 4, showing the result of the mapping. In FIG. 4, Z201 denotes the monitor color reproduction area (alternate long and short dash line) for the hue Rs. Z202 denotes the first intermediate mapped color reproduction area (solid line) for the same hue. Z203 denotes the printer color reproduction area (broken line) for the same hue. With this mapping, the color in the monitor color reproduction area is separated into a lightness component (L* component) and a chromaticity component (a*, b* component). As shown in FIG. 4, in an area with a saturation lower than the substantially intermediate saturation of the monitor gamut, the lightness component is nonlinearly compressed. Further, for the chromaticity component, the hue is appropriately adjusted. This process allows the monitor color representation area Z201 to be mapped to the first intermediate mapped color reproduction area Z202. Once the lightness/hue mapping is finished, information indicative of the first intermediate mapped color reproduction area is generated from the results of the mapping and then stored in a main memory, in step S104.

Figure 5:
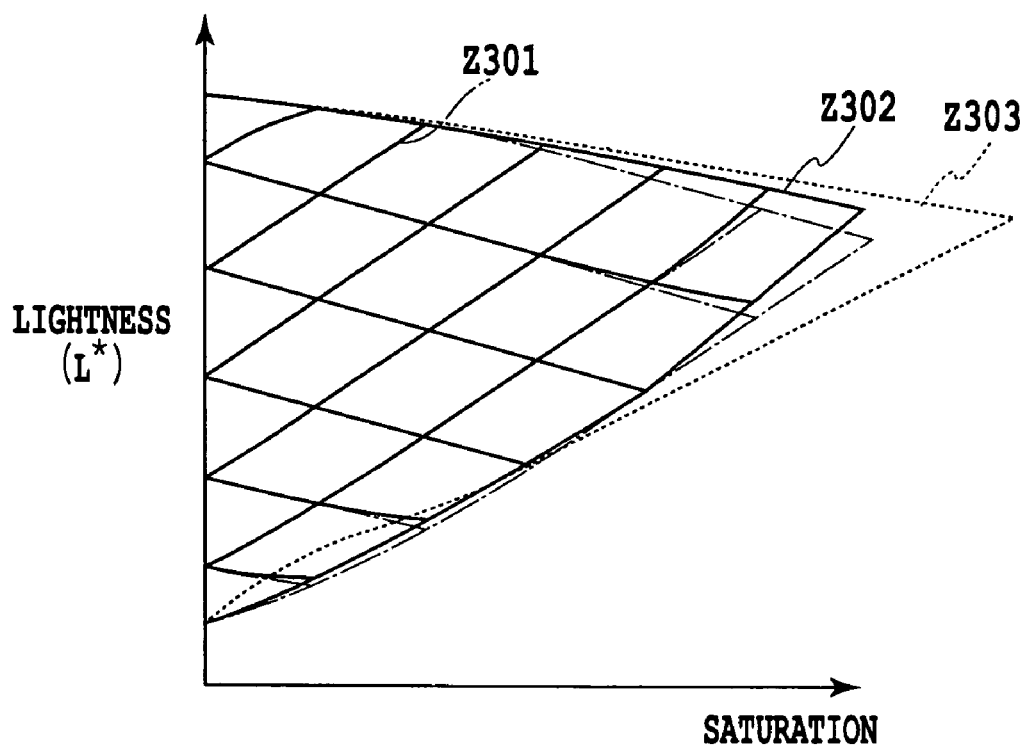
FIG. 5 is a diagram showing color reproduction area boundaries obtained if a gamut indicated by first intermediate mapped color reproduction area information is adjusted for the lightness to generate boundaries of a second intermediate mapped color reproduction area.

Then, in step S105, the lightness is adjusted with respect to the gamut indicated by the first intermediate mapped color representation area information to generate a boundary for a second intermediate mapped color reproduction area. FIG. 5 shows the color reproduction area boundaries. The boundary of the gamut indicated by Z302 in the figure corresponds to the boundary of the second intermediate mapped color reproduction area. Then, in step S106, the first intermediate mapped color reproduction area is mapped to the second intermediate mapped color reproduction area. This mapping mainly increases the lightness in a part of the first intermediate mapped color reproduction area which has a saturation higher than a substantially intermediate value. Although described later in detail, the mapping will now be described in brief with reference to FIG. 5. In FIG. 5, Z301 denotes the first intermediate mapped color reproduction area for the hue Rs of the particular color ink Red. Z302 denotes the second intermediate mapped color reproduction area for the same hue. Z303 denotes the printer color reproduction area for the same hue. The color in the first intermediate mapped color reproduction area is separated into a lightness component and a chromaticity component. Then, with the chromaticity component kept constant, the lightness component is nonlinearly expanded. This process allows the first intermediate color representation area Z301 to be mapped to the second intermediate mapped color reproduction area Z302. The results of the mapping are stored in the main memory as information on the second intermediate mapped color reproduction area.

Finally, in step S107, the second intermediate mapped color reproduction area is mapped to a mapped color reproduction area that is the final gamut. The resulting mapped color reproduction area is compressed and expanded in accordance with the saturation. Although the mapping process for the saturation is described later in detail, it will now be described in brief with reference to FIG. 3. In FIG. 3, Z401 denotes the second intermediate mapped color reproduction area for the hue Rs of the particular color ink red. Z402 denotes the mapped color reproduction area for the same hue. Z403 denotes the printer color reproduction area for the same hue. With the mapping in the present step, the color in the second intermediate mapped color reproduction area Z401 is separated into a lightness component and a chromaticity component. Then, with the lightness component kept constant, the saturation component in the chromaticity component is nonlinearly mapped. This mapping allows the second intermediate mapped color reproduction area Z401 to be mapped to the final mapped color reproduction area Z402.

A detailed description will be given of the mapping process in the above-described steps S103, S106, and S107.

Figure 6:
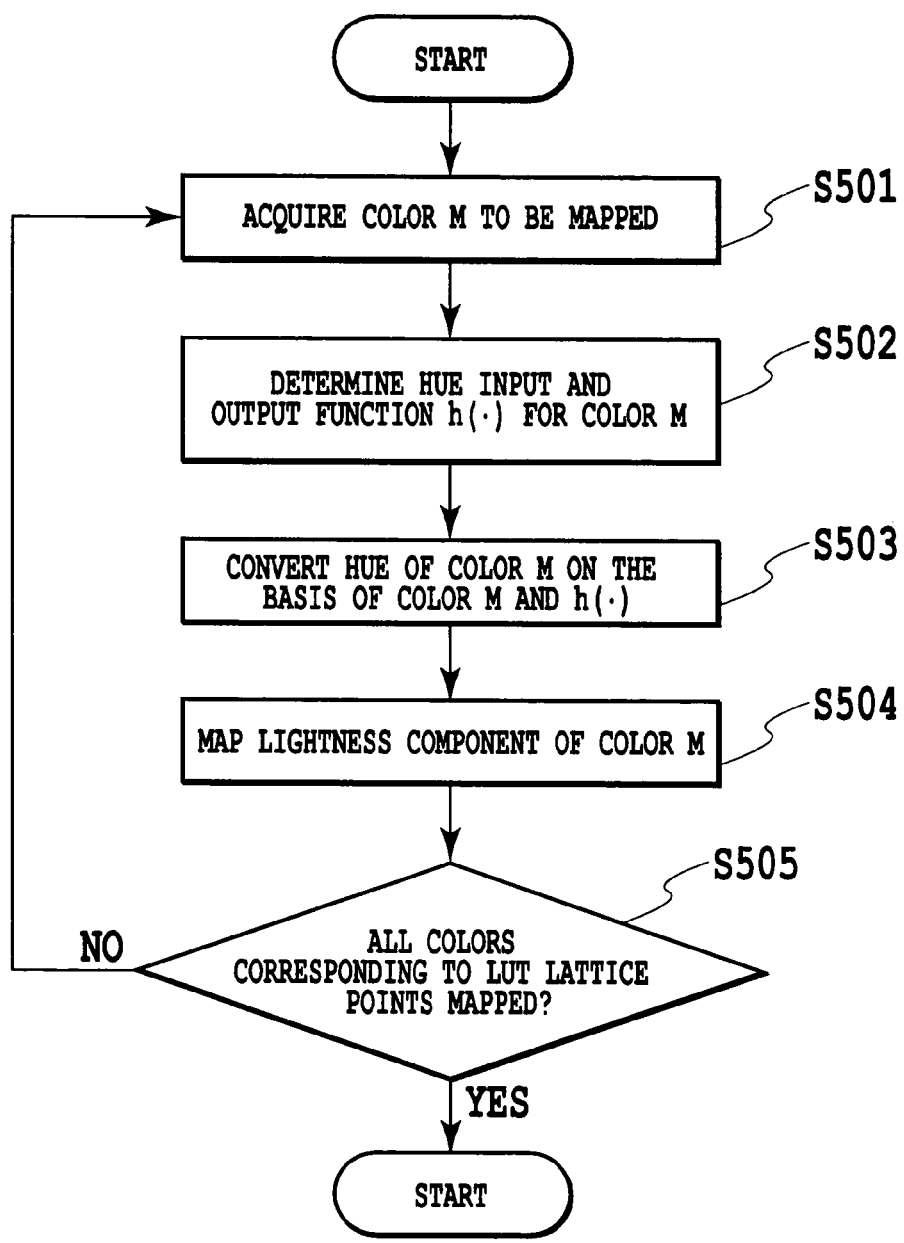
FIG. 6 is a flow chart showing the details of the lightness/hue mapping process shown in FIG. 3.

FIG. 6 is a flow chart showing the details of the lightness/hue mapping process in step S103, shown in FIG. 3.

In FIG. 6, first in a step S501, a color M to undergo mapping conversion is specified. The color M corresponds to one lattice point in an LUT according to the present generation. The color M is expressed by the L*a*b* value corresponding to data R, G, and B identifying the lattice point. The mapping process according to the present generation of an LUT is executed for each lattice point (for each color specified by the lattice point).

Figure 7:
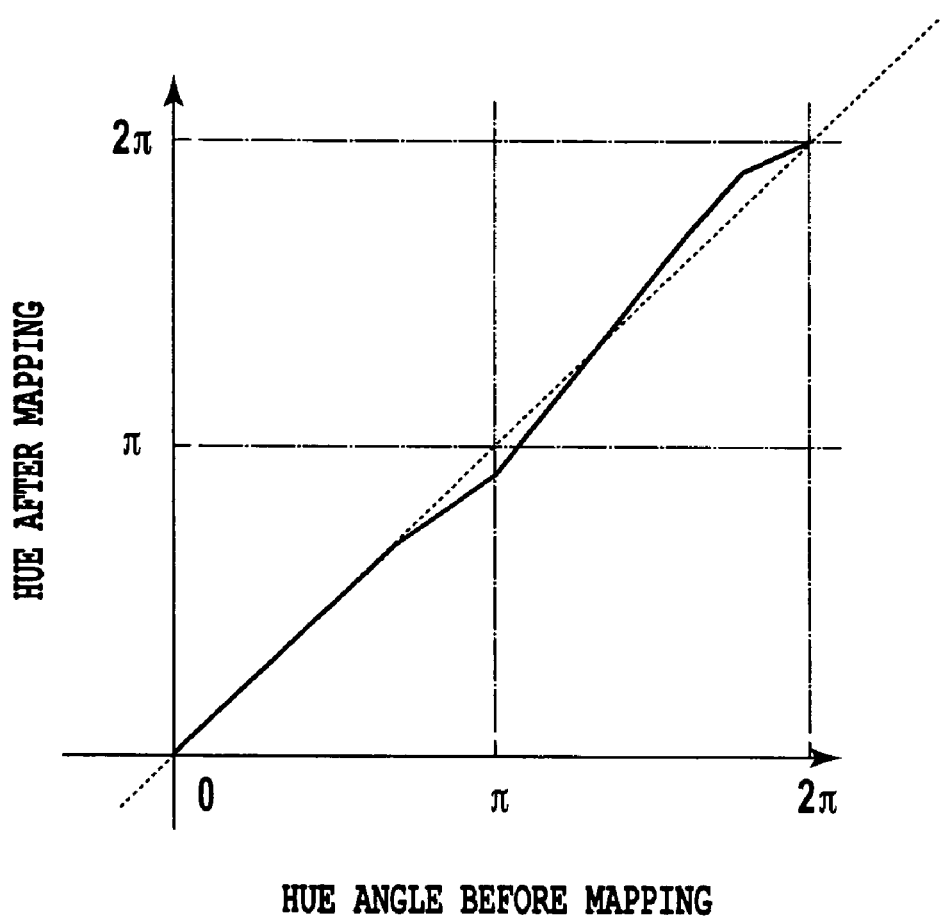
FIG. 7 is a graph showing a hue input and output function used in a hue conversion according to the above embodiment.

Then, in step S502, a hue input and output function h(•) used for a hue conversion is determined. To determine the hue input and output function h(•), function information preliminary stored in a predetermined memory is read. The hue input and output function is fixed regardless of the color (lightness or saturation). In the present embodiment, the hue input and output function h(•) converts the hue as shown in FIG. 7. As shown in FIG. 7, in this conversion, the hue angle (approximately the angle π) from the vicinity of the hue G to the vicinity of the hue C is slightly reduced, while the hue angle (approximately the angle 2π) from the vicinity of the hue C to the hue midway between the hue M and the hue R is slightly increased. Accordingly, with this mapping, for the hue angle of the hue Rs, which is the same as the particular color Red, does not vary regardless of an operation with the hue input and output function h(•).

In step S503, the hue input and output function determined as described above is used to execute a hue conversion as shown in the equation below:

Hue_m_mapped=h(Hue_m)

where Hue_m is the hue (angle) of the color M, and Hue_m_mapped is the hue (angle) after the conversion.

Figure 8:
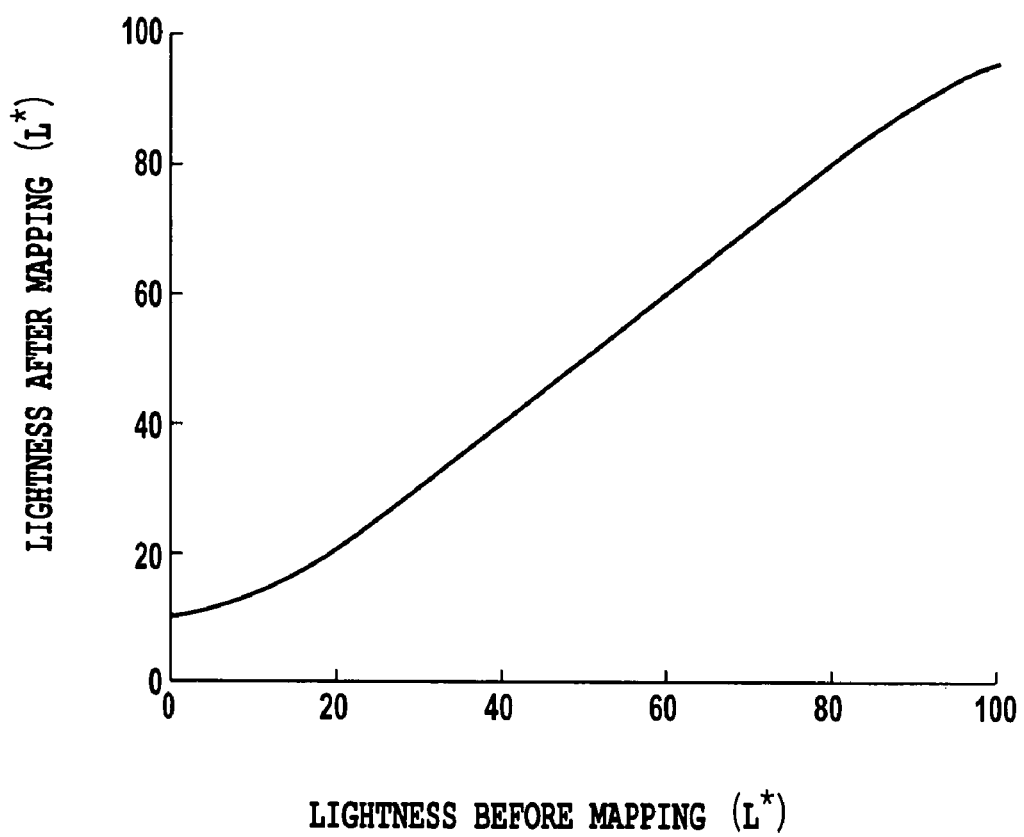
FIG. 8 is a graph showing an input and output function used in a lightness conversion according to the above embodiment.

Then, in step S504, the lightness component is converted. With this conversion, the mathematic operation Lmapped=l (Lin) is performed using one input and output function l(•) that is independent of the chromaticity. According to the present embodiment, the input and output function l(•) is as shown in FIG. 8. As is apparent from this figure, this function executes such a conversion as reduces the lightness in a part with a relatively low lightness and a part with a relatively high lightness.

Finally, in step S505, it is determined whether or not the above described lightness/hue mapping process has been executed on all the lattice points of the LUT. Steps S 501 to S504 are repeated until the mapping process is finished on all the lattice points. The above process maps the monitor color reproduction area Z201 to the first intermediate mapped color reproduction area Z202 as shown in FIG. 4.

Figure 9:
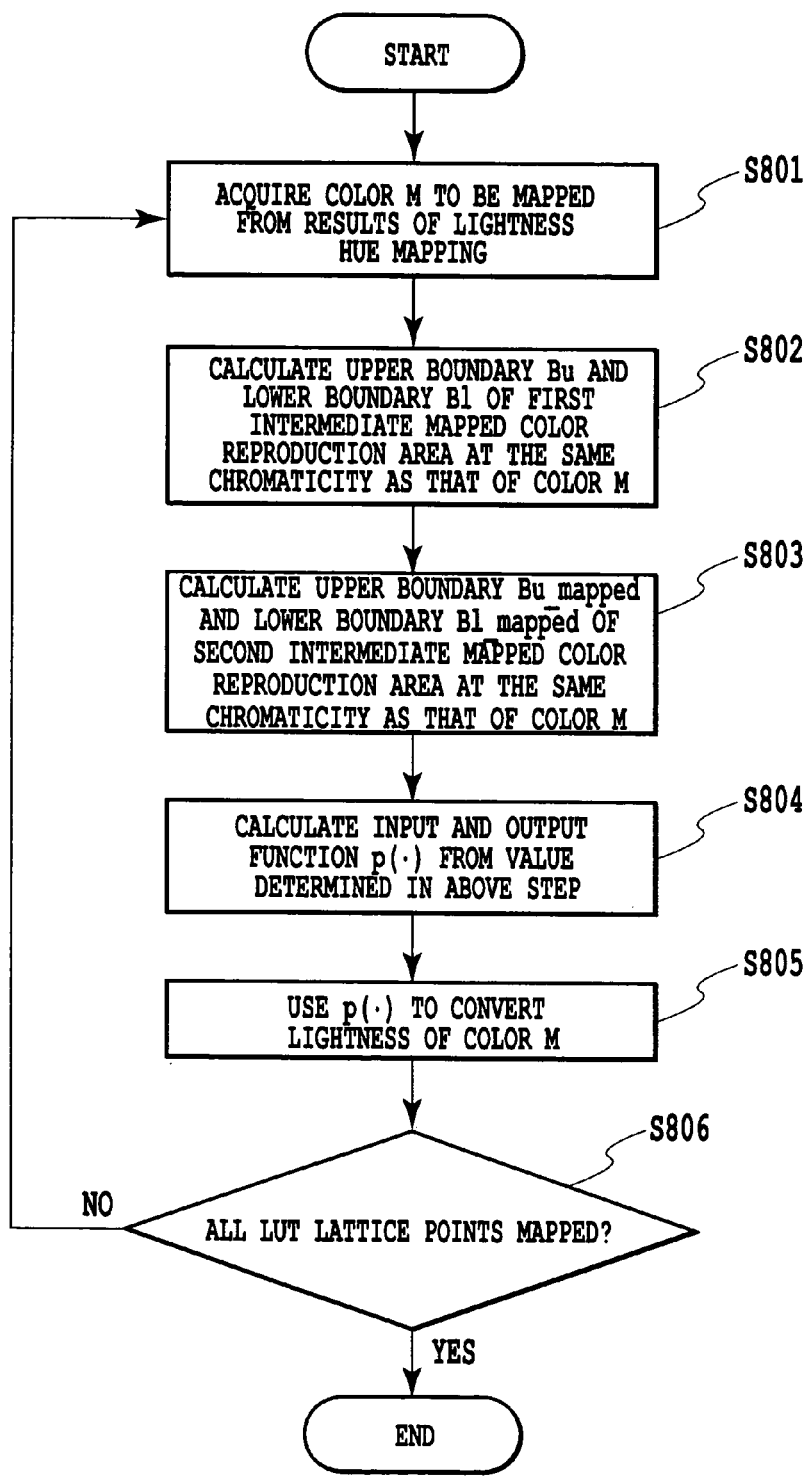
FIG. 9 is a flow chart showing the details of the lightness adjusted gamut mapping process shown in FIG. 2.

FIG. 9 is a flow chart showing the details of the lightness adjusted gamut mapping process in step S106 shown in FIG. 2.

In FIG. 9, first, in step S801, the color M to undergo a mapping conversion is specified. The target color M is in the first intermediate mapped color reproduction area and does not refer to the color in the monitor color reproduction area specified in step S501 in FIG. 6. Specifically, the color M specified for the monitor color reproduction area corresponds directly to a lattice point. The color M specified in the present step is specified as the color M on the monitor color reproduction area mapped to the first intermediate mapped color reproduction area.

Figure 10:
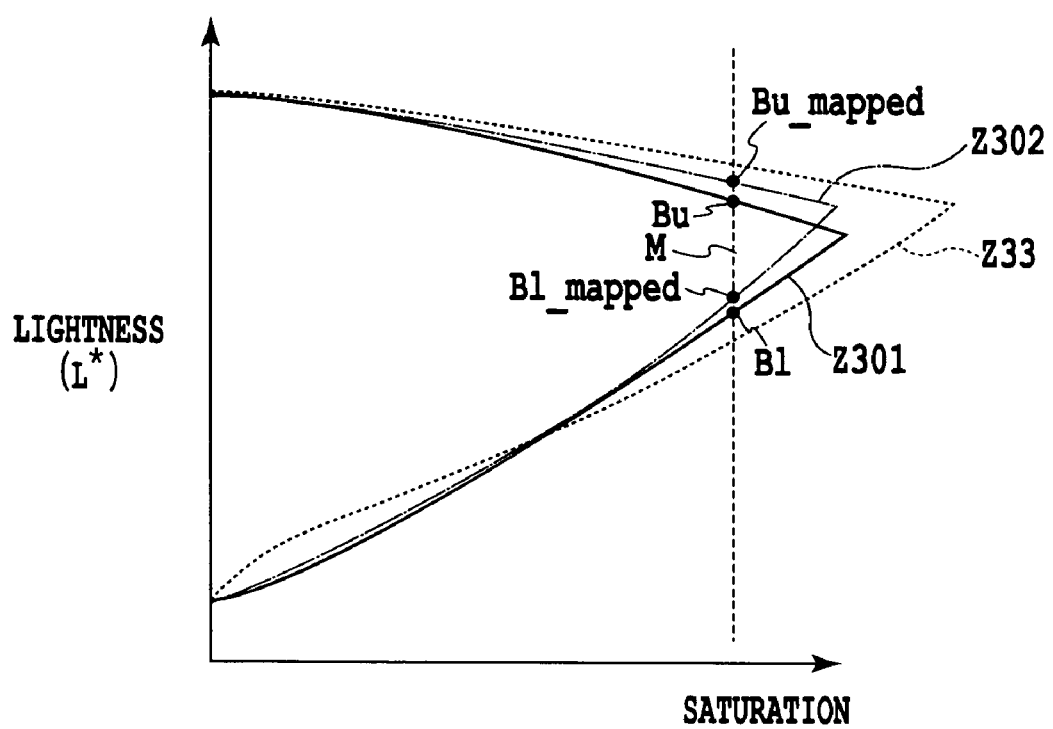
FIG. 10 is a graph illustrating a process of calculating the upper and lower boundaries of a first intermediate mapped color reproduction area at the same chromaticity as that of a color to be processed in the lightness conversion according to the above embodiment.

Then, in step S802, an upper boundary Bu and a lower boundary Bl of the first intermediate mapped color reproduction area Z301 (solid line) at the same chromaticity as that of the color M specified in step S801 are calculated as shown in FIG. 10. Then, in step S803, an upper boundary Bu_mapped and a lower boundary Bl_mapped of the second intermediate mapped color reproduction area Z302 (alternate long and short dash line) at the same chromaticity as that of the specified color M are calculated. In FIG. 10, the color reproduction area shown by a broken line is the printer color reproduction area Z303.

Subsequently, in step S804, an input and output function p(•) that executes a mapping for lightness adjustment is calculated from the parameters determined above. In the present embodiment, the input and output function p(•) is calculated which meets the conditions described below. When LB1 indicates the lightness of the lower boundary B1, LBlm indicates the lightness of Bl_mapped, LBu indicates the lightness of Bu, and LBum indicates the lightness of Bu_mapped, the conditions are as shown below:

The support of p(•) is [LBl, LBu]

p(LBl)=LBLm p(LBu)=LBum

Figure 11:
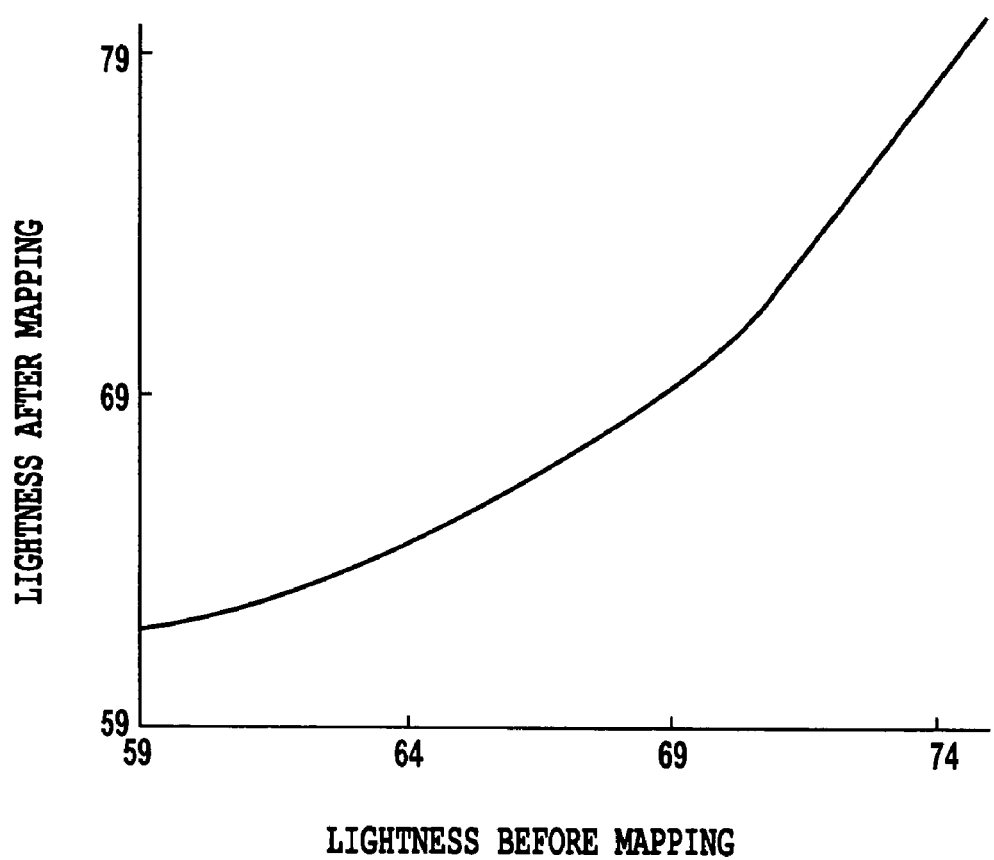
FIG. 11 is a graph showing an input and output relationship in the lightness relationship according to the above embodiment, particularly showing that the lightness is substantially maintained in an intermediate lightness part and decreases in a low lightness part and increases in a high lightness area.

The input and output function p(•) is calculated which meets these conditions. Further, as shown in FIG. 11, the lightness is maintained in the intermediate part of the support (L* is about 64 to 69). The function decreases in a part with a low lightness (about 64 or less) and increases in a part with a high lightness (about 69 or more). LBl=59, LBlm=62, LBu=75, and LBum=80.

In step S805, the input and output function p(•) determined in step S804 as described above is used to execute a mapping for lightness adjustment by determining the mapped lightness Lm_mapped=p(Lm).

If a mapping is executed using an input and output function p(•) such as the one described above and a mapping for a saturation conversion is subsequently executed as described in step S107 in FIG. 2, then in the final mapped color reproduction area, in particular, a mapping is executed on a high-saturation area of the hue Rs using a function with a change rate of 1 or greater (at the high-lightness part in FIG. 11). This allows a gamut conversion to be executed so that there is a significant change in the lightness of a high-saturation part of the monitor color reproduction area.

Finally, in step S806, it is checked whether or not the lightness adjusted gamut mapping has been executed on all the colors (lattice points) of the LUT. Steps S802 to S805 are repeated until the process has been finished on all the lattice points. The above process allows the first intermediate mapped color reproduction area Z301 to be mapped to the second intermediate mapped color reproduction area Z302 as shown in FIG. 5.

Figure 12:
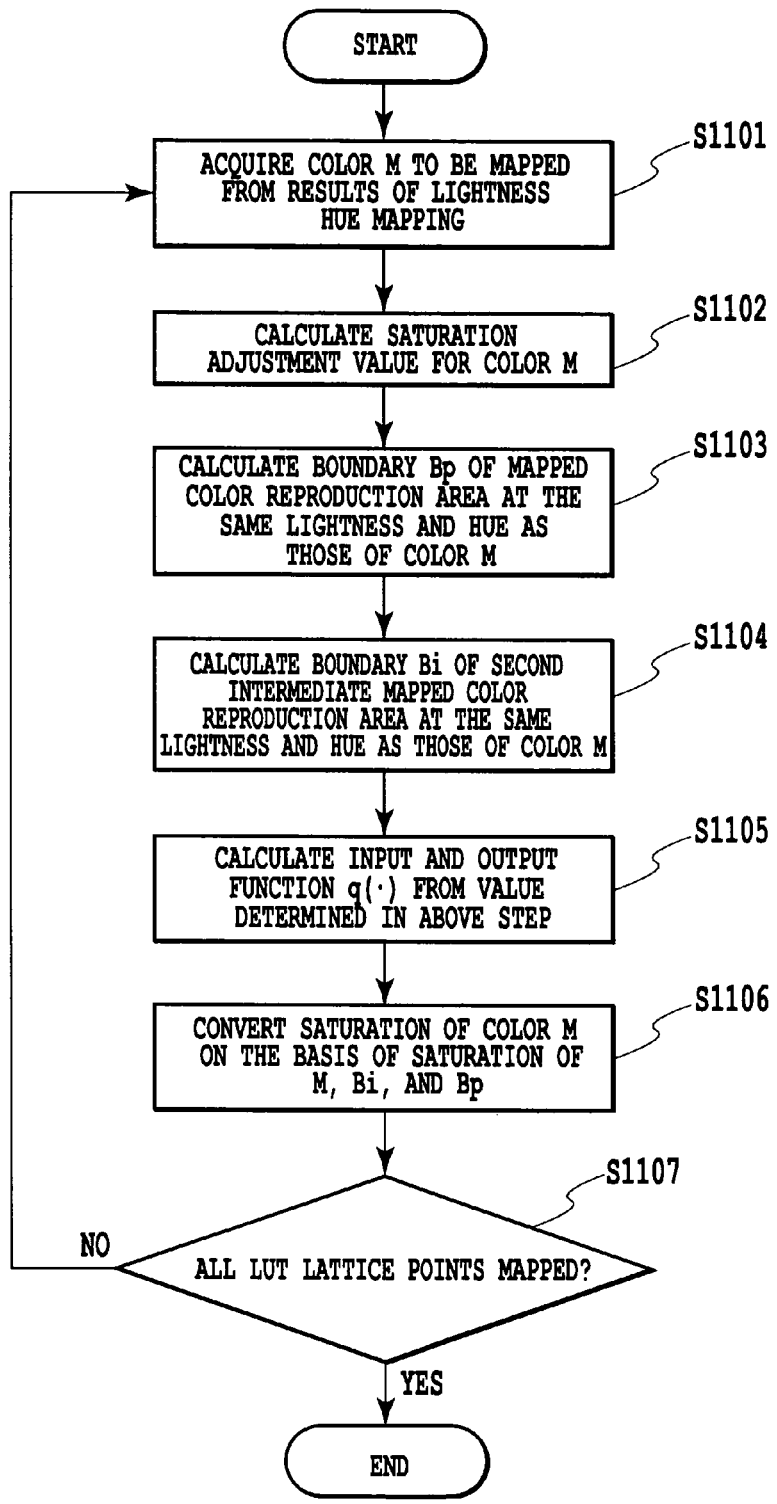
FIG. 12 is a flow chart showing the details of the saturation mapping process shown in FIG. 2.

Finally, FIG. 12 is a flow chart showing the details of the saturation mapping process in step S107 of FIG. 2.

Figure 13:
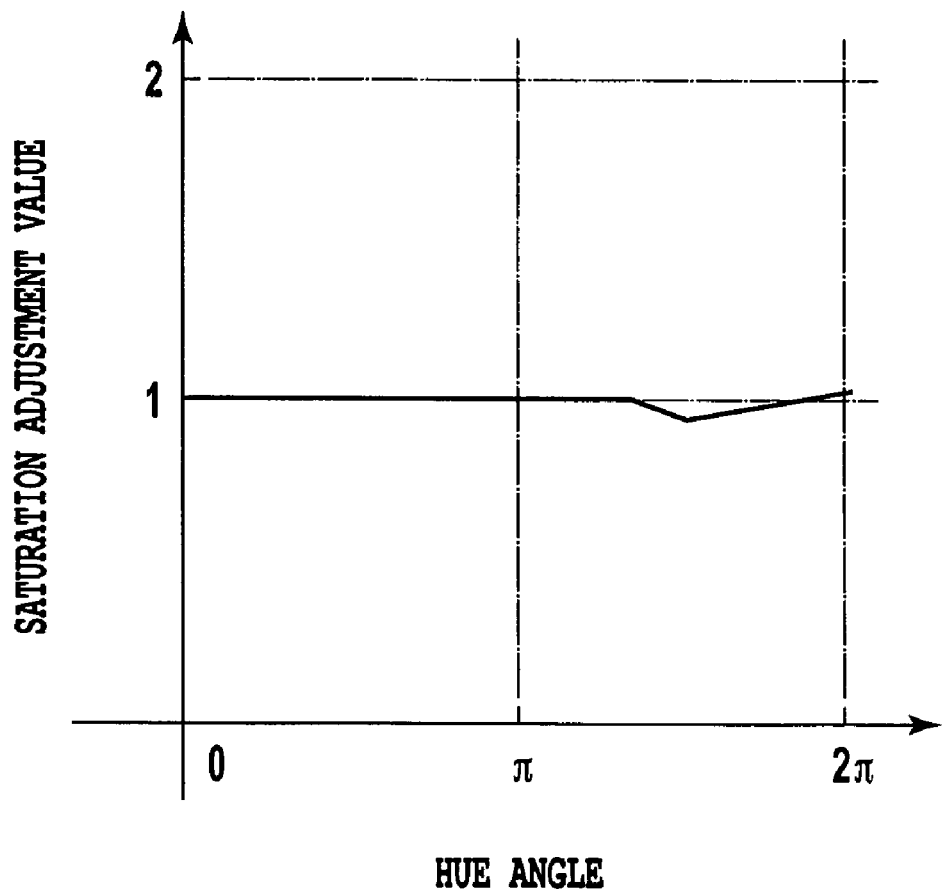
FIG. 13 is a graph showing a chroma adjustment value calculating function according to the above embodiment.

In FIG. 12, first, in step S1101, the color M to undergo a mapping is specified. The color M is in the second intermediate mapped color reproduction area. As previously described in step S801 of FIG. 9, the color M is acquired in association with the corresponding lattice point according to the present LUT generating process. Then, in step S1102, a saturation adjustment value Ch for the specified color M is calculated as shown below using a predetermined saturation adjustment value calculation function ChTune(•). Here, according to the present embodiment, Hue_m denotes the hue of the color M and the saturation adjustment value calculation function ChTune(•) is as shown in FIG. 13:

$$Ch = Ch\text{Tune}(Hue\_m)$$

Figure 14:
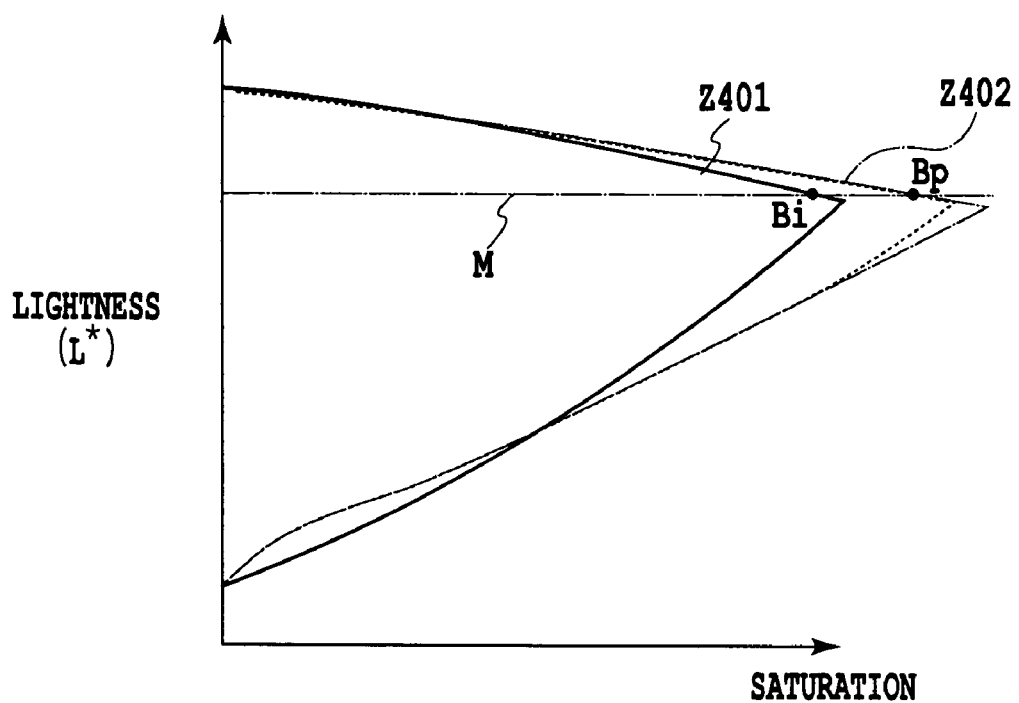
FIG. 14 is a graph illustrating a process of calculating the boundaries of a mapped color reproduction area and the boundaries of the second intermediate mapped color reproduction area at the same lightness/saturation as those of the color to be processed in the saturation conversion according to the above embodiment.

Then, in step S1103, a boundary Bp of the mapped color reproduction area Z402 (broken line) at the same lightness/same hue (in this figure, the hue Rs, which is the same of the color of the particular color ink) as that of the specified color M is calculated as shown in FIG. 14. Likewise, in step S1104, a boundary Bi of the second intermediate mapped color reproduction area Z401 (solid line) at the same lightness/hue as that of the color M is calculated.

Subsequently in step S1105, an input and output function q(•) for a saturation conversion is calculated on the basis of the colors Bp and Bi, calculated in the above steps. In this case, if the saturation of the color Bp is defined as cp and the saturation of the color Bi is defined as ci, then according to the present embodiment, the input and output function q(•) meets the conditions below:

The support of q(•) is [0, ci]

$$q(0) = 0$$

$$q(ci) = cp$$

$$q'(0) = Ch$$

$$q'(ci) = \gamma, \gamma{:}\gamma > 0$$

$$q'(x) \neq 0, x{:}0 \leq x \leq ci$$

γ is a preset value that controls an expansion/compression rate for a saturation conversion for the vicinity of the maximum saturation, and q' indicates a differential function for q.

Figure 15:
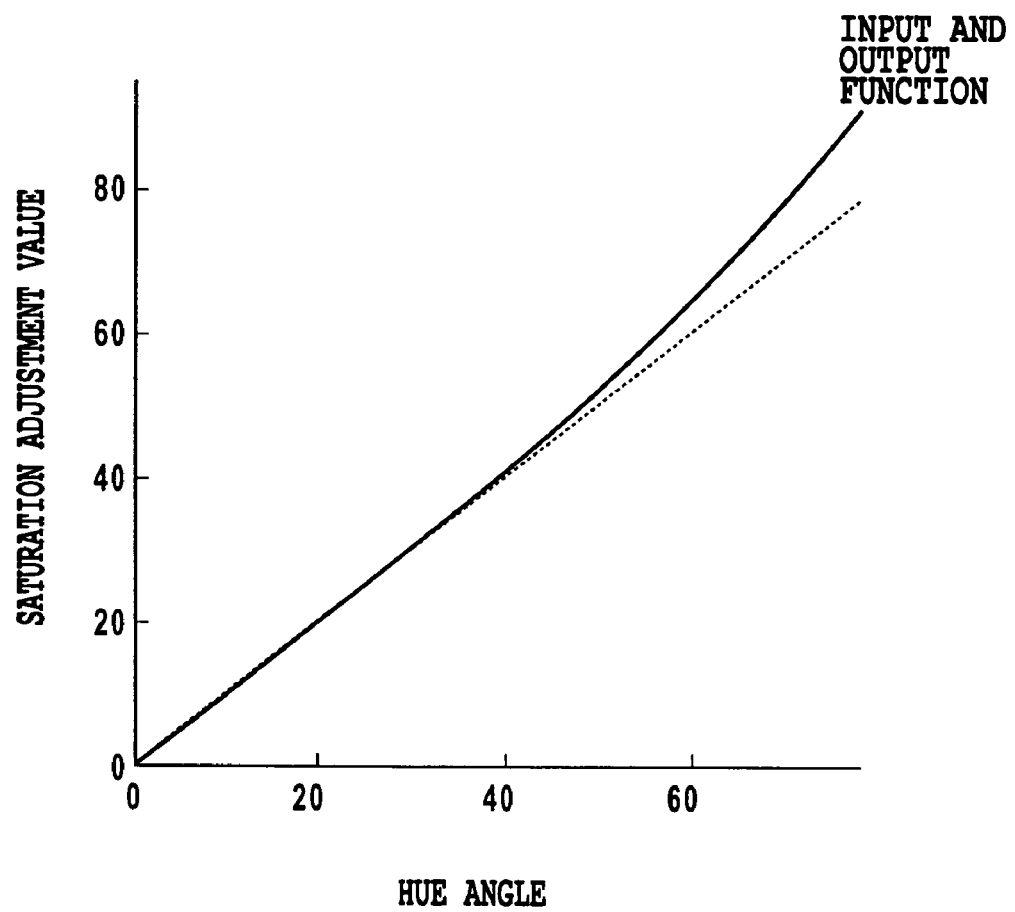
FIG. 15 is graph showing one of the input and output functions used for the saturation conversion according to the above embodiment which relates to a high-lightness part of the same hue as that of the particular color ink.

FIG. 15 is a diagram showing the input and output function q(•) for a high-lightness part of the hue Rs, which is the same as that of the special ink Red. As shown in this figure, the saturation adjustment value Ch(=q') is 1.0. Accordingly, a conversion is executed so as to maintain the saturation in a low- to middle-saturation part, while increasing the saturation in a high-saturation part. In this case, with this hue, a conversion is executed so as to hold a color such as a flesh color which has a relatively low saturation, while more brightly reproducing the red of a sunset, which corresponds to a high-saturation part.

Subsequently in step S1106, the input and output function q(•) determined in step S1105 is used to convert the saturation of the color M. When the saturation of the color M is represented as Corg and the converted saturation is represented as Cmod, Cmod=q(Corg).

Finally, in step S1107, it is checked whether or not the saturation mapping process has been executed on all the lattice points (color M) of the LUT. Steps S1102 to S1105 are repeated until the process has been finished on all the lattice points. The above process allows the second intermediate mapped color reproduction area Z401 to be mapped to the mapped color reproduction area Z402 as shown in FIG. 3.

Figure 16:
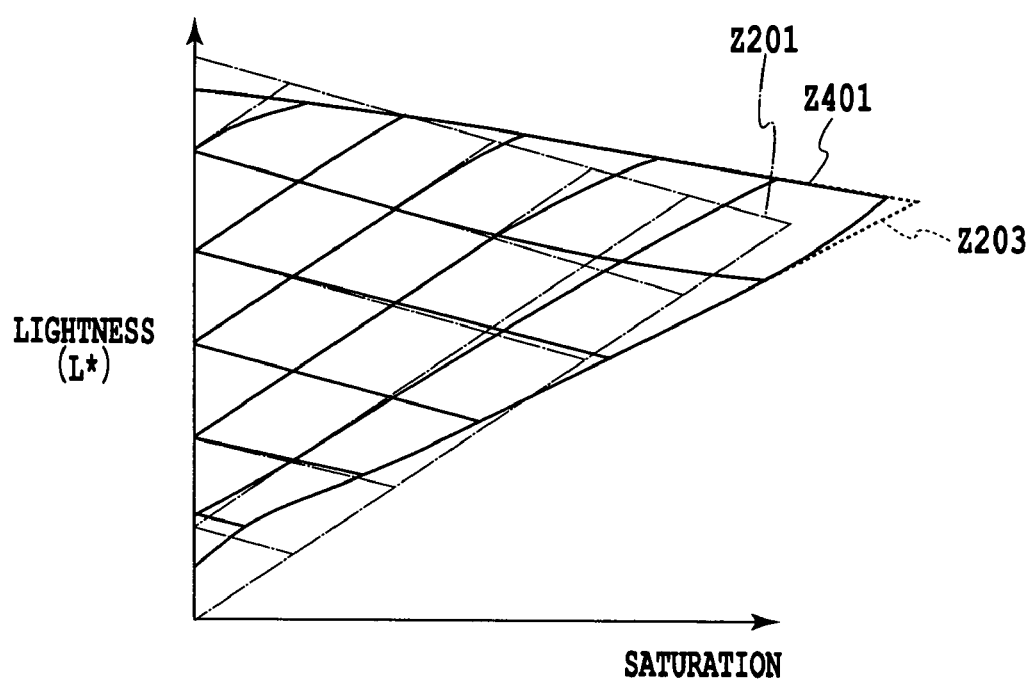
FIG. 16 is a diagram showing a conversion relationship from a monitor color reproduction area into a final mapped color reproduction area, in an LUT generating process relating to a precedent process according to the above embodiment.

As described above, particularly for the hue Rs, which is the same as that of the particular color ink red, and its nearby hues, the LUT generating process according to the precedent process of the present embodiment can provide a conversion relationship from the monitor color reproduction area Z201 (alternate long and short dash line) to the final mapped color reproduction area Z401 (solid line). Specifically, for the hue of the particular color ink such as red or orange as well as its nearby hues, a gamut exceeding the gamut of the monitor is obtained. As a result, for these hues, it is possible to execute a conversion in which the saturation is increased in a part of the color reproduction area of the monitor using data R, G, and B in conformity with the sRGB standard, the part having a higher lightness than a maximum-saturation part, as shown in FIG. 16, for example, a conversion in which the red of the sunset, corresponding to a high-saturation part, is more brightly reproduced. Further, in this high-saturation part, a conversion is executed so as to increase the magnitude of a change in lightness consistently with the value of the lightness as previously described in FIG. 11. Therefore, a gamut conversion can be accomplished by effectively utilizing the gamut realized by the particular color ink.

In the above description of the precedent process, a gamut conversion is executed in which if the use of the particular color ink red results in the gamut of the printer being larger than that of the monitor, then for the hue which is the same as that of the red ink as well as its nearby hues, the saturation is increased in a high-saturation part and the magnitude of a change in lightness is increased consistently with the value of the lightness. However, even with other particular color printing materials, a similar gamut conversion can be executed on the hue with which the gamut of the printer is larger than that of the monitor.

(Subsequent Process)

Figure 17:
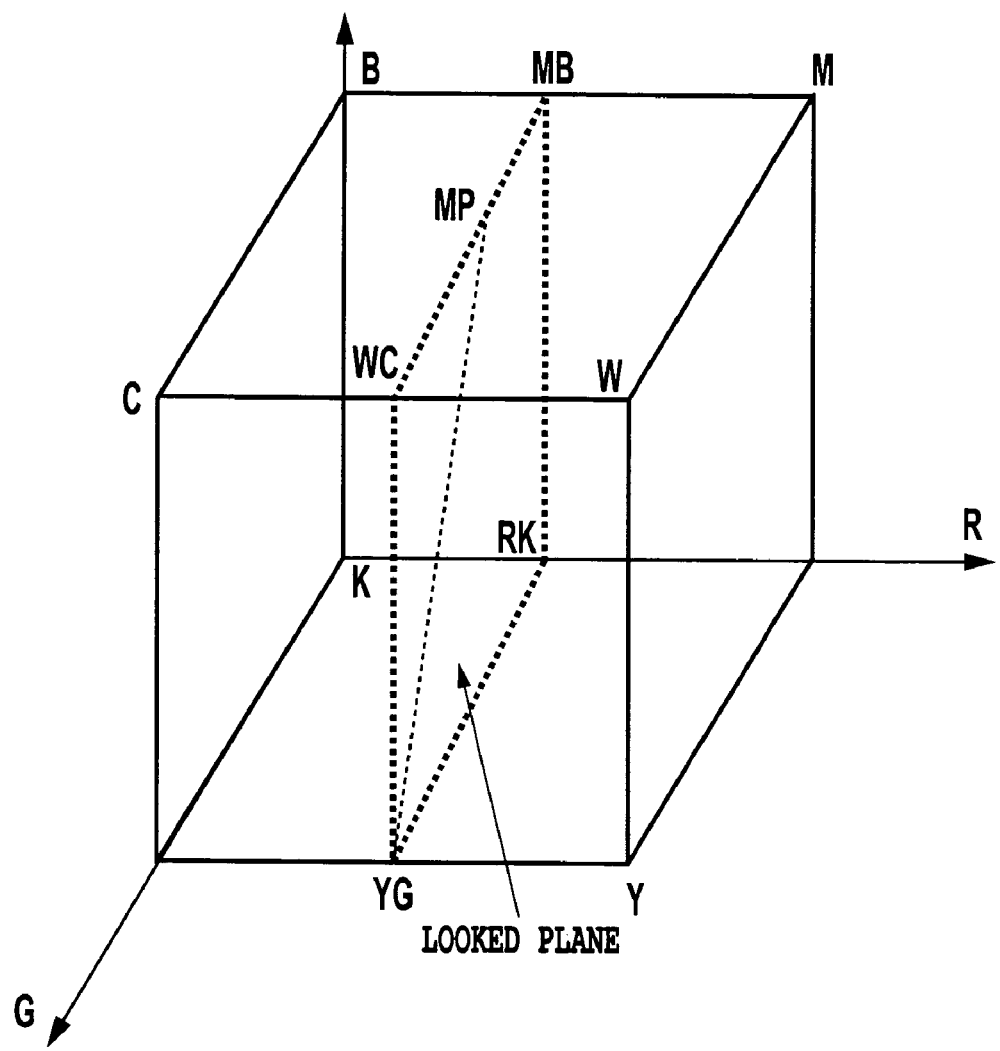
FIG. 17 is a diagram showing the concept of a color separation LUT.

The subsequent process according to the present embodiment reads lattice point data using an LUT and carries out an interpolation process on the basis of the lattice point data to convert input data R, G, and B to generate color separation data C, M, Y, K, R, G, B, as previously described in FIG. 1. The LUT, the concept of which is shown in FIG. 17, stores the color separation data as lattice point data for the LUT in order to realize gradation values, described later, or a gamut. That is, the conversion relationship indicated by the LUT represents the contents of the implementation of the method of generating color separation data according to the present embodiment. However, of course, the implementation of the method of generating color separation data is not limited to such a form as uses an LUT. For example, a mathematic operation based on an equation expressing the above conversion relationship is performed on the input data R, G, and B to obtain color separation data.

Figure 18:
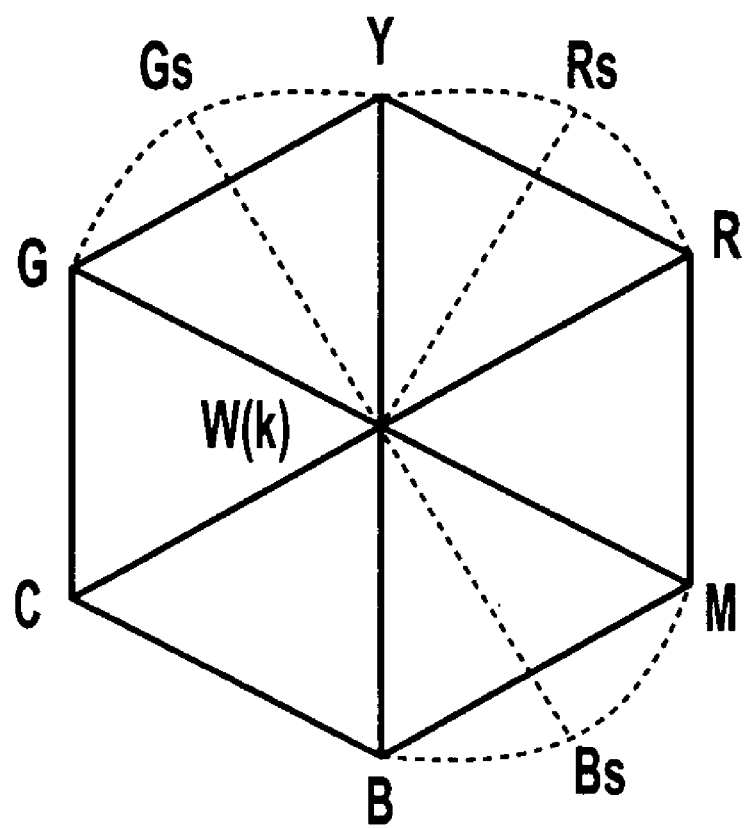
FIG. 18 is a diagram showing a gamut reproduced by the whole color separation data according to the first embodiment.

FIG. 18 is a diagram schematically showing a gamut reproduced by the whole color separation data according to the present embodiment. This figure represents an a*b* plane in the CIEL*a*b* space.

In this figure, the hexagon shown by a solid line shows a gamut that can be expressed using the basic color inks cyan, yellow, magenta, and black, which are used in the present embodiment. A broken line shows an enlarged gamut that can be expressed using the particular color inks red, green, and blue according to the present embodiment in addition to the basic color inks. In this gamut, hues Rs, Bs, and Gs belong to the particular color inks red, blue, and green, respectively. This clearly indicates that the particular color inks according to the present embodiment are selected so that their hues Rs, Bs, and Gs are present between the hues Y and R, between the hues M and B, and between the hues G and Y. Further, the particular color inks red, green, and blue, used in the present embodiment, can realize a gamut with a higher lightness and saturation than colors of the same hues realized by an ink system which does not use these particular color inks but which includes the basic color inks yellow, magenta, and cyan, with black added as required. In the specification, the expression that a particular color printing material has a "high saturation" and a "high lightness" is used in the above meaning unless otherwise specified. Such a high saturation and lightness enables the reproduction of a gamut larger than that provided by the above ink system. Description will be given of two features, how the particular color ink red according to the embodiment of the present invention is used, that is, how color separation data R corresponding to the red ink is set for the lattice points of the LUT and how the resulting gamut is enlarged.

The first feature is that color separation data is generated so that the red ink, a particular color printing material, is used on the low-lightness side of all the hues shown in FIG. 18, specifically, on a side (side K) with a lightness lower than that at the maximum saturation of each hue. By thus using the particular color ink red having a high saturation and lightness on the low-lightness side, it is possible to reduce the rate of a decrease in saturation with respect to a decrease in lightness. As a result, the reproducible gamut can be enlarged.

Figure 19:
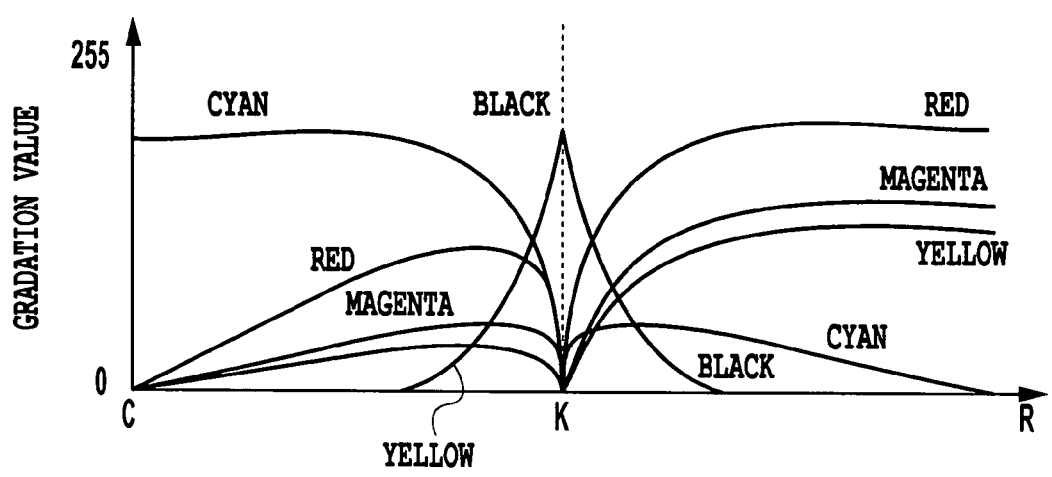
FIG. 19 is a graph showing an example of the use of the red ink in the low-lightness side of the color separation LUT according to the first embodiment.

FIG. 19 shows an example of the use of the red ink on the low-lightness side. This figure shows color separation data on lattice points along a line from the maximum saturation point of the hue R in the L*a*b* space through the point of the color K, which has the lowest lightness, to the maximum saturation point of the hue C.

As shown in FIG. 18, the yellow and magenta inks as well as the red ink are used in low-lightness areas R-K and K-C. If the yellow and magenta inks are used which enable the secondary colors to constitute the hue R, then since these inks basically have a lower saturation and lightness than the red ink and are secondary colors, the saturation decreases rapidly as compared with the decrease in lightness. In contrast, in the present embodiment, the red ink, having a high saturation and lightness, is used together with the yellow and magenta inks, and the amounts of yellow and magenta inks used decrease relatively. This makes it possible to reduce the rate of decrease in saturation with respect to the decrease in lightness. As a result, the low-lightness side of the gamut can be enlarged in the directions of saturation and lightness.

As described above, the red ink is used on the low-lightness side of all hues, and in particular, the red ink is used for the hue opposite to hue Rs of the red ink as well as hues B, C, and G nearby the opposite hue. Consequently, not only the gamut is enlarged as described above but the colors can also be jointed to one another more smoothly. This will be described below.

Figure 20:
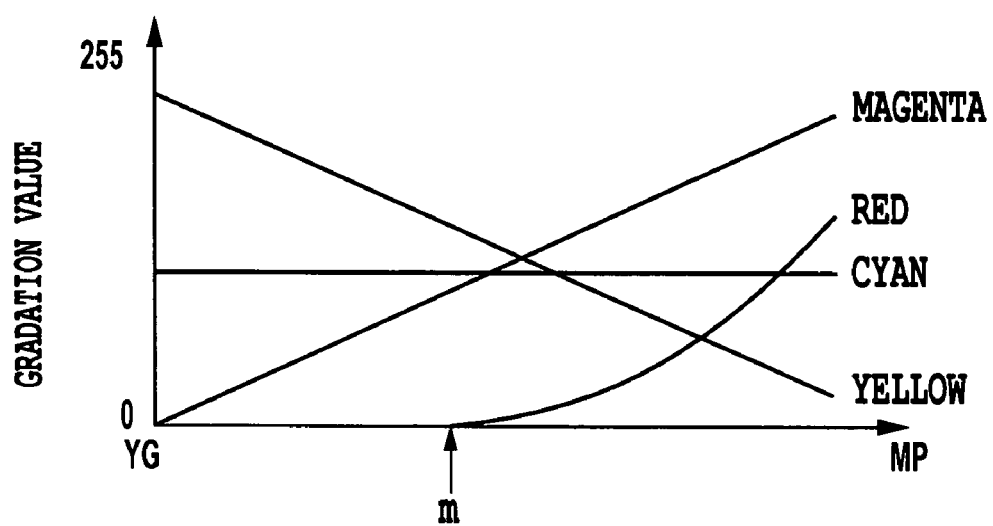
FIG. 20 is a graph showing color separation data of a lattice point on predetermined lines in a color separation data LUT according to a conventional example.
Figure 21:
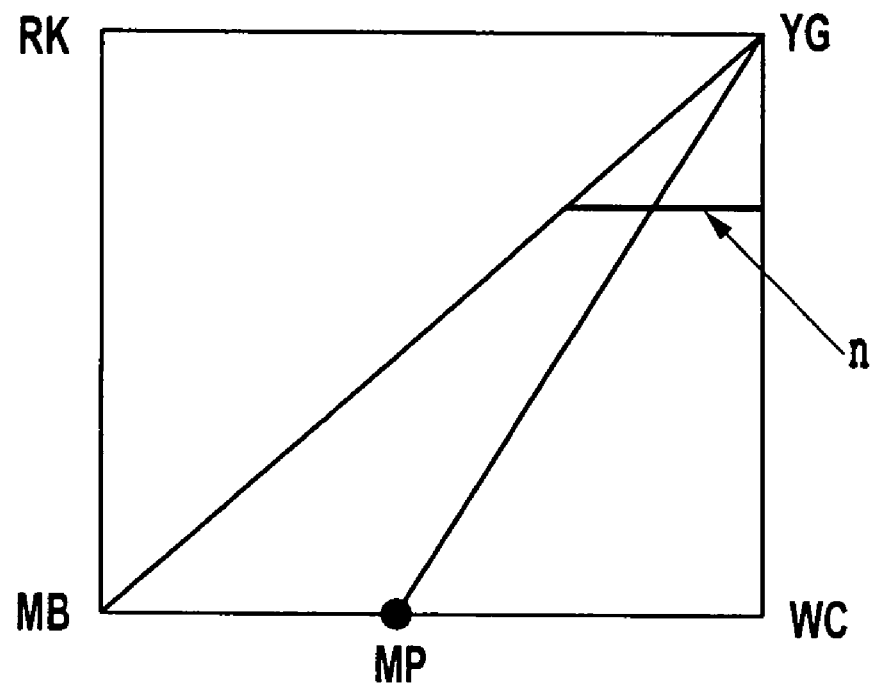
FIG. 21 is a graph illustrating a false contour in a gradation image resulting from a variation in combination of color materials.

FIG. 17 is a graph conceptually showing an LUT for generating color separation data. By taking a surface RK-YG-WC-MB composed of the lattice points of the LUT, by way of example, description will be given of the discontinuity of the junctions between gradations or colors. This surface has lattice points RK (an intermediate point of a line joining R to K; R, U, B=128, 0, 0), YG (an intermediate point of a line joining Y to G; R, G, B=128, 255, 0), WC (an intermediate point of a line joining W to C; R, G, B=128, 255, 255), and MB (an intermediate point of a line joining M to B; R, G, B=128, 0, 255) as vertices. Color separation data is stored as data on lattice points on the sides of surface and inside the surface. By way of a comparative example, according to the generation of color separation data described in Japanese Patent Application Laid-Open No. 2000-32284, described above for FIG. 68, color separation data on lattice points on a straight line YG-MP joining one YG of the vertices of the surface RK-YG-WC-MB to an arbitrary intermediate point MP on a side WC-MB is as shown in FIG. 20 for the printing material (ink) red. That is, the printing material red starts to be used at a use start point m in the middle of the straight line YG-MP. As a result, a combination of printing materials used changes significantly at the use start point. In this case, as shown in FIG. 21, in a gradation image with its color varying from the one (represented by color separation data) of the lattice point YG to each of the ones of the lattice points MB and WC, the gradation or color may be discontinuous. This may result in a false contour n in a part of the straight line YG-MP which contains the use start point m.

Figure 22:
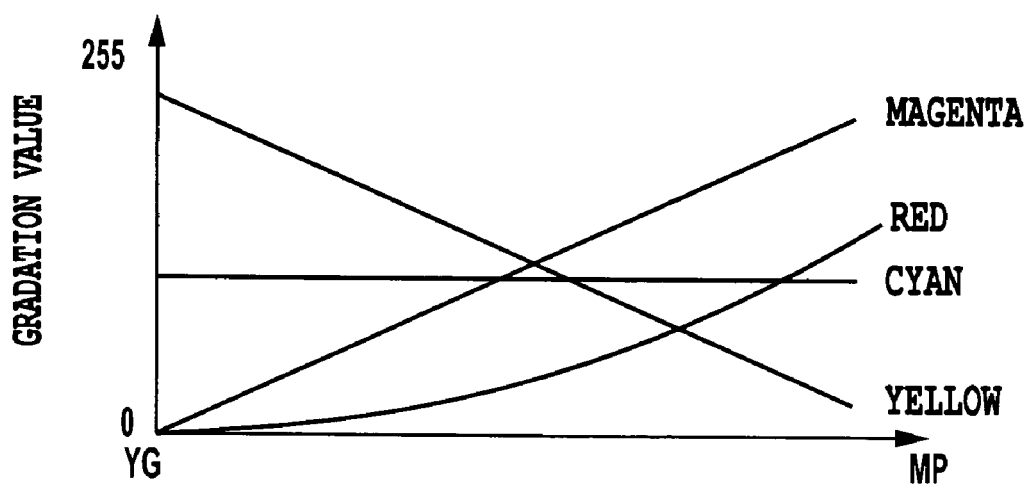
FIG. 22 is a graph showing color separation data of a lattice point on predetermined lines in a color separation data LUT according to the first embodiment.
Figure 68:
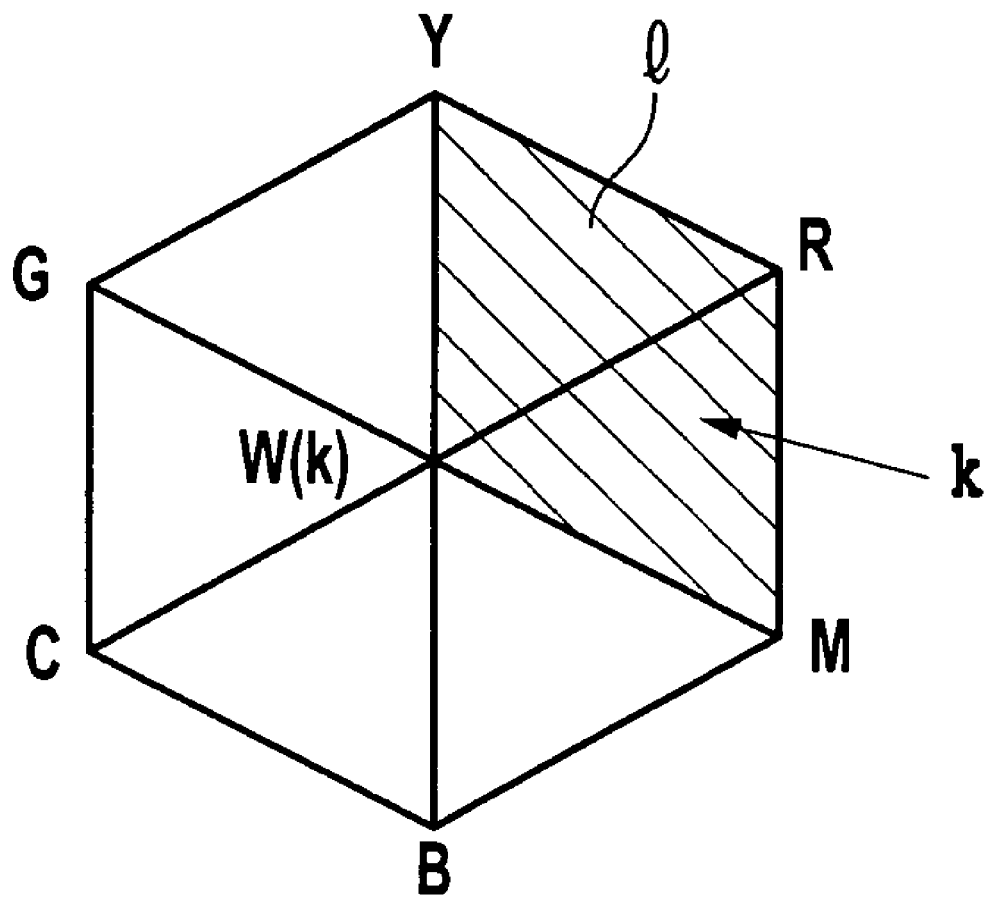
FIG. 68 is a diagram showing a conventional example of generation of color separation data in which a gamut is reproduced by appropriately combining inks including particular color ones together.

In FIG. 20, the area in which the printing material red is not used corresponds to a low-lightness area of the opposite of the hue Rs of the red in the L*a*b* space, shown in FIG. 68, and its nearby hues. In the present embodiment, the red ink is used in this area as described above. FIG. 22 represents this and shows color separation data on the lattice points along the straight line YG-MP. As shown in this figure, the ink used along this straight line is not switched. Accordingly, the gradation or color varies smoothly along the straight line. This makes it possible to avoid a false contour resulting from the discontinuity of the gradation in, for example, a printed image.

A second feature of the use of the red ink is that when red ink, as the particular printing material, is used for the hue Rs and its nearby hues, the gamut is enlarged particularly in high lightness and high saturation areas and that the gamut is generally enlarged by generating color separation data so as to prevent the gamut from narrowing in a low lightness area.

Figure 23:
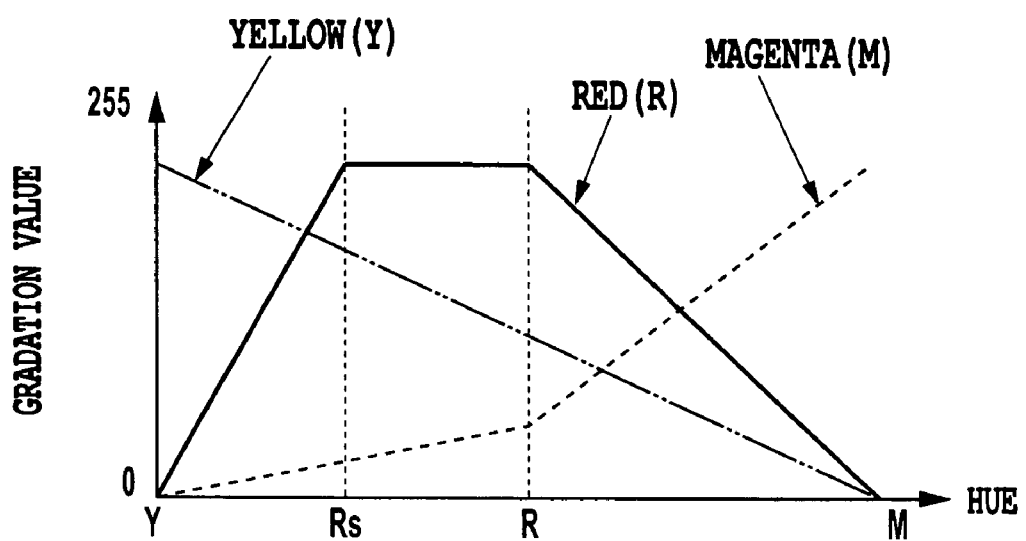
FIG. 23 is a graph showing color separation data used to reproduce a color having the highest saturation at a predetermined hue in a part of the gamut shown in FIG. 18 which belongs to an a*b* plane containing the maximum saturation point of the hue R.

FIG. 23 shows gradation values (color separation data) which reproduce colors having the maximum saturation of the hue Y-Rs-R-M in the a*b* plane of the gamut shown in FIG. 18 which plane contains the maximum saturation point of the hue R.

As shown in FIG. 23, the present embodiment uses such color separation data as uses the following three types of ink at the maximum saturation point of the hue R: the particular color ink red, and the basic-color inks yellow and magenta. These inks are used in order to generally enlarge the gamut as described above. This will be described below.

Figure 24:
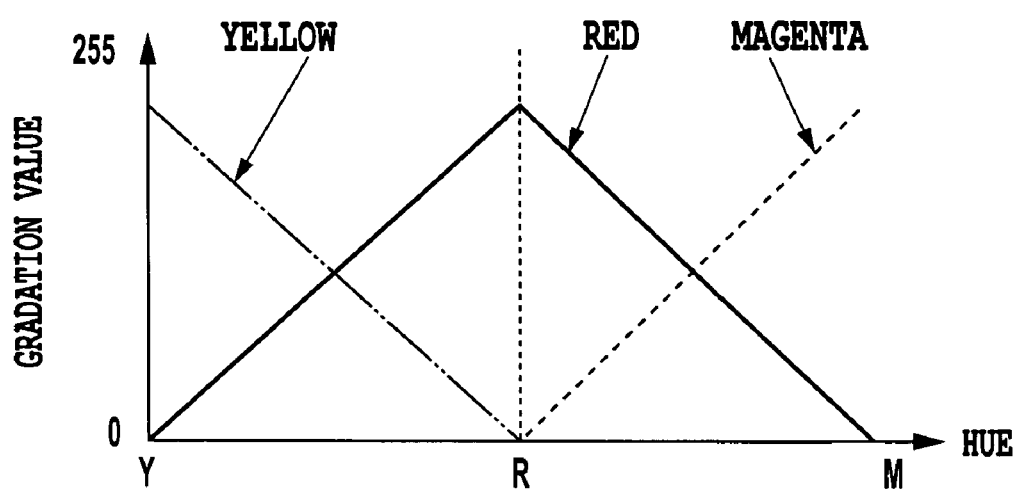
FIG. 24 is a graph showing similar color separation data on the same hues as those shown in FIG. 23, the data being used to express the maximum saturation point of the hue R using only the particular color ink red.

FIG. 24 shows similar color separation data on the same hue Y-Rs-R-M as that shown in FIG. 23 wherein the maximum saturation point of the hue R is expressed using only the particular color ink red. Given such color separation data, the yellow ink is used only in the area Y-Rs-R. The primary color (referring to the color expressing the maximum saturation of the hue herein) of the hue R is expressed only by the particular color ink red as described above.

Figure 25:
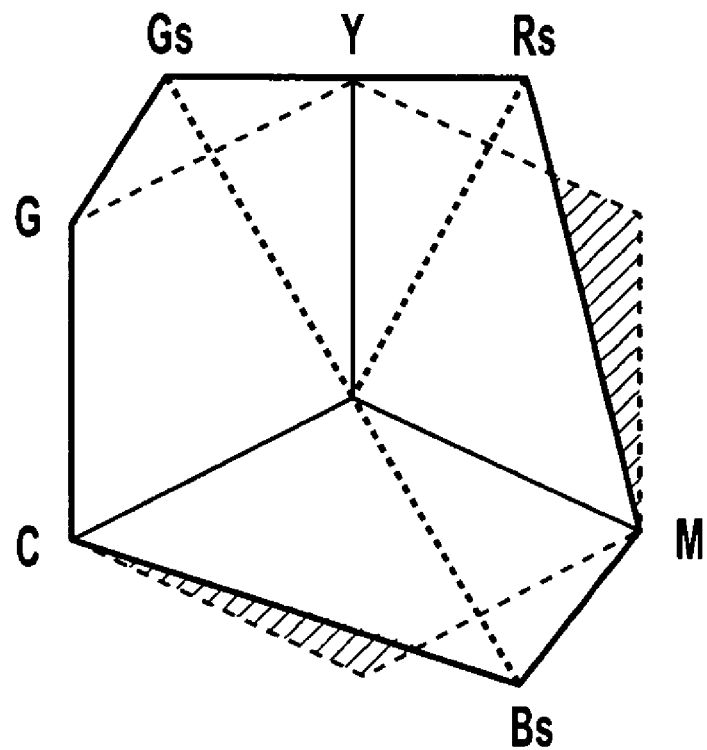
FIG. 25 is a diagram showing the case in which particular color inks red, green, and blue are independently used to express hues R, G, and B, respectively and the case in which these hues are expressed without using these particular colors.

However, in this case, the hue Rs of the particular color ink red according to the present embodiment is biased toward the hue Y compared to the hue R of the C, M, Y, and K system, which does not use any particular colors, as previously described with regard to FIG. 18. Consequently, some of the colors that can be expressed by the system not using any particular colors may not be expressed. This will be described with reference to FIG. 25. In the gamut represented by the solid line in the figure, each of the hues R, G, and B is expressed using only the particular color ink red, green, or blue, respectively. The gamut represented by the broken line corresponds to the system not using any particular colors. As is apparent from this figure, the gamut obtained by using only the particular color inks for the hue R and others does not fully cover the gamut of the system not using any particular colors (the shaded gamut in FIG. 25).

Figure 26:
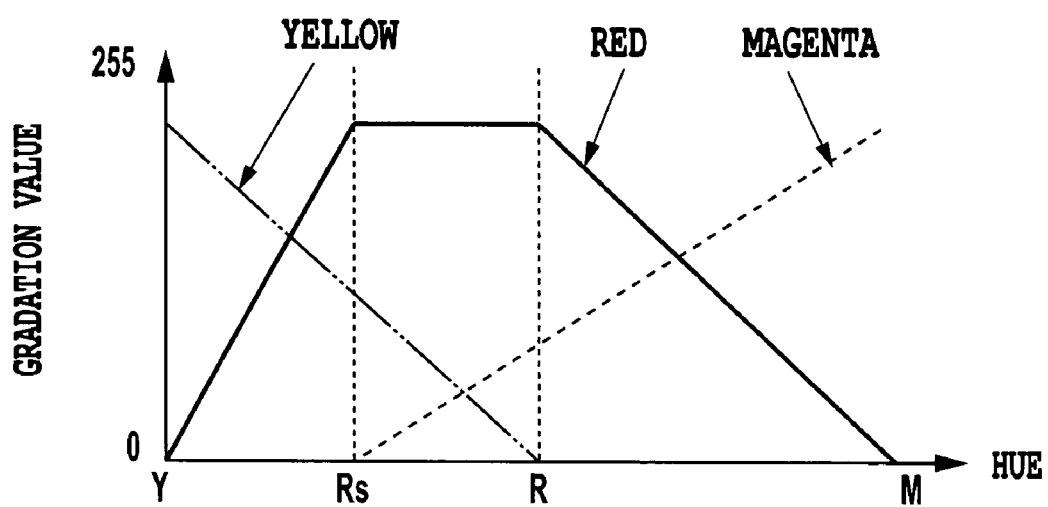
FIG. 26 is a graph showing that the primary color of the hue R is expressed using a secondary color produced using the particular color ink red and an ink magenta.

It is thus contemplated that the primary color of the hue R may be expressed using a secondary color produced using the particular color inks red and magenta as shown in FIG. 26. In this case, the primary color of the hue R is expressed by mixing the particular color ink red having a lightness L* of about 85 with the magenta ink having a lightness L* of about 40, almost half the lightness of the red ink. Then, the primary color has a lightness L* of 70. In contrast, with the system not using any particular colors, the primary color of the hue R is expressed by mixing the yellow ink having a lightness L* of about 90 and the magenta ink having a lightness L* of about 40 together in almost the same quantity. Then, the primary color of the hue R has a lightness L* of about 60. Thus, there is not a significant difference in lightness for the hue R. However, in this case, it may be impossible to express a low-lightness part of the gamut which can be expressed by the system not using any particular colors.

Figure 27:
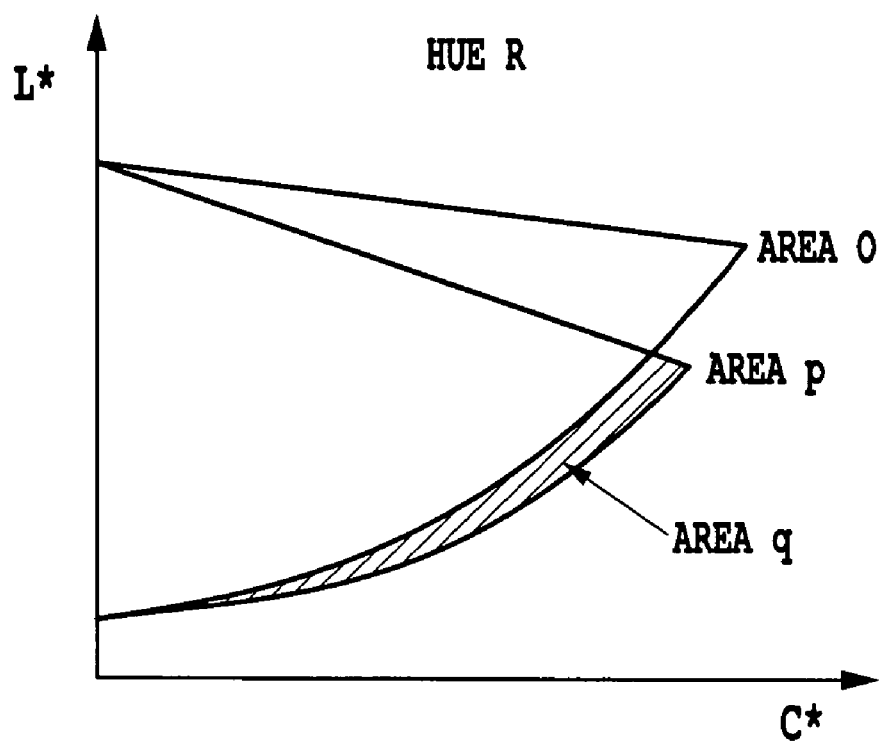
FIG. 27 is a graph showing the case in which the primary color of the hue R is expressed using the secondary color produced using the particular color ink red and an ink magenta and the case in which the primary color is reproduced using an ink system that does not use these particular colors, the cases being represented by a plane of a lightness L* and a saturation C* in an L*a*b* space.

FIG. 27 illustrates the above point. This figure represents the gamut of the hue R using a plane of the lightness L* and saturation c* of the L*a*b* space. In the figure, a gamut o corresponds to the case where the primary color of the hue R is composed of the secondary color produced using the particular color inks red ad magenta as shown in FIG. 26. On the other hand, a gamut p corresponds to the case where the primary color of the hue R is reproduced by the system not using any particular colors, specifically, the primary color is composed of a secondary color of Y and M. For a lower-lightness area of each gamut below the maximum saturation, printing materials of complementary colors (opposite colors) cyan, green, blue, and black are added in order to express gradation from the color of the maximum saturation to black K. In this case, as shown in the figure, in a high-lightness area, there is a color space that can be expressed using the particular color red. However, there is a gamut such as a shaded area q which cannot be reproduced by a low-lightness area of the gamut of the system not using any particular colors.

Figure 28:
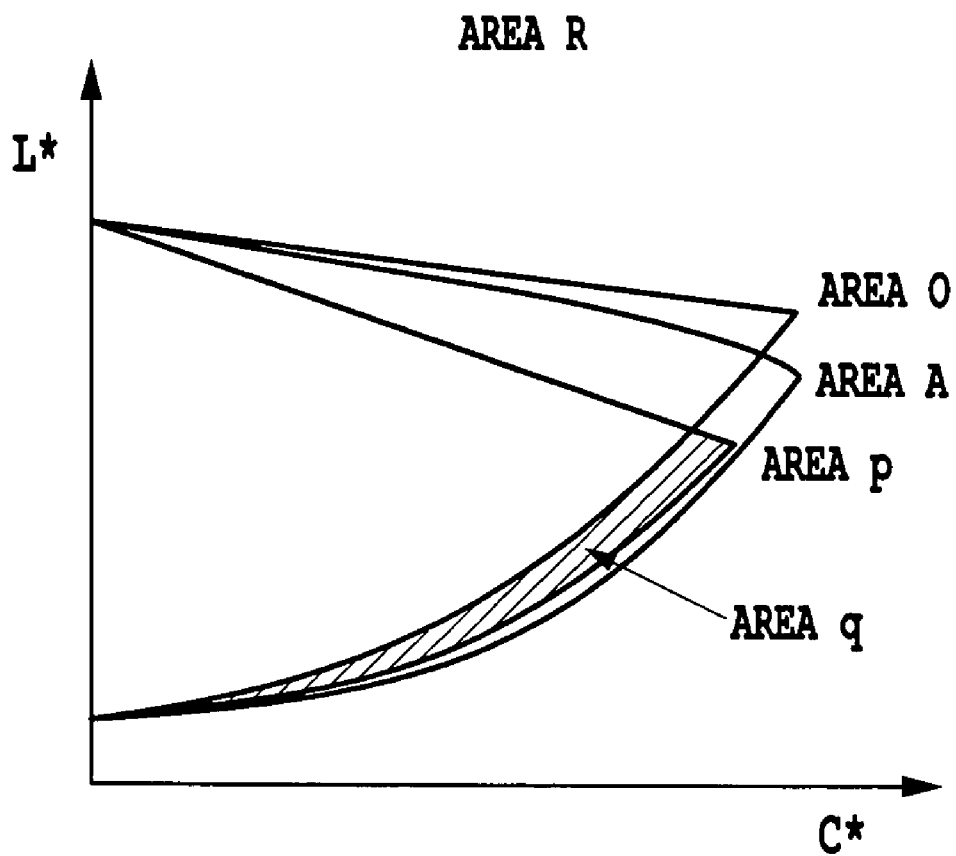
FIG. 28 is a graph showing the gamut A of the hue R according to the first embodiment as in the case of FIG. 27.

FIG. 28 shows the gamut A of the hue R according to the present embodiment, similarly to FIG. 27. The gamut A is realized by the color separation table shown in FIG. 23. Specifically, the maximum saturation point of the hue R is expressed using a tertiary color of the particular colors red, yellow, and magenta as shown in FIG. 23. Colors having a high lightness compared to the maximum saturation are also expressed using similar tertiary colors. For an area with a low lightness compared to the maximum saturation point, cyan, green, and black are added to these tertiary colors. In FIGS. 19 and 22 according to the present embodiment, showing color separation data on the low-lightness area, color separation data on green and blue is omitted.

As shown in FIG. 28, when the color of the maximum saturation in the gamut A is expressed using the tertiary colors, the gamut o, in which the primary color is composed of the secondary color produced using the particular color inks red and magenta, has a slightly lower lightness. That is, in the present embodiment, the particular color inks red, yellow, and magenta are used as printing materials constituting the primary color of the hue R (see the hue R in FIG. 23). For a low-lightness area, cyan and other color inks are added to the above particular color inks. Then, for a high-lightness area, the color space expressed using the particular color red can be enlarged. Furthermore, the gamut of the low-lightness area of this hue can be generally enlarged to cover the above described area q.

The color separation for the contour of the gamut of the hue R can cover all the areas o, A, p, and q, shown in FIG. 28, by using the secondary color produced using the particular colors red and magenta for a part of the area o which has a high lightness compared to the maximum saturation, and for the maximum saturation and a low-lightness area, using the inks according to the present embodiment. However, in this case, the yellow ink starts to be used at the maximum saturation point for the first time. This may prevent the smooth joining of the colors.

In the above embodiment, description is given of the two features of the gamut enlargement using the particular color printing material red. However, this is also applicable to the other particular color printing materials including green and blue, used in the present embodiment. Obviously, provided that these printing materials have a higher saturation and lightness higher than the secondary colors of the basic-color printing materials such as yellow, magenta, and cyan, the above description is similarly applicable.

A specific technique to set the above described color separation data as lattice point data for the LUT may be a well-known one. For example, a combination of some of Y, M, C, K, R, G, and B is used as print data to print patches using the printer according to the present embodiment. Then, target colors are set as the colors in the color separation shown in FIGS. 19 and 22 in connection with the gamut of the color of the hue R, described above for FIG. 28, and other predetermined hues such as G and B. A set of color separation data Y, M, C, K, R, and G that realizes the target colors is then determined by interpolating colorimetric data on the L*a*b* space obtained by subjecting the patches to colorimetry. The color separation data Y, M, C, K, R, G, and B thus determined is set as lattice data on the lattice points identified by the corresponding input data R, G, and B in the LUT shown in FIG. 17. Then, the lattice data determined for each of the predetermined hues as described above is interpolated to determine lattice point data (color separation data) on other lattice points. As a result, an LUT can be created which is used for the subsequent process J0003.

(Halftone Processing Section)

The halftone processing section J0005 will be described below. In the description below, the minimum constitution unit to undergo image processing using multi-valued data represented by a plurality of bits is called a pixel. Data corresponding to the pixel is called pixel data. In view of FIG. 1, the image processing using multi-valued data represented by a plurality of bits is a subsequent process of converting 8-bit data on R, G, and B into 8-bit data for each of the colors C, M, Y, K, R, G, and B corresponding to the ink colors used in the printer or a halftone process of quantizing 8-bit data on C, M, Y, K, R, G, and B into 4-bit data on C, M, Y, K, R, G, and B. In other words, the "pixel" is the minimum unit that can be expressed using gradations and has gradation value information of a plurality of bits.

Figure 29:
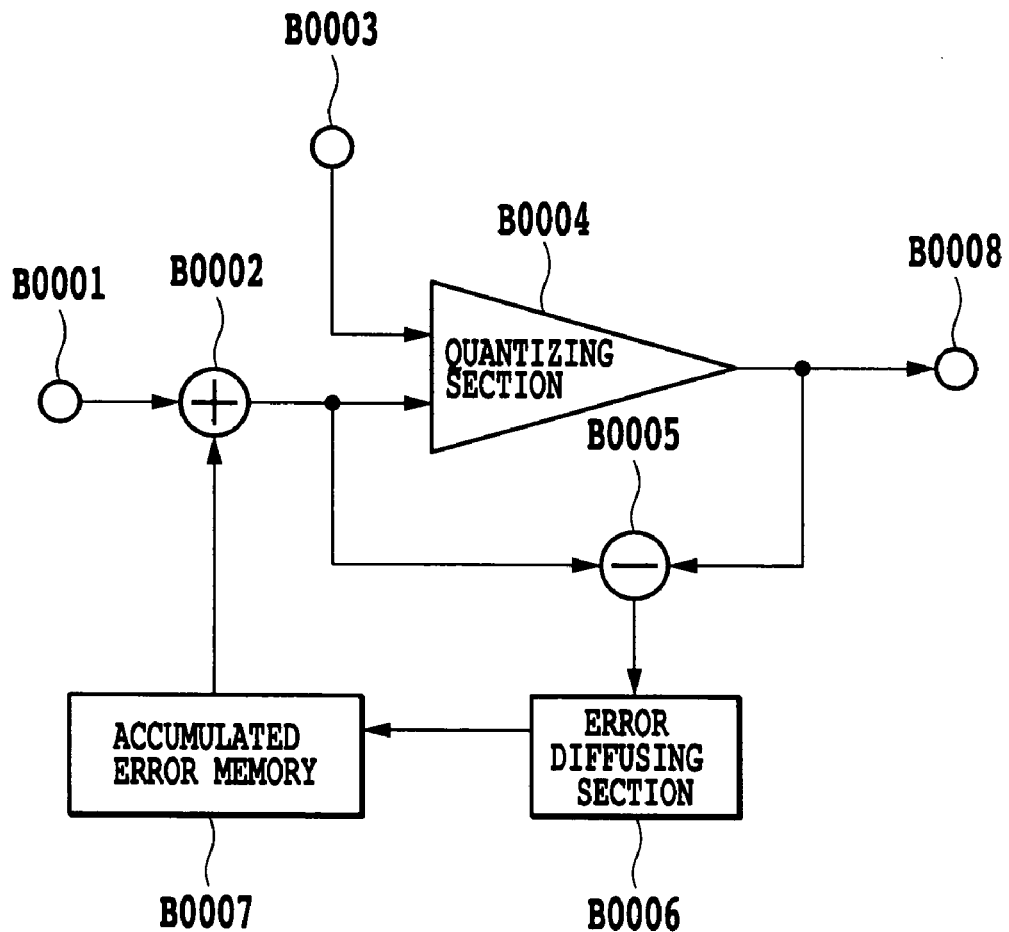
FIG. 29 is a block diagram of a halftone processing section according to the first embodiment of the present invention.

FIG. 29 is a block diagram illustrating the configuration of the halftone processing section applicable to the embodiment of the present invention. In this figure, B0001 denotes an input terminal for image data, B0002 denotes an accumulated error adding section, and B0003 denotes a terminal that sets a quantization threshold value used to convert input pixel data into two or more gradation numbers. B0004 denotes a quantization section, B0005 denotes an error calculating section that calculates a quantization error, and B0006 denotes an error diffusing section that diffuses a quantization error. B0007 denotes an accumulated error memory that stores accumulated errors and B0008 denotes an output terminal for pixel data formed after a series of processes.

Pixel data on a number of pixels selected by an image scanning section, described later, is sequentially inputted to the input terminal B0001 of the halftone processing section. The halftone processing section sequentially processes the inputted individual pixel data and then outputs the processed data from the output terminal B0008 for each pixel.

Figure 31:
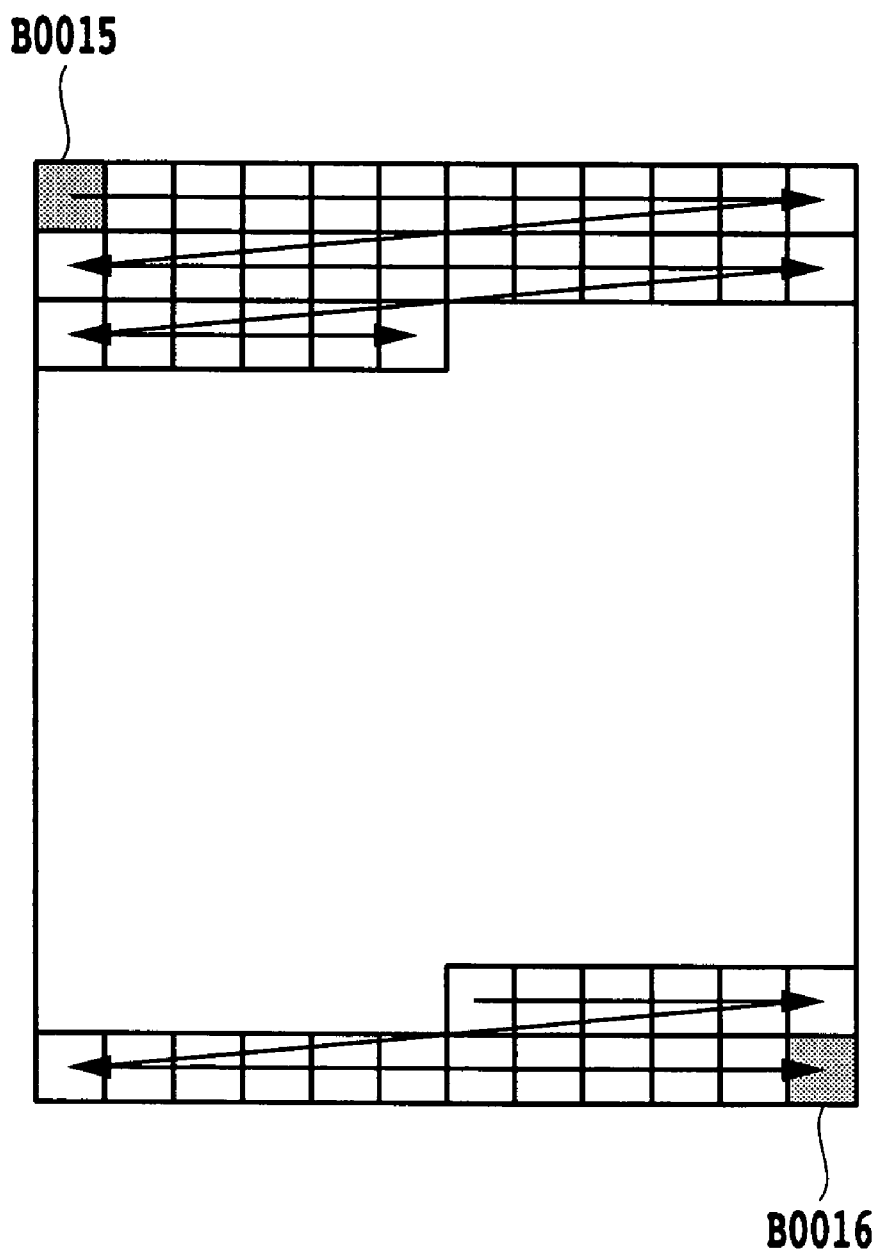
FIG. 31 is a diagram showing the details of an image scan.

FIG. 31 shows a processing scan executed by the image scanning section. The image scanning section selects each pixel to be processed from image data in which a plurality of pixels are arranged. The image scanning section then inputs the pixel data to the input terminal B0001 of the halftone processing section. In the figures, the frames indicate the individual pixels. B0015 denotes a pixel located at the upper left end of the image. B0016 denotes a pixel located at the lower right end of the image.

The processing scan of the image is started by setting the pixel B0015 at the upper left end of the image area as an pixel to be selected (hereinafter referred to as a focused pixel). Subsequently, the process proceeds by shifting the focused pixel to the one on the right, that is, in the direction of the arrow in the figure. Once the process is finished up to the right end of the uppermost row, the focused pixel is shifted to the left end of the pixel row immediately below. In this sequence, the processing scan proceeds along the arrow in the figure. Once the process reaches the pixel B0016 at the lower right end, the final pixel, the processing scan of the present image is completed.

Figure 30:
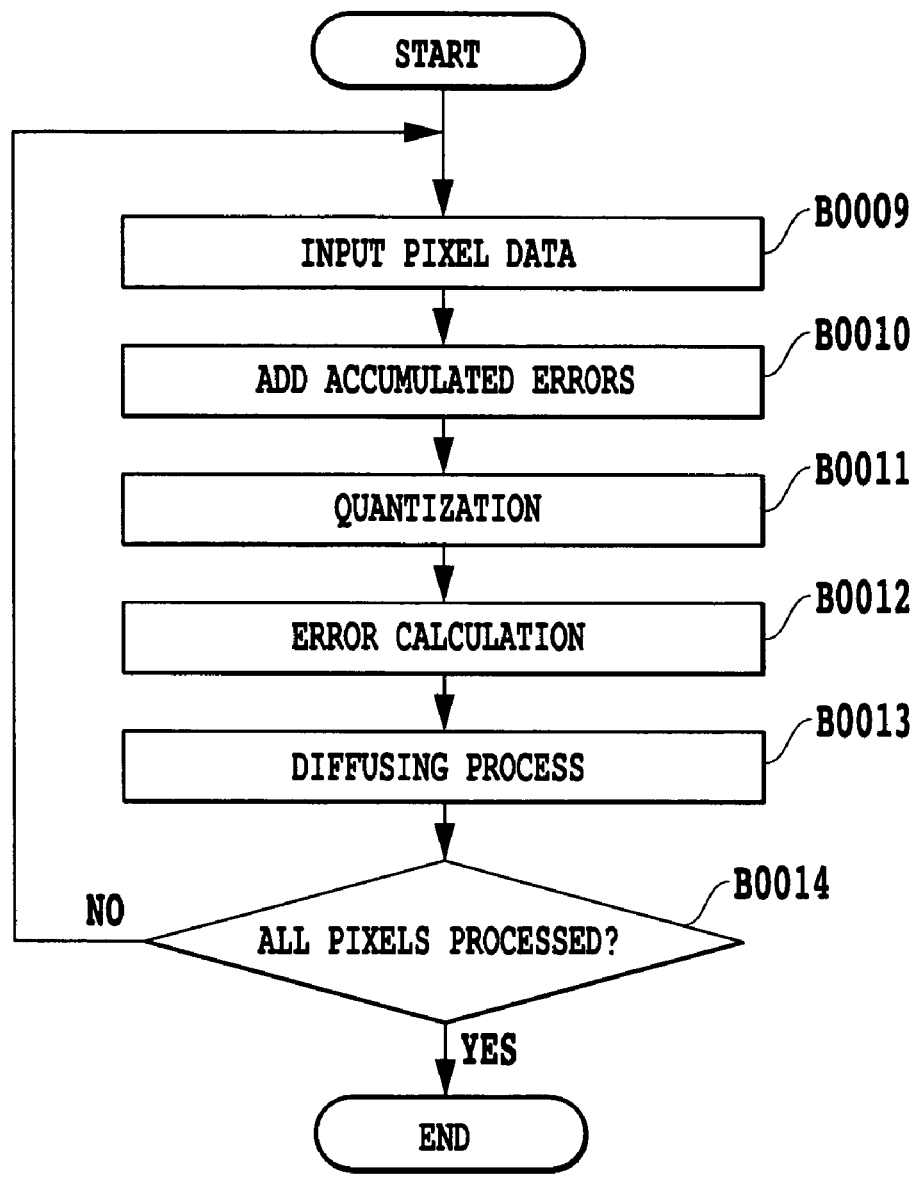
FIG. 30 is a flow chart illustrating operations of the halftone processing section in FIG. 29.

FIG. 30 is a flow chart illustrating the process of an operation performed by the halftone processing section in FIG. 29.

When the process is started, the image scanning section inputs pixel data to be processed (step B0009).

Then, the accumulated error adding section B0002 adds, to the inputted pixel data, an accumulated error value stored in the accumulated error memory B0007 and corresponding to the pixel position (step B0010).

Figure 32:
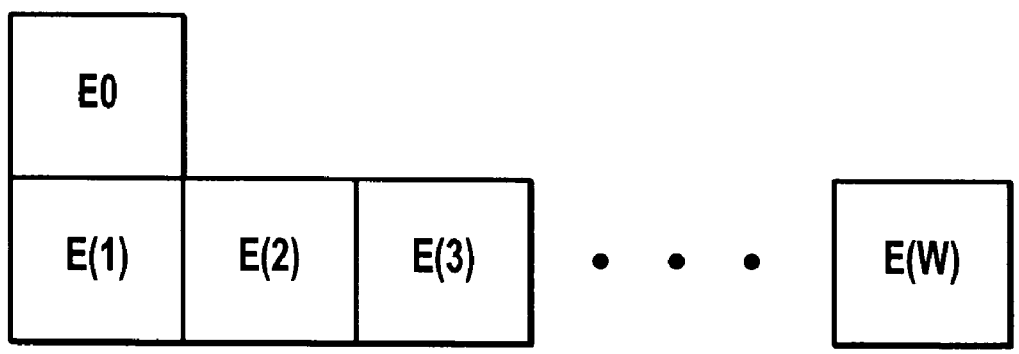
FIG. 32 is a diagram showing an accumulated error memory.

FIG. 32 illustrates data stored in the accumulated error memory B0007 and how the data is stored in the accumulated error memory B0007. The accumulated error memory B0007 has one storage area E0 and W storage areas E(x) (x is an integer of 1 to W). Here, W denotes the number of pixels contained in the pixel data to be processed, the pixels being arranged in a horizontal direction. A quantization error E(x) applied to the focused pixel is stored in each area. The value of a quantization error is obtained using a method described later. However, at the beginning of the processing, the value is initialized to 0 in all the areas.

In step B0010, the accumulated error adding section B0002 adds, to the inputted pixel data, the value in the error memory E(x) corresponding to the horizontal position x of the pixel (0<x≦W). Specifically, the pixel data inputted to the input terminal B0001 is defined as I, and the pixel data resulting from the addition of the accumulated error in the step B0010 is defined as I'. Then, the following equation is given:

$$I' = I + E(x)$$

In the subsequent step B0011, a quantization process is executed by comparing the pixel data I' resulting from the addition of the accumulated error I' with a threshold inputted through the threshold setting terminal B0003. Thus, the quantized image data is divided into nine levels to determine the value of output image data to be transmitted to the output terminal B0008. Specifically, if the pixel data inputted by the accumulated error adding section B0002 has an integer value ranging from 0 to 255, an output gradation value O is determined by the following equations:

$$O = 0 (I' < 16) \quad \text{(Equation 1)}$$

$$O = 32 (16' \leq I' < 48) \quad \text{(Equation 2)}$$

$$O = 64 (48 \leq I' < 80) \quad \text{(Equation 3)}$$

$$O = 96 (80 \leq I' < 112) \quad \text{(Equation 4)}$$

$$O = 128 (112 \leq I' < 144) \quad \text{(Equation 5)}$$

$$O = 160 (144 \leq I' < 176) \quad \text{(Equation 6)}$$

$$O = 192 (176 \leq I' < 208) \quad \text{(Equation 7)}$$

$$O = 224 (208 \leq I' < 240) \quad \text{(Equation 8)}$$

$$O = 255 (I' \geq 240) \quad \text{(Equation 9)}$$

For convenience of description, the output gradation values O will be referred to as follows: O=0, level 0; O=32, level 1; O=64, level 2; O=96, level 3; O=128, level 4; O=160, level 5; O=192, level 6, O=224, level 7; and O=225, level 8.

Then, the error calculating section B0005 calculates the difference between the pixel data I' resulting from the addition of the accumulated error and the output pixel value O, that is, a quantization error E (step B0012):

$$E = I' - O \quad \text{(Equation 10)}$$

Moreover, in step B0013, the error diffusing section B0006 executes a process of diffusing the error in accordance with the horizontal position x of the focused pixel as described below. Equation errors to be stored in the storage areas E0 and E(x) are calculated as shown below and stored in the accumulated error memory:

$$E(x+1) \leftarrow E(x+1) + E \times 7/16 \, (x<W) \quad \text{(Equation 11)}$$

$$E(x-1) \leftarrow E(x-1) + E \times 3/16 \, (x>1) \quad \text{(Equation 12)}$$

$$E(x) \leftarrow E0 + E \times 5/16 \, (1<x<W) \quad \text{(Equation 13)}$$

$$E(x) \leftarrow E0 + E \times 8/16 \, (x=1) \quad \text{(Equation 14)}$$

$$E(x) \leftarrow E0 + E \times 13/16 \, (x=W) \quad \text{(Equation 15)}$$

$$E0 \leftarrow E \times 1/16 \, (x<W) \quad \text{(Equation 16)}$$

$$E0 \leftarrow 0 \, (x=W) \quad \text{(Equation 17)}$$

In step B0014, it is determined whether or not the process steps B0009 to B0013 have been executed on all the pixels of the image. That is, it is determined whether or not the pixel selected by the pixel scanning section has reached B0016 in FIG. 31. If it has not reached B0016, the focused pixel is shifted to the adjacent one in the direction of the arrow. The process then returns to step B0009.

If it is determined that all the pixels have been processed, the halftone processing according to the present embodiment is completed.

In the present embodiment, the above process is executed for each ink color.

Figure 34:
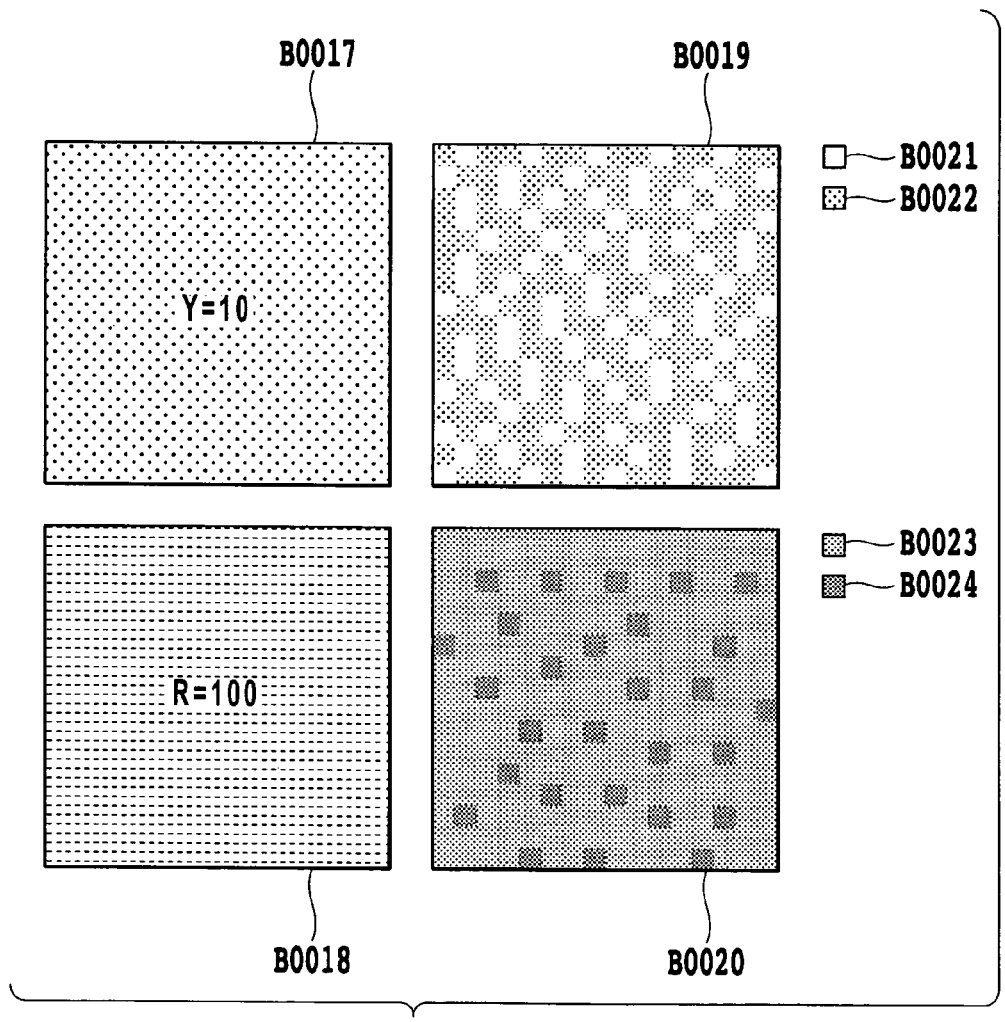
FIG. 34 is a diagram showing examples of an image having a predetermined gradation value before a halftone process and of a quantized image subjected to the halftone process.

FIG. 34 shows example of images having predetermined gradation values before a halftone process and images quantized through the halftone process. In the figure, B0017 denotes image data created for yellow (Y), and B0019 denotes the image data B0017 undergoing a halftone process. B0018 denotes image data created for red (R), and B0020 denotes the image data B0018 undergoing a halftone process.

In the image B0017, the image data is 10 for all the pixels. In contrast, in the image B0019, having undergone the halftone process, pixels at two levels (densities), that is, pixels B0021 with O=0 (level 0) and pixels B0022 with O=32 (level 1) are uniformly distributed.

In the image B0018, the image data is 100 for all the pixels. In contrast, in the image B0020, having undergone the halftone process, pixels at two levels (densities), that is, pixels B0023 with O=96 (level 4) and pixels B0024 with O=128 (level 5) are uniformly distributed.

In either case, in the original image, the value of the pixel data is the same for all the pixels. However, after the halftone process, the pixels with the plurality of levels are distributed so that for the entire image, the inputted data values are saved.

(Generation of Print Data)

A process J0006 of generating print data will be described below. Image data having undergone a halftone process is then converted into a predetermined format to generate print data to be actually inputted to the printing apparatus.

Figure 33:
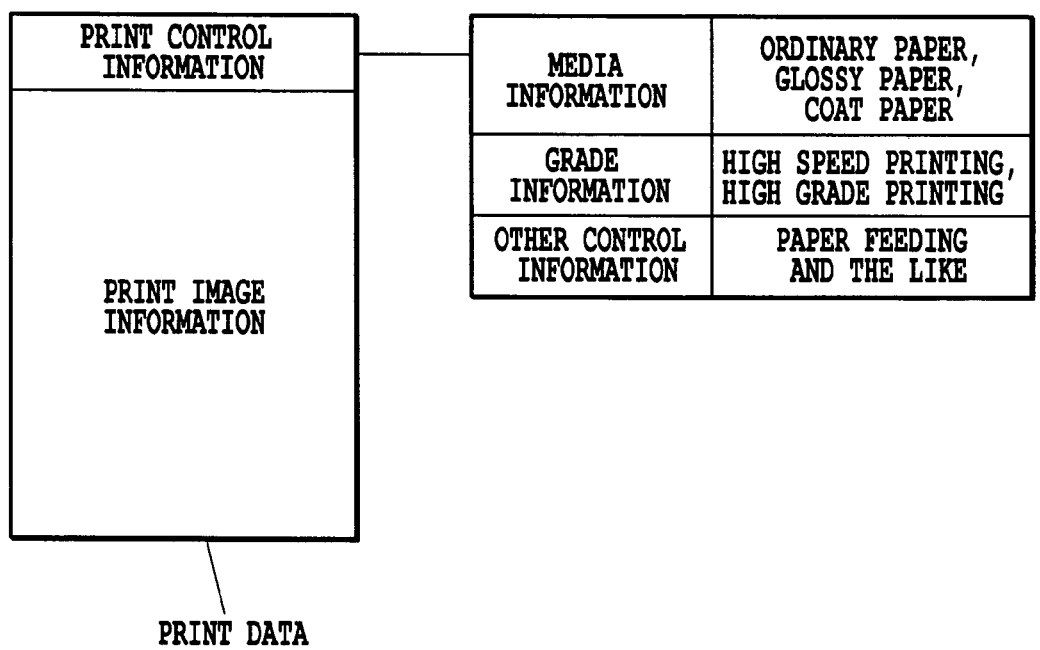
FIG. 33 is a diagram showing the constitution of print data.

FIG. 33 shows the constitution of print data. As shown in the figure, the print data is composed of print control information that controls printing as well as print image information (also referred to as "print image data"). Moreover, the print control information is composed of "media information" on the media on which the image is to be printed, "grade information" on the grade of printing, and "other control information" such as a paper feeding method.

The media information describes the type of paper on which the image is to be printed. The media information specifies one of ordinary paper, glossy paper, coat paper, and the like. The grade information describes the grade of printing and specifies high-speed printing or high-grade printing. These pieces of print control information are formed by the host PC on the basis of the user's specified contents. Furthermore, the print image information (print image data) describes image data generated by the previously described halftone process. The image data generated by the halftone process is then supplied to a dot arrangement patterning process in the printing apparatus main body.

A precondition for the description of the halftone process and the generation of print data is that the processes are not executed by the printing apparatus main body but by the printer driver, installed in the host apparatus. However, the present embodiment is not limited to this aspect. The effects of the present invention can be equally produced even if the halftone process itself is executed inside the printing apparatus.

(Dot Arrangement Patterning Process)

A dot arrangement patterning process J0007 will be described below.

In the above described halftone process, the level of multi-valued density information with 256 values (8-bit data) is reduced to obtain gradation value information with 9 values (4-bit data). However, the ink jet printing apparatus according to the present embodiment can actually print binary information indicating whether or not to print an ink color. The dot arrangement patterning process reduces the multi-valued level of 0 to 8 to a binary level that determines whether or not a dot is to be present. Specifically, the dot arrangement patterning process J0007 assigns a dot arrangement pattern to each pixel expressed by 4-bit data with a level 0 to 8 outputted by the halftone processing section, the dot arrangement pattern corresponding to the gradation value (level 0 to 8) of the pixel. The dot arrangement patterning process J0007 thus defines a dot to be turned on or off for each of the plurality of areas in the pixel. Then, ejection data "1" or "0" is placed in each area in one pixel.

Figure 35:
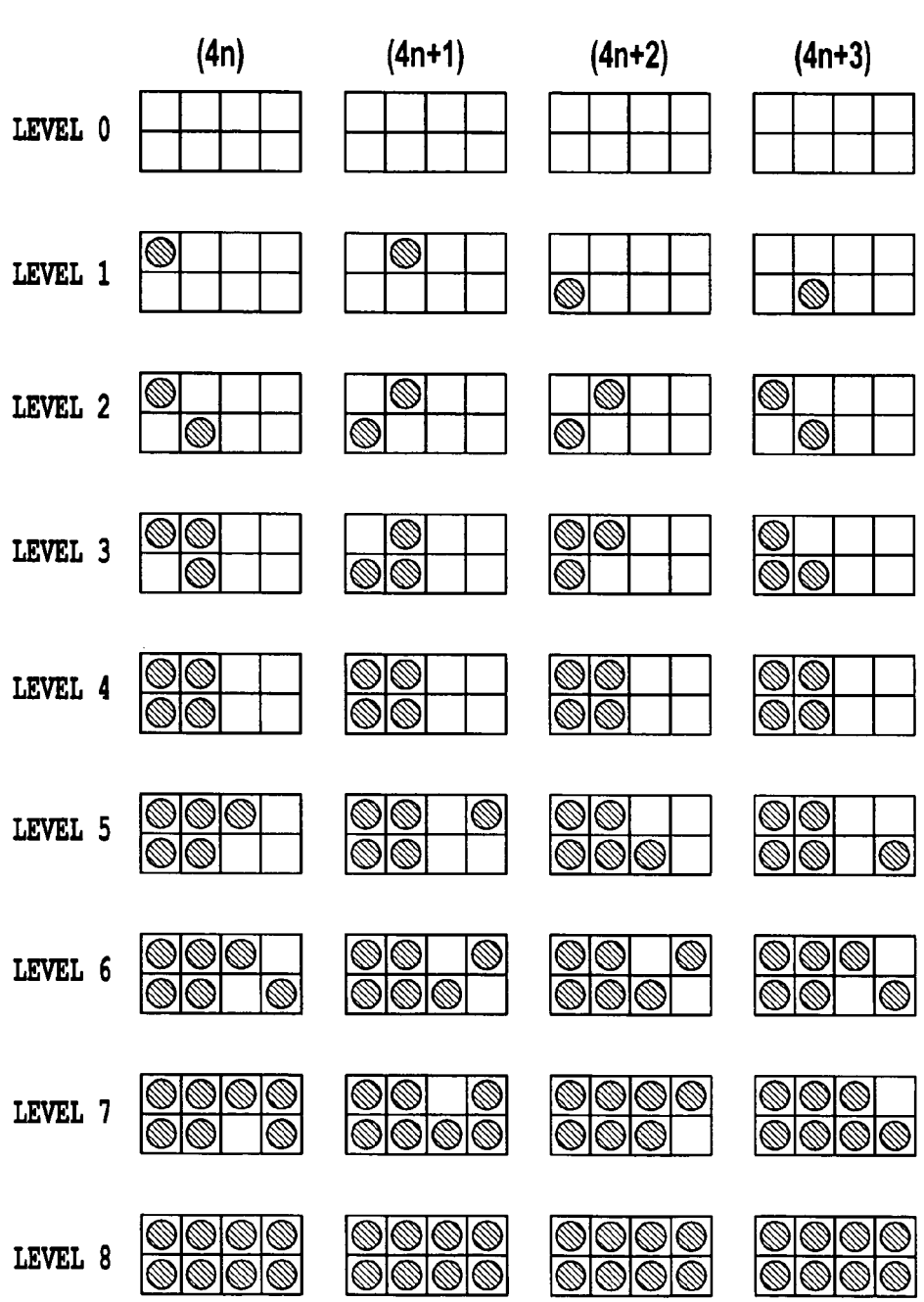
FIG. 35 is a diagram showing output patterns corresponding to input levels wherein conversions are executed using a dot arrangement patterning process according to the embodiment of the present invention.

FIG. 35 shows output patterns obtained as a result of a conversion by the dot arrangement patterning process according to the present embodiment and corresponding to the respective input levels 0 to 8. The level values shown in the left of the figure correspond to the levels 0 to 8, output values from the halftone processing section. Each of the matrices arranged in the right of the figure and composed of two vertical areas x four horizontal areas correspond to the area of one pixel outputted as a result of the halftone process. Each of the areas in one pixel corresponds to the minimum unit for which the dot is defined to be turned on or off.

In the figure, a dot is printed in each circled area. The number of dots increases one by one consistently with the level. In the present embodiment, the density information on the original image is thus reflected in the final image.

Each of (4n) to (4n+3) indicates the horizontal position of the pixel with respect to the left end of the input image when an integer of at least 1 is substituted into n. The patterns shown below (4n) to (4n+3) indicate that even at the same input level, different patterns are provided in accordance with the pixel position. Specifically, even if the same level is inputted, the four types of dot arrangement patterns shown at (4n) to (4n+3) are circularly assigned to print media.

In FIG. 35, ejection openings in a print head are arranged in the vertical direction, while the print head carries out scanning in the horizontal direction. Thus, when various dot arrangements can be used for printing even at the same level, the number of ejections is varied between nozzles located in the upper stage of a dot arrangement pattern and nozzles located in the lower stage. Further, various noises inherent in the printing apparatus are diffused.

When the above-described dot arrangement patterning process is finished, the dot arrangement pattern has been determined for all the print media.

(Mask Data Converting Process)

A mask data converting process J0008 will be described below. Since the above described dot arrangement patterning process determines whether or not a dot is to be present in each area on a print medium, it is possible to print the desired image simply by inputting this information to a drive circuit for the print head. However, the ink jet printing apparatus typically employs a printing method called multi-pass printing.

The multi-pass printing method will be described below in brief.

Figure 36:
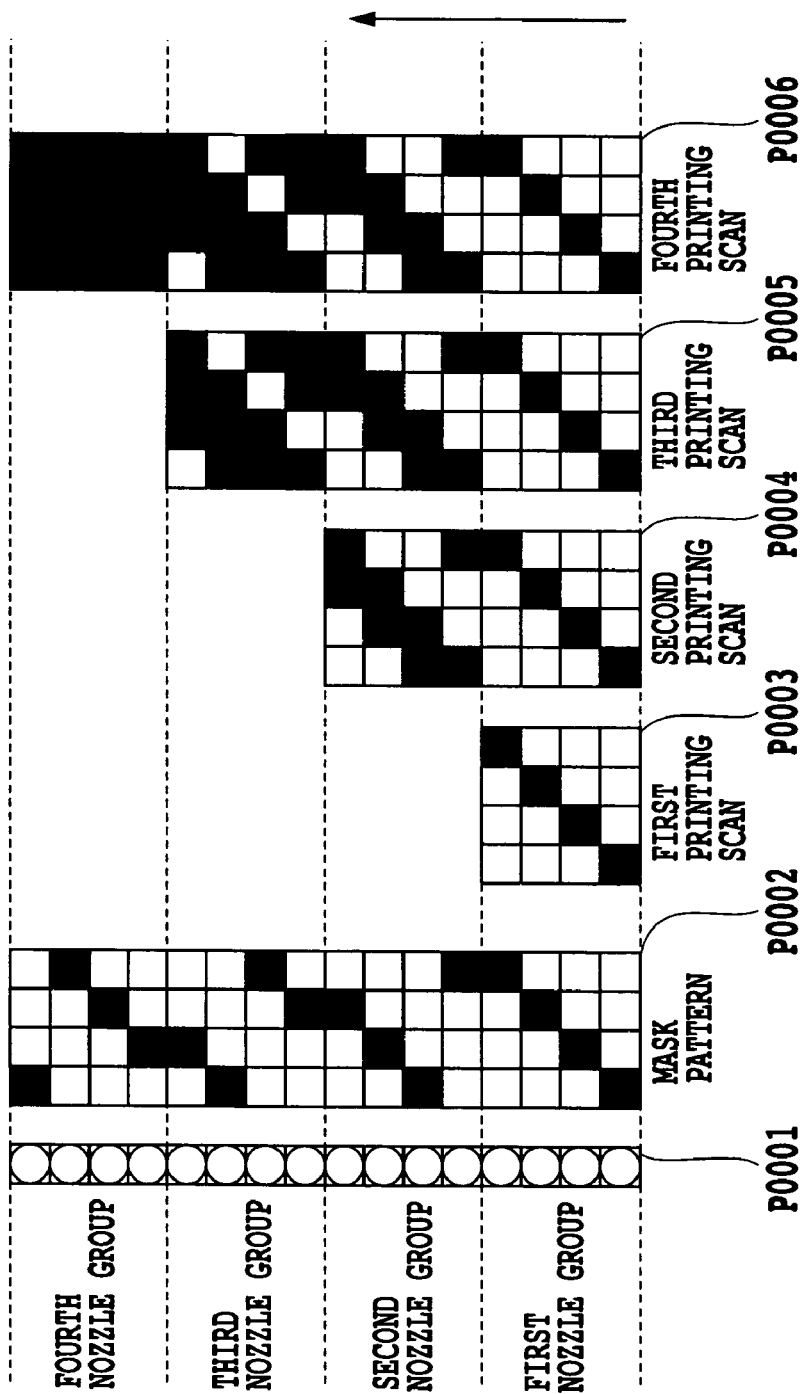
FIG. 36 is a schematic diagram illustrating a multipass printing method.

FIG. 36 schematically shows the print head and print patterns in order to describe the multi-pass printing method. P0001 denotes the print head, which is assumed to have 16 nozzles herein for simplification. The nozzles are divided into first to fourth nozzle groups as shown in the figure. Each nozzle group includes four nozzles. P0002 denotes a mask pattern and areas in which the corresponding nozzles print dots are shown in black. The patterns printed by the nozzle groups are complementary to one another. Superimposing the patterns on another causes a 4×4 area to be printed.

The patterns denoted by P0003 to P0004 show how an image is completed by sequentially executing printing scans. Every time a printing scan is finished, the print medium is conveyed in the direction of the arrow in the figure by a distance equal to the width of the nozzle group. Thus, the image in the same area (corresponding to the width of each nozzle group) of the print medium is completed by four printing scans. When the same area of a print medium is formed by a plurality of scans using a plurality of nozzle groups as described above, it is possible to reduce inherent differences among nozzles, a variation in the accuracy with which print media are conveyed, and the like.

Figure 37:
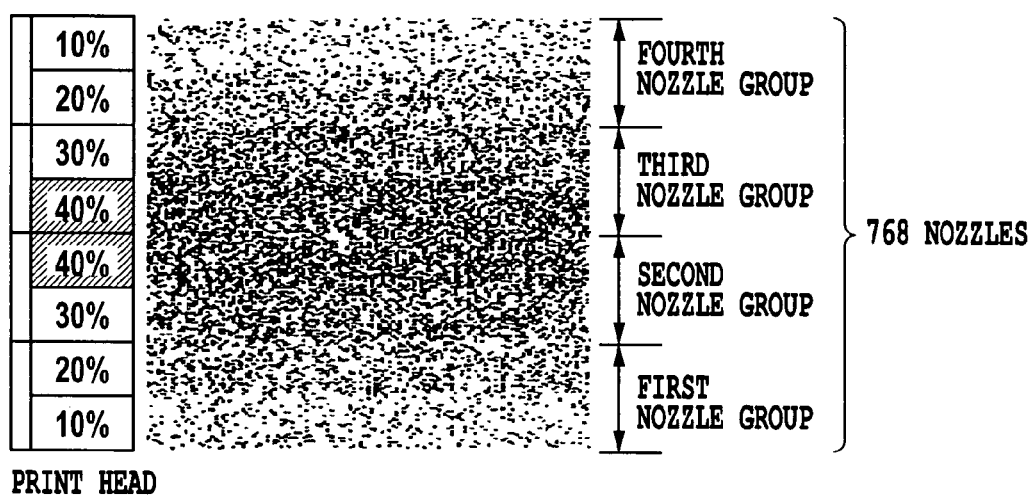
FIG. 37 is a diagram showing a mask pattern applied according to the embodiment of the present invention.

FIG. 37 shows a mask pattern actually applied according to the present embodiment. A print head H1001 applied according to the present embodiment has 768 nozzles. Each of the four nozzle groups includes 192 nozzles. The size of the mask pattern is 768 areas in the vertical direction, which is equivalent to the number of nozzles, and 256 areas in the horizontal direction. The four nozzle groups are complementary to one another.

With an ink jet print head that ejects a large number of small droplets at a high frequency, such as the one applied according to the present embodiment, it has been confirmed that air currents occur near a printing section during a printing operation to affect the ejection directions notably of nozzles located at an end of the print head. Thus, in the mask pattern according to the present embodiment, the distribution of print ratios is biased depending on the area even within each nozzle group or the same nozzle group, as can be seen in FIG. 37. As shown in FIG. 37, by applying a mask pattern in which the print ratio of nozzles at the end of the print head is reduced below that in a central portion of the print head, it is possible to make insignificant the effect of the deviations of the impact positions of ink droplets ejected by the nozzles at the end.

In the present embodiment, the mask data shown in FIG. 37 is stored in the memory in the printing apparatus main body. In a mask data converting process, an AND process is executed on the mask data and an output signal resulting from the above described dot arrangement patterning process. Then, print pixels to be actually ejected during each printing scan are determined and inputted to a drive circuit J0009 for the print head H1001.

Now, description will be given of the configuration of the main body of an ink jet printing apparatus applied according to the present embodiment.

(Configuration of Mechanism Section)

First, description will be given of the configuration of a mechanism section of the printing apparatus applied according to the present embodiment. The printing apparatus main body according to the present embodiment can be classified into a paper feeding section, a paper conveying section, a paper discharging section, a carriage section, a cleaning section, and an armoring section on the basis of the role of each mechanism. Each of these sections will be described below in brief.

(A) Paper Feeding Section

Figure 38:
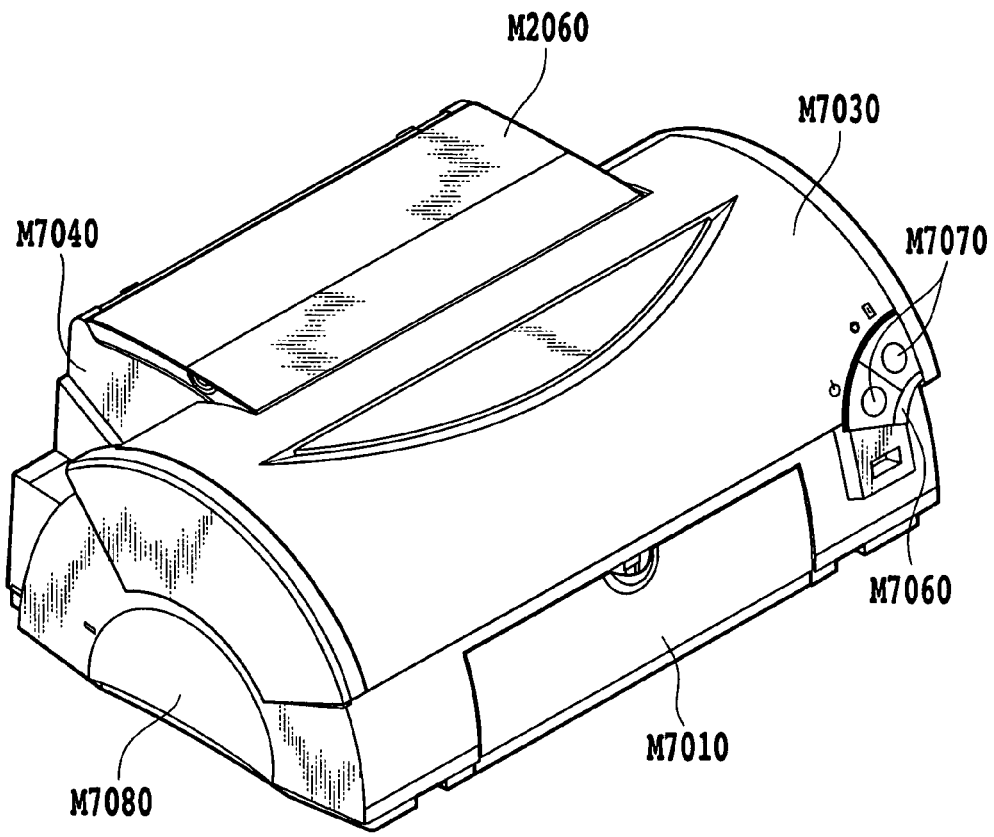
FIG. 38 is a perspective view of a printing apparatus according to the embodiment of the present invention.
Figure 39:
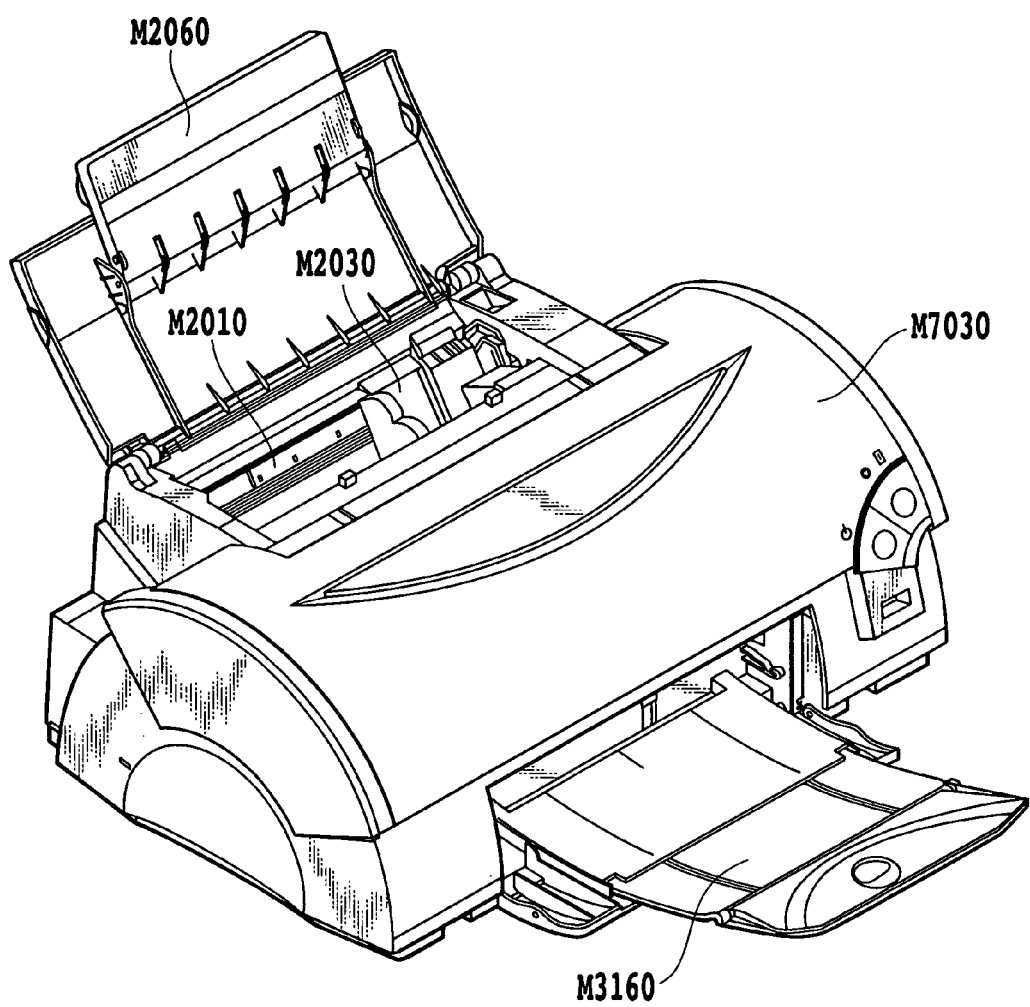
FIG. 39 is a perspective view of the printing apparatus according to the embodiment of the present invention.
Figure 40:
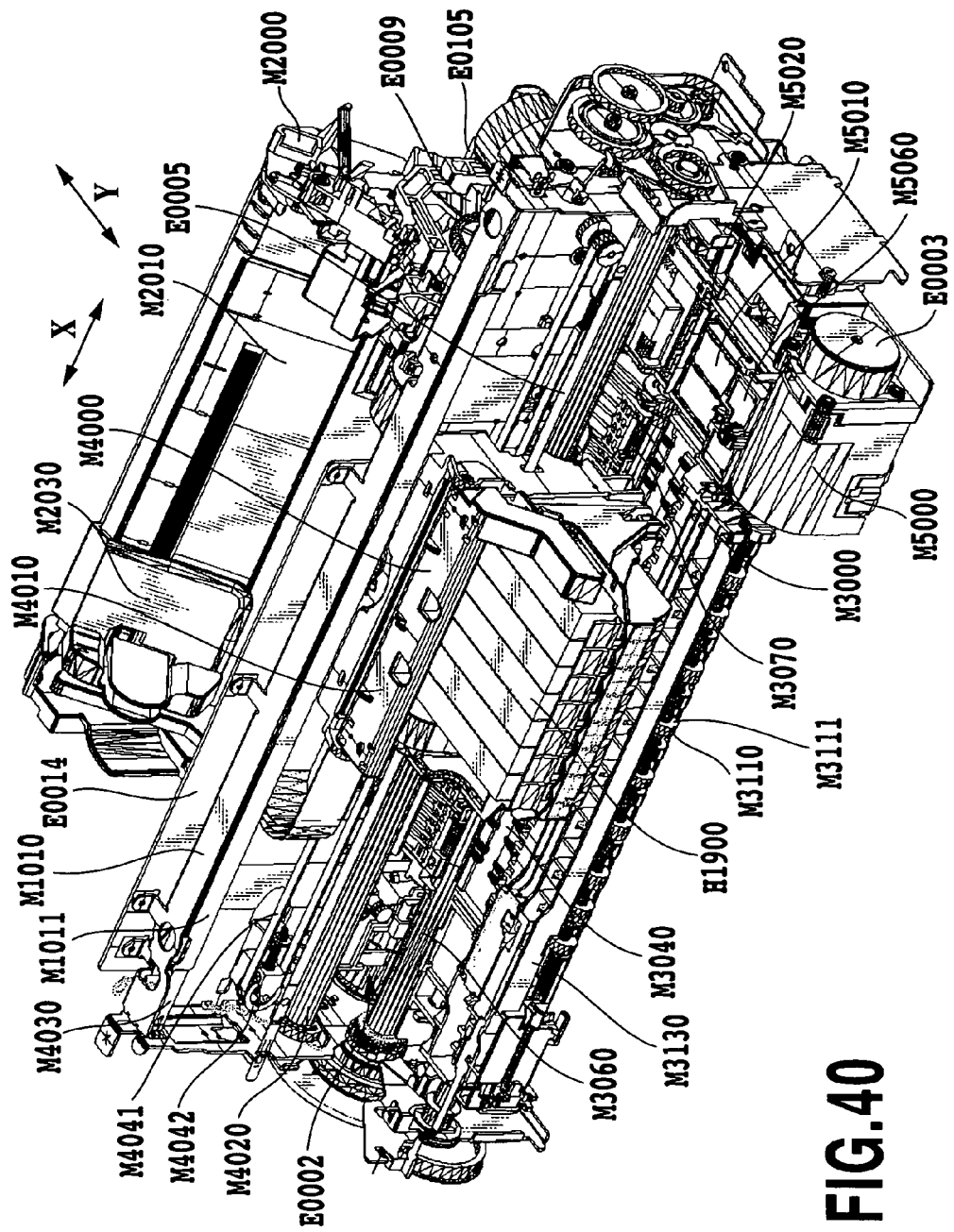
FIG. 40 is a perspective view of a mechanism section of the printing apparatus according to the embodiment of the present invention.
Figure 41:
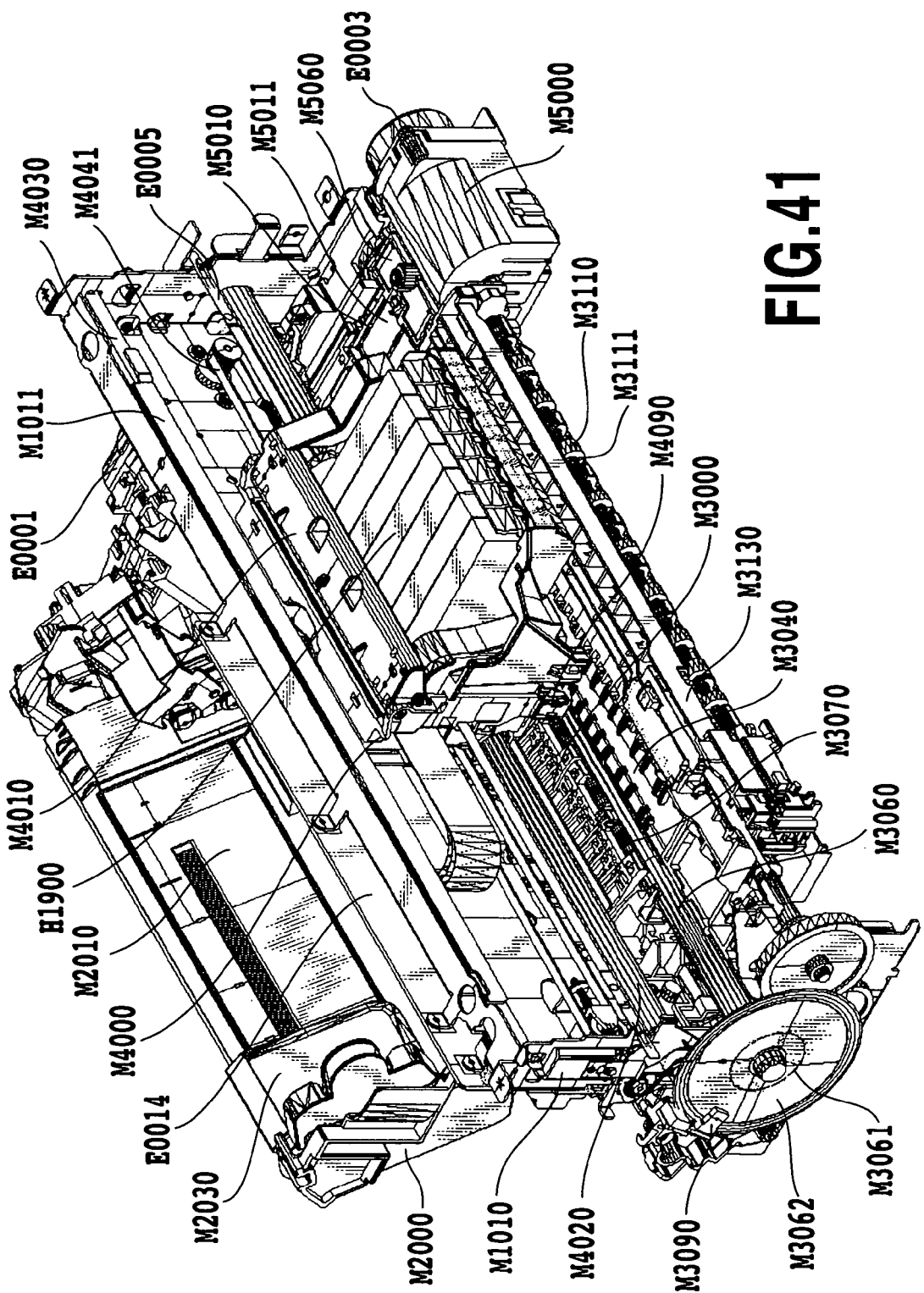
FIG. 41 is a perspective view of the mechanism section of the printing apparatus according to the embodiment of the present invention.
Figure 42:
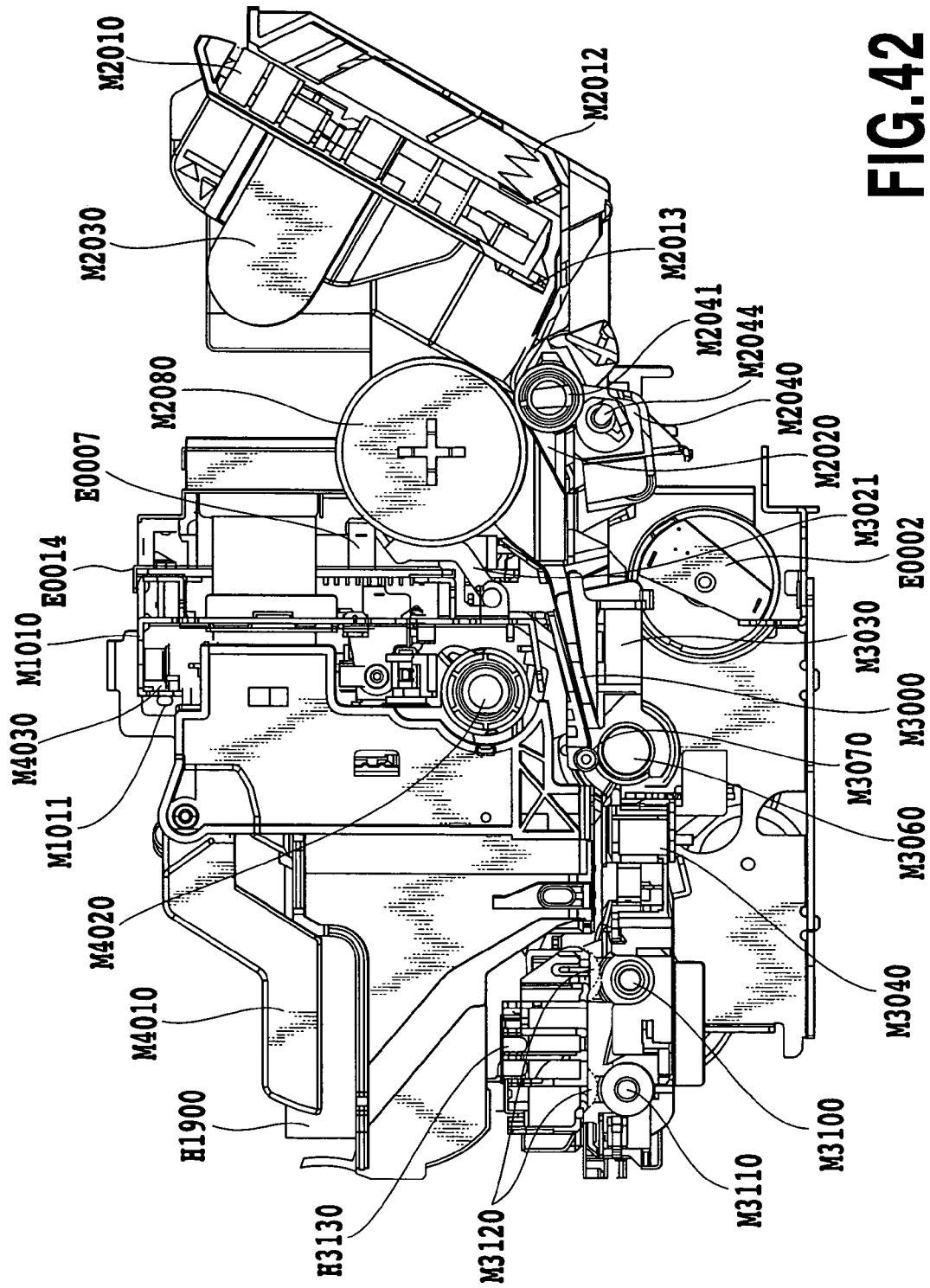
FIG. 42 is a sectional view of the printing apparatus according to the embodiment of the present invention.

FIGS. 38 and 39 are perspective views of a printing apparatus applied according to the present embodiment. FIG. 38 shows that the printing apparatus is not operated. FIG. 39 shows that the printing apparatus M1 is in operation. FIGS. 40, 41, and 42 illustrate the internal mechanism of the printing apparatus main body. FIG. 40 is a perspective view of the printing apparatus as viewed from above and the right. FIG. 41 is a perspective view of the printing apparatus as viewed from above and the left. FIG. 42 is a side sectional view of the printing apparatus main body.

As can be seen in FIGS. 38 to 42, the paper feeding section comprises a base M2000 to which the following components are mounted: a platen 2010 on which print media are stacked, a paper feeding roller M2080 that feeds print media one by one, a separating roller M2041 that separates print media from one another, and a return lever M2020 that returns the print media to the stacked position.

A paper feeding tray M2060 is mounted to the base M2000 or armor to hold stacked print media. The paper feeding tray M2060 has multiple stages and is rotated during an operation.

The paper feeding roller M2080 is shaped like a bar having an arc cross section. One piece of separating roller rubber is provided close to a paper criterion to feed print media. A driving force for the paper feeding roller M2080 is exerted by an exclusive ASF motor E0105 provided in the paper feeding section and is transmitted using a drive transmitting gear and a planetary gear (not shown).

A movable side guide M2030 is movably provided on the platen M2020 to regulate the position at which print media are stacked. The platen M2010 is rotatable around a rotating shaft coupled to the base M2000. The platen M2010 is urged against the paper feeding roller M2080 using a platen spring M2012. A separating sheet M2013 composed of a material such as synthetic leather which has a large coefficient of friction is provided in an area of the platen 2010 which is opposite the paper feeding roller M2080, to prevent a plurality of print media from being simultaneously conveyed when there are few unprinted sheets remaining. The platen M2010 is configured to abut against and separate from the paper feeding roller M2080 using a platen cam.

A separating roller holder M2040 is installed on the base M2000 so as to be rotatable around a rotating shaft provided on the base M2000; a separating roller M2041 is mounted to the separating roller holder M2040 to separate print media from one another. The separating roller holder M2040 is urged against the paper feeding roller M2080 using a separating roller spring (not shown). A clutch (not shown) is attached to the separating roller M2041. When a predetermined or heavier load is imposed on the separating roller M2041, a part rotates to which the separating roller M2041 is mounted. The separating roller M2041 is configured to abut against and separate from the paper feeding roller M2080 using a separating release shaft M2044 and a control cam (not shown). An auto sheet feed sensor (hereinafter referred to as an ASF sensor) E0009 senses the positions of the platen M2010, the return lever M2020, and the separating roller M2041.

The return lever M2020, used to return the print media to the stacked position, is rotatably mounted to the base M2000. A return lever spring (not shown) is used to urge the return lever M2020 in the direction in which it is released. To return the print media, the return lever is rotated using the control cam.

Description will be given below of a paper feeding operation using the above configuration.

In a normal standby state, the platen M2010 is released by the platen cam M2014, and the separating roller M2041 is released by the control cam M2050. The return lever M2020 returns print media and is provided at the stacked position at which it closes a stack port, so as to prevent stacked print media from moving excessively far.

When paper is fed, the motor is first driven to abut the separating roller M2041 against the paper feeding roller M2080. Then, the return lever M2020 is released to abut the platen M2010 against the paper feeding roller M2080. In this state, print media start to be fed. The print media are regulated by a front separating section M2001 (not shown) provided on the base M2000 so that only a predetermined number of print media are transferred to a nip section composed of the paper feeding roller M2080 and the separating roller M2041. The nip section separates only the upper most print medium from the other transferred print media and conveys it.

When the print medium reaches a conveying roller M3060 and a pinch roller M3070, the platen M2010 is released by the platen cam (not shown), while the separating roller M2041 is released by the control cam. The return lever M2020 is returned by the control cam to the stacked position. Thus, the print medium resting at the nip section, composed of the paper feeding roller M2080 and the separating roller M2041, is returned to the stacked position.

(B) Paper Conveying Section

A conveying roller M3060 conveying print media and a paper end sensor (hereinafter referred to as a PE sensor) E0007 are rotatively movably mounted to a chassis M1010 composed of crimped sheet metal. The conveying roller M3060 has metal shafts the surfaces of which are coated with fine particles of ceramic. The conveying roller M3060 is mounted to the chassis M1010 so that metal parts of both shafts are received by bearings (not shown). A roller tension spring (not shown) is provided between a bearing M3080 and the conveying roller M3060. The roller tension spring urges the conveying roller M3060 to impose an appropriate amount of load on the roller during rotation to accomplish stable conveyance.

The conveying roller M3060 is provided with a plurality of following pinch rollers M3070 that abut against the conveying roller M3060. The pinch roller M3070 is held by a pinch roller holder M3000. However, the pinch roller M3070 is urged by a pinch roller spring (not shown) to come into pressure contact with the conveying roller M3060 to exert a conveying force on the print media. At this time, a rotating shaft of the pinch roller holder M3000 is attached to bearings of the chassis M1010 and rotates around this position.

A paper guide flapper M3030 that guides print media and a platen M3040 are disposed at an inlet to which the print media are conveyed. Further, the pinch roller holder M3000 is provided with a PE sensor lever M3021 that notifies the PE sensor E0007 that a leading end and a trailing end of a print medium have been detected. The platen M3040 is mounted and positioned on the chassis M1010. The paper guide flapper M3030 is rotatable around a bearing (not shown) and is positioned by abutting against the chassis M1010. Further, the bearing section M3031 engages with the conveying roller M3060 and then slides.

The print head H1001 (not shown) is provided downstream of the conveying roller M3060 in the direction in which the print media are conveyed.

Description will be given of the process of conveyance using the above configuration. A print medium transferred to the paper feeding section is guided by the pinch roller holder M3000 and the paper guide flapper M3030 to the roller pair composed of the conveying roller M3060 and pinch roller M3070. At this time, the PE sensor lever M3021 senses the leading end of the print medium to determine a print position with respect to the print medium. The roller pair composed of the conveying roller M3060 and pinch roller M3070 is drivingly rotated by an LF motor E0002 to convey the print medium on the platen M3040. Ribs constituting a conveyance criterion surface are formed on the platen M3040. The ribs control the gap between the print head H1001 and the surface of the print medium. The rib also suppresses the waving of the print medium together with the paper discharging section, described later.

A driving force required to rotate the conveying roller M3060 is obtained by transmitting the rotating force of the LF motor E0002, composed of, for example, a DC motor, via a timing belt (not shown) to a pulley M3061 disposed on the shaft of the conveying roller M3060. A code wheel M3062 is provided on the shaft of the conveying roller M3060 to detect the amount by which the print medium has been conveyed by the conveying roller M3060. The adjacent chassis M1010 is provided with an encode sensor M3090 to read markings formed on the code wheel M3062. The markings are formed on the code wheel M3062 at a pitch of 150 to 300 lpi (lines/inch; reference value).

(C) Paper Discharging Section

The paper discharging section is composed of a first paper discharging roller M3100, a second paper discharging roller M3110, a plurality of spurs M3120, and a gear train.

The first paper discharging roller M3100 is composed of a metal shaft on which a plurality of rubber portions provided. The first paper discharging roller M3100 is driven by transmitting driving from the conveying roller M3060 to the first paper discharging roller M3100 via an idler gear.

The second paper discharging roller M3110 is composed of a resin shaft to which a plurality of elastomers M3111 are attached. The second paper discharging roller M3110 is driven by transmitting driving from the first paper discharging roller M3100 to the second paper discharging roller M3110 via an idler gear.

The spur M3120 is composed of a circular disk consisting of, for example, SUS and having a plurality of convexes around its periphery, and a resin portion integrated with the disk. A plurality of the spurs M3120 are attached to a spur holder M3130. This attachment is accomplished using a spur spring obtained by shaping a coil spring into a bar. The spring force of the spur spring acts to abut the spurs M3120 against the paper discharging rollers M3100 and M3110 at a predetermined pressure. This configuration enables the spurs M3120 to rotate in unison with the two paper discharging rollers M3100 and M3110. Some of the spurs M3120 are provided on the rubber portions of the first paper discharging roller M3100a or on the elastomers M3111 of the second paper discharging roller M3110 to mainly exert a conveying force on the print medium. Other spurs M3120 are provided at positions at which neither rubber portions M3101 nor elastomer portions M3111 are present. These spurs M3120 serve to mainly hinder the print medium from floating during printing.

The gear train serves to transmit the driving from the conveying roller M3060 to the paper discharging rollers M3100 and M3110.

A paper end support is provided between the first paper discharging roller M3100 and the second paper discharging roller M3110. The paper end support raises both ends of the print medium and holds the print medium beyond the first paper discharging roller M3100. This serves to prevent the printing on the print medium from rubbing against a carriage. Specifically, a resin member provided with a roller (not shown) at its leading end is urged by a paper end support spring M3152 (not shown) to press the roller M3151 against the print medium. at a predetermined pressure. Then, the print medium has both ends raised and is thus sturdily held at the predetermined position.

With the above configuration, the print medium on which an image has been formed is sandwiched between the first paper discharging roller M3110 and the spurs M3120; the first paper discharging roller M3110 and the spurs M3120 constitute a nip. The print medium is then conveyed and discharged to a paper discharging tray M3160. The paper discharging tray M3160 is divided into a plurality of portions and can be housed at the bottom of a lower case M7080, described later. Before operation, the paper discharging tray M3160 is withdrawn. The paper discharging tray M3160 is configured so that its height increases toward its leading end and that both ends of it are held high. This allows discharged print media to be more appropriately stacked and prevents the printed surfaces from being rubbed (FIG. 39).

(D) Carriage Section

The carriage section has a carriage M4000 to which the print head H1001 is mounted. The carriage M4000 is supported by a guide shaft M4020 and a guide rail M1011. The guide shaft M4020 is attached to the chassis M1010 and supportively guides the carriage M4000 so that the carriage M4000 is scanned forward and backward in a direction perpendicular to the direction in which the print medium is conveyed. The guide rail M1011 is formed integrally with the chassis M1010 to hold a trailing end of the carriage M4000 to maintain a gap between the guide rail M1011 and the print medium. Further, a sliding sheet M4030 composed of a thin sheet of stainless steel is extended on a side of the guide rail M1011 on which the carriage M4000 slides. This reduces sliding sounds that may occur in the printing apparatus.

The carriage M4000 is driven, via a timing belt M4041, by a carriage motor E0001 mounted to the chassis M1010. The timing belt M4041 is supportively extended by an idle pulley M4042. Moreover, the timing belt M4041 is coupled to the carriage M4000 via a carriage damper composed of rubber or the like. The timing belt M4042 thus attenuates vibrations in the carriage motor E0001 and the like to reduce the color nonuniformity of the printed image or the like.

An encoder scale E0005 is provided parallel to the timing belt M4041 to detect the position of the carriage M4000. Markings are formed on the encoder scale E0005 at a pitch of 150 to 300 lpi. An encoder sensor E0004 (described later with regard to FIG. 43) for reading the markings is provided on a carriage circuit board E0013 (see FIG. 43) mounted on the carriage M4000. The carriage circuit board E0013 is also provided with a head connector E0101 used to electrically connect the carriage circuit board E0013 to the print head H1001. Further, a flexible cable E0012 (see FIG. 43) is connected to the carriage M4000 to transmit a driving signal from an electric circuit board E0014 to the print head H1001.

To fix the print head H1001 to the carriage M4000, an abutting section (not shown) and pressing means (not shown) are provided on the carriage M4000; the abutting section serves to position the print head H1001 while pressing it against the carriage M4000 and the pressing means serves to fix the print head H1001 at a predetermined position. The pressing means is mounted on a head set lever M4010. When the print head H1001 is set, the head set lever M4010 is rotated around a rotation fulcrum to cause the pressing means to act on the print head H1001.

Moreover, a position detecting sensor M4 composed of a reflection type optical sensor is mounted on the carriage M4000 to detect the position of a print result, a paper end, or the like in, for example, recording data on a special medium such as a CD-R. The position detecting sensor M4090 uses a light emitting element to emit light and receives a reflected light to detect the current position of the carriage M400.

If an image is formed on a print medium using the above configuration, then for a row position, the roller pair composed of the conveying roller M3060 and pinch roller M3070 conveys and positions the print medium. For a column position, the carriage motor E0001 is used to move the carriage M4000 in the direction perpendicular to the conveying direction of the carriage M4000 to locate the print head H1001 at a desired image forming position. The positioned print head H1001 ejects inks to the print medium in accordance with a signal from the electric circuit board E0014. The configuration of the print head H1001 and the printing system will be described later in detail. The printing apparatus according to the present embodiment forms an image on the print medium by alternatively repeating a printing main scan in which the carriage M4000 is scanned in the column direction while printing is being executed using the print head H1001, and a subscan in which the conveying roller M3060 conveys the print medium in the row direction.

(E) Cleaning Section

The cleaning section is composed of a pump M5000 used to clean the print head H1001, a cap M5010 that hinders the print head H1001 from being dried, and blades M5020 used to clean a surface of the print head H1001 in which ejection openings are formed.

An exclusive cleaning motor E0003 is disposed in the cleaning section. A one-way clutch (not shown) is provided in the cleaning motor E0003. When the motor E0003 rotates in one direction, the pump is activated. When the motor E0003 rotates in the other direction, the cap M5010 performs an elevating or lowering operation when the blades M5020 are activated.

The pump M5000 is configured so that pump rollers (not shown) squeeze two tubes (not shown) to generate a negative pressure. The cap M5010 is connected to the pump M5000 via a valve (not shown). When the pump M5000 is operated with the cap M5010 in tight contact with the ink ejection openings in the print head H1001, unwanted ink and the like are sucked from the print head H1001. Moreover, a cap absorbent M5011 is provided inside the cap M5010 to reduce the amount of ink remaining on the face of the head M6000 after sucking. Further, with the cap M5010 open, the remaining ink is sucked from the cap M5010 to prevent the sticking of the remaining ink and other problems. The ink removed by the pump M500 is discarded and is absorbed by and held in a waste ink absorbent M7090 provided in a lower case M7080.

A main cam (not shown) provided with a plurality of cams on a shaft controls a series of consecutive operations such as the operation of the blades M5020, the elevation and lowering of the cam M5010, and the opening and closing of a valve M5050. The main can acts on the cams and arms in the respective areas to enable predetermined operations to be performed. The position of the main cam M5030 can be detected by a position detecting sensor such as a photo interrupter. When the cam M5010 lowers, the blade M5020 moves perpendicularly to the scanning direction of the carriage M4000. The print head H1001 cleans the face of the print head H1001. Some of the blades M5020 clean the vicinity of the nozzles in the print head H1001, whereas the others clean the entire face of the print head. When the carriage M4000 moves as far as possible, the blades M5020 abut against a blade cleaner M5060. Thus, for example, ink stuck to the blades M5020 can be removed.

(F) Armoring Section

The units described above, (A) to (E), are mainly built into the chassis M1010 and constitute the mechanism section of the printing apparatus. The armor is mounted so as to cover the mechanism section. The armoring section is mainly composed of the lower case M7080, an upper case M7040, an access cover M7030, a connector cover, and a front cover M7010.

A paper discharge tray roll (not shown) is provided at the bottom of the lower case M7080 and can house the divided paper discharging tray M3160. The front cover M7010 closes the paper discharging port while the apparatus is not being operated.

The access cover M7030 is attached to the upper case M7040 and is rotatively movable. A part of top surface of the upper case has an opening through which an ink tank H1900 and the print head H1001 can be replaced with new ones. The printing apparatus according to the present embodiment has a head cartridge arrangement in which the ink tank H1900 for the different colors can be independently removed from a print head unit composed of a plurality of print heads for the respective colors each of which can eject one ink. Moreover, the upper case is provided with, for example, a door switch lever (not shown) used to sense that the access cover is opened or closed, a LED guide M7060 that transmits and displays light from a LED, and a key switch M7070 that acts on a circuit board switch (SW). Further, the multi-stage paper feeding tray M2060 is mounted so as to be rotatively movable. When the paper feeding section is not operated, the paper feeding tray M2060 is housed to act as a cover for the paper feeding section.

The upper case M7040 and the lower case M7080 are attached to each other using elastic fitting paws. A connector cover (not shown) covers the part between the upper case M7040 and the lower case M7080 in which a connector is provided.

(Configuration of Electric Circuit)

Now, description will be given of the configuration of an electric circuit according to the present embodiment.

Figure 43:
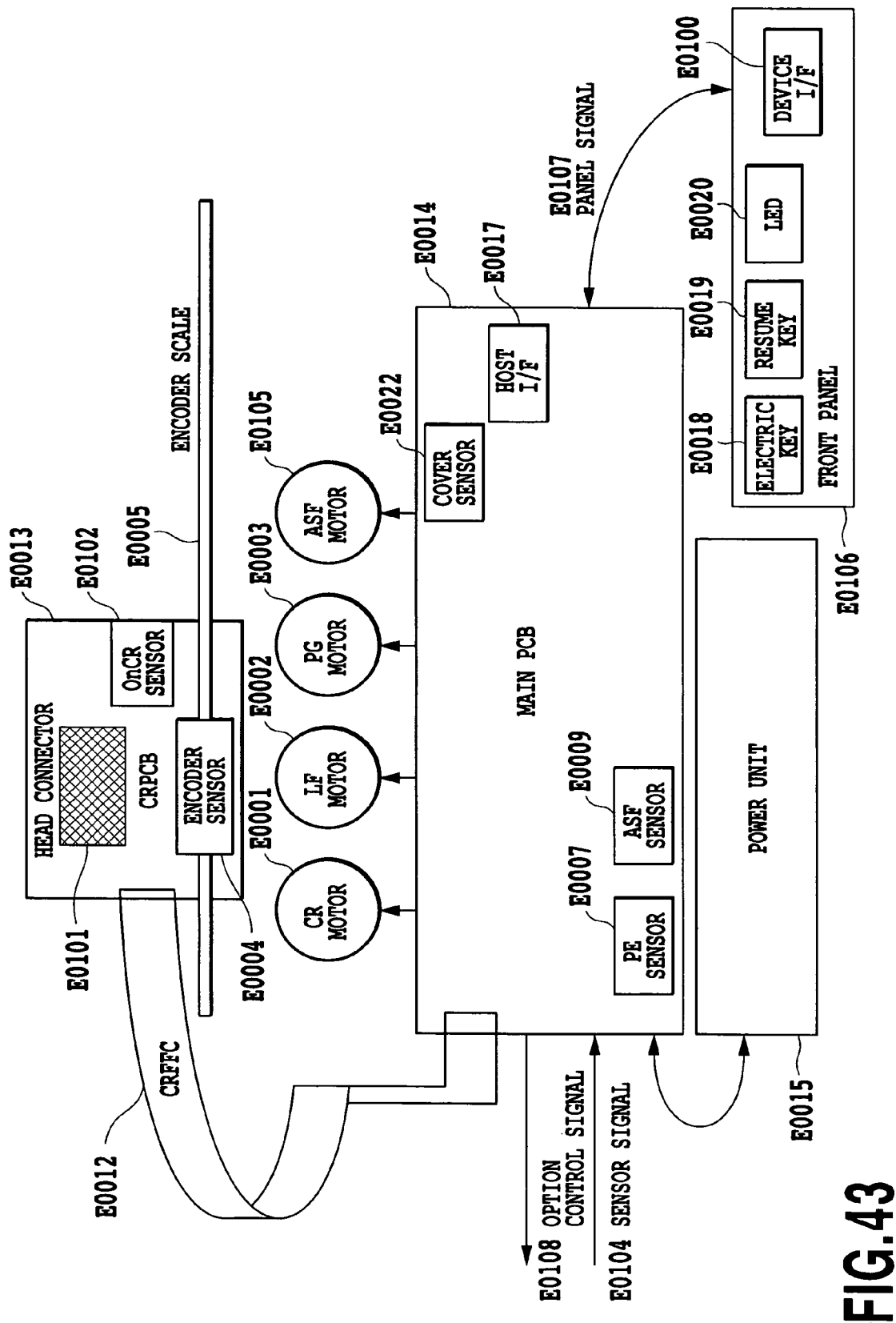
FIG. 43 is a block diagram schematically showing the general configuration of an electric circuit according to the embodiment of the present invention.

FIG. 43 is a block diagram schematically illustrating the whole configuration of the electric circuit according to the embodiment of the present invention.

In the printing apparatus applied according to the present embodiment, the electric circuit is mainly composed of a carriage circuit board (CRPCB) E0013, a main PCB (Printed Circuit Board) E0014, a power unit E0015, a front panel E0106, and the like.

Here, the power unit E0015 is connected to the main PCB E0014 to provide various driving power supplies.

The carriage circuit board E0013 is a printed circuit board unit mounted on the carriage M4000 to function as an interface that transmits and receives signals to and from the print head H1001 via the head connector E0101. Further, on the basis of a pulse signal outputted by the encoder sensor E0004 as the carriage M4000 moves, the carriage circuit board E0013 detects a change in the positional relationship between the encoder scale E0005 and the encoder sensor E0004. The carriage circuit board E0013 further outputs a corresponding signal to the main PCB E0014 through the flexible flat cable (CRFFC) E0012. The carriage circuit board E0013 is provided with a temperature sensor such as a thermistor which detects the ambient temperature and a required optical sensor (these sensors will collectively be referred to as an "OnCR sensor" E0102). Information obtained from the OnCR sensor E0102 is outputted to the main PCB E0014 through the flexible flat cable (CRFFC) E0012 together with head temperature information from a print head cartridge H1000.

The main PCB E0014 is a printed circuit board unit that drivingly controls each section of the ink jet printing apparatus according to the present embodiment. The main PCB E0014 has the paper end detecting sensor (PE sensor) E0007, the automatic sheet feeder (ASF) sensor E0009, a cover sensor E0022, and a host interface (host I/F) E0017 on the circuit board. The main PCB E0014 is connected to various motors such as the carriage motor E0001, operating as a driving source for allowing the carriage M4000 to execute a main scan, the LF motor E0002, operating as a driving source for conveying a print medium, the PG motor E0003, operating as a driving source for recovering the print head H1001, and the ASF motor E0105, operating as a driving source for feeding the print medium, to drivingly control each function. The main PCB E0014 also receives various sensor signals E0014 from an ink empty sensor, a media (paper) determining sensor, a carriage position (height) sensor, the LF encoder sensor, and the PG sensor which signals indicate the installation or operating status of the respective option units. The main PCB E0014 further outputs an option control signal E0108 to drivingly control these option units. Furthermore, the main PCB E0014 has interfaces connected to the power unit E0015 and the front panel E0106, respectively, to transmit and receive information to and from them using a panel signal E0107.

The front panel E0106 is a unit provided on the front surface of the printing apparatus main body to allow the user to perform operations more conveniently. Te front panel E0106 has a resume key E0019, a LED E0020, a power key E0018, and a device I/F E0100 used to connect to a peripheral device such as a digital camera.

Figure 44:
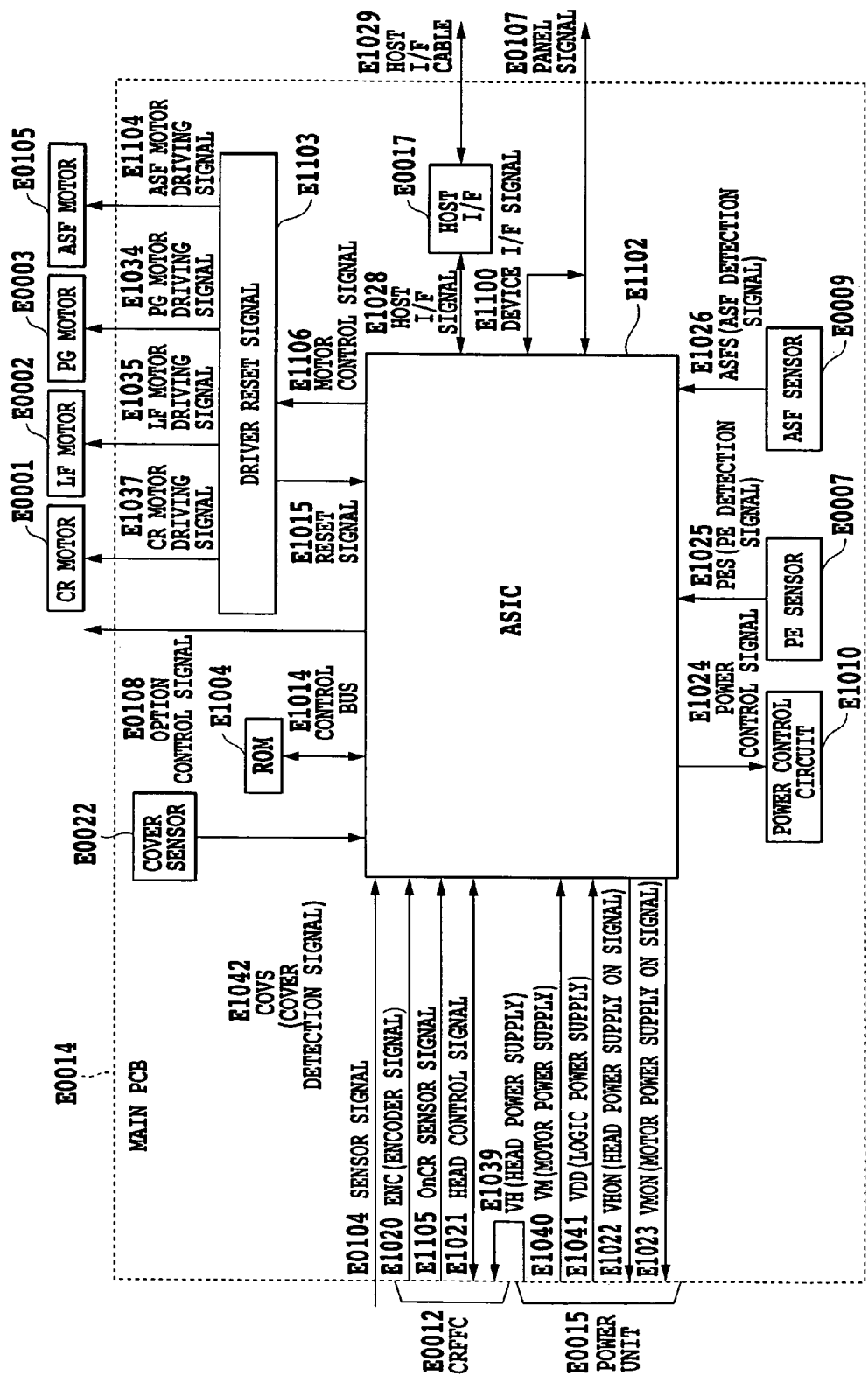
FIG. 44 is a block diagram showing an example of the internal configuration of a main PCB.

FIG. 44 is a block diagram showing the internal configuration of the main PCB E1004.

In the figure, E1102 denotes an ASIC (Application Specific Integrated Circuit) connected to a ROM E1004 through a control bus E1014 to provide various types of control in accordance with programs stored in the ROM E1004. The ASIC E1102 detects, for example, the status of outputs from the sensors on the main PCB E0014, a signal E1105 from the OnCR sensor on the CRPCB E0013, an encoder signal E1020, and outputs from the power key E0018 and resume key E0019 on the front panel E0106. Further, in accordance with the connection status and data input status of the host I/F E0017 and the device I/F E0100 on the front panel, the ASIC E1102 carries out various logic operations and condition determinations to control the components to drivingly control the ink jet printing apparatus.

E1103 denotes a driver reset circuit that uses a motor power supply (VM) E1040 as a driving source to generate a CR motor drive signal E1037, an LF motor drive signal E1035, a PG motor drive signal E1034, and an ASF motor drive circuit E1104 to drive the respective motors, in accordance with a motor control signal E1106 from the ASIC E1102. Moreover, the driver reset circuit E1103 has a power circuit to supply required power to the main PCB E0014, the CRPCB E0013, the front panel E0106, and other sections. The driver reset circuit E1103 further detects a decrease in CRPCB voltage to generate a reset signal E1015 to execute initialization.

E1010 denotes a power control circuit that controls power supplies to the sensors having a light emitting element, in accordance with a power control signal E1024 from the ASIC E1102.

The host I/F E0017 transmits a host I/F signal E1028 from the ASIC E1102 to an externally connected host I/F cable E1029. The host I/F E0017 also transmits a signal from the cable E1029 to the ASIC E1102.

On the other hand, the power unit E0015 provides a head power supply (VH) E1039, a motor power supply (VM) E1040, and a logic power supply (VDD) E1041. A head power supply ON signal (VHON) E1022 and motor power supply ON signal (VMOM) E1023 from the ASIC E1102 are inputted to the power unit E0015 to control the turning-on and -off of the head power supply E1039 and motor power supply E1040. The logic power supply (VDD) E1041 provided by the power unit E0015 has its voltage converted as required before being provided to each internal section of the main PCB E0014 and each section outside the main PCB E0014.

The head power supply signal E1039 is smoothed on the main PCB E0014 and then dispatched to the CRFFC E0012. The head power supply signal E1039 is then used to drive the drive head cartridge H1000.

The ASIC E1102 is a one-chip semiconductor integrated circuit with a built-in mathematic processing device that outputs the motor control signal E1106, the option control signal E0108, the power control signal E1024, the head power On signal E1022, the motor power ON signal E1023, and the like. To transmit and receive signals to and from the host I/F E0017, the ASIC E1102 transmits and receives signals to and from the device I/F E0100 on the front panel through the panel signal E0107. Moreover, the ASIC E1102 senses the status of a PE detection signal (PES) E1025 from the ASF sensor E0009, a cover detection signal (COVS) E1042 from the cover sensor E0022, the panel signal E0107, a sensor signal E0104, and the OnCR sensor signal to drivingly control the panel signal E0107 to flash the LED E0020 on the front panel.

Moreover, the ASIC E1102 senses the status of the encoder signal (ENC) E1020 to generate a timing signal. The ASIC E1102 also uses a head control signal E1021 to interface the print head cartridge H1000 to control printing operations. The encoder signal (ENC) E1020 is an output signal from the CR encoder sensor E0004 inputted through the CRFFC E0012. The head control signal E1021 is supplied to the print head H1001 via the flexible flat cable E0012, the carriage circuit board E0013, and the head connector E0101.

Figure 45B:
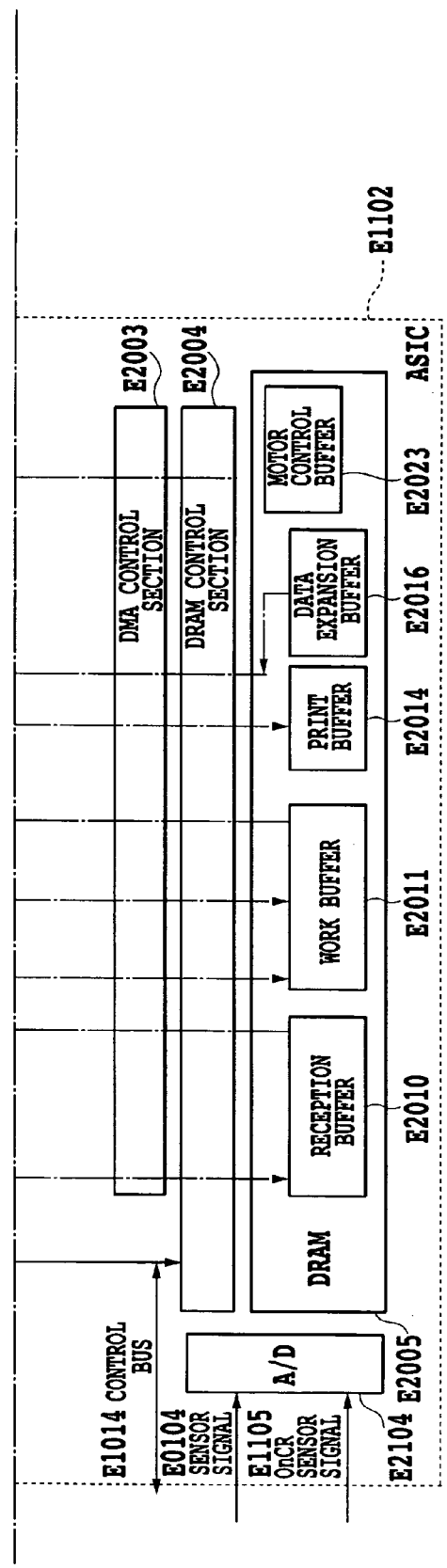

FIGS. 45A and 45B are block diagrams showing an example of the internal configuration of the ASIC E1102. For the connection among blocks, the figure shows only the flow of print data, motor control data, and other data relating to mechanism parts of each section. Control signals relating to reads from and writes to registers incorporated in each block and control signals relating to the control of the clock and DMA are omitted in order to avoid complicating the description on the figure.

In the figure, E2107 denotes a clock control section to which a clock signal (CLK) from a clock oscillating circuit (not shown) is inputted. The clock control section thus converts the frequency of the clock signal to generate a clock (not shown) supplied to the most of the ASIC E1102.

E2102 denotes a CPU that, for example, controls reads from or writes to the registers in each block, supplies the clock to some blocks, and accepts an interruption signal (none of these operations are shown) as described below, in accordance with the reset signal E1015, an interruption signal E2034 outputted by each internal block of the ASIC, and a control signal from the control bus E1014. Moreover, the CPU E2102 has an internal RAM to receive a print file from an external device through the device I/F E0100 to convert the file into print data.

E2005 denotes a DRAM that operates as a print data buffer. The DRAM E2005 has areas such as a reception buffer E2010, a work buffer E2011, a print buffer E2014, and an expansion data buffer E2016, as well as a motor control buffer E2023 that controls the motor.

The DRAM E2005 is also used as a work area required for the operation of the CPU E2103. That is, reads from or writes to the DRAM E2005 are carried out by switching between accesses from the CPU E2102 to the DRAM E2005 via the control bus and accesses from a DMA control section E2003, described later, to the DRAM E2005.

The DMA control section E2003 receives a request signal (not shown) from each block and accesses the DRAM by outputting write data E2038, E2041, E2044, and the like to the DRAM control section for a write operation. For a read operation, the DMA control section S2003 delivers read data E2040, E2043, E2045, E2051, and the like from the DRAM control section E2004 to the requesting block.

E2007 denotes a universal serial bus (USB) device that operates as a bidirectional communication interface with external host equipment (not shown) through the host I/F E0017 under the control of the CPU E2102. During printing, the USB device E2007 delivers reception data (host reception data E2037) from the host I/F E0017 to a reception control section E2008 on the basis of a DMA process.

E 2101 denotes a USB host that operates as a bidirectional communication interface with external device equipment (not shown) through the device I/F E0100 under the control of the CPU E2102. During printing, the USB host E2101 delivers reception data (device reception data E2108) from the device I/F E0100 to the reception control section E2008 on the basis of a DMA process.

The reception control section E2008 writes reception data (WDIF) E2038 from the I/F of the selected one of the USB device E2007 and USB host E2101, to a reception buffer write address controlled by the reception buffer control section E2039.

E2009 denotes a compression and decompression DMA controller that reads reception data (rater data) stored on the reception buffer E2010, from a reception buffer read address controlled by the reception buffer control section E2039. The compression and decompression DMA controller E2009 compresses or decompresses the data (RDWK) E2040 in accordance with a specified mode. Print codes thus obtained are rearranged at addresses on the work buffer E2011 so as to be suitable for the order in which the data is transferred to the print head cartridge H1000. The rearranged print codes are then transferred and written in the work buffer area as a print code sequence WDWK E2041.

E2013 denotes a print buffer transfer DMA controller that reads and transfers print codes (RDWP) E2043 from the work buffer E2011 to the print buffer E2014, under the control of the CPU E2102.

E2012 denotes a work area DMA controller that repeatedly writes, under the control of the CPU E2102, specified work fill data (WDWF) in an area on the work buffer from which the print buffer transfer DMA controller E2013 has transferred all required data.

E2015 denotes a print data (print data information) expansion DMA controller that reads, under the control of the CPU E2102, print codes written on the print buffer and expansion data (expansion print data RDHDG E2045) written on the expansion data buffer E2016, using a data expansion timing signal E2050 from the head control section E2018. The print data expansion DMA controller E2015 further writes the read data in the column buffer E2017 as column buffer write data (WDHDG) E2047. The column buffer E2017 is a SRAM that temporarily stores data (expansion print data) to be transferred to the print head cartridge H1000. The print data expansion DMA controller E2015 and the head control section E2018 use a handshake signal (not shown) to share the column buffer E2017.

E2018 denotes a head control section that interfaces with the print head cartridge H1000 via a head control signal under the control of the CPU E2102. Further, on the basis of a head drive timing signal E2049 from the sensor signal processing section E2022, the head control section E2018 outputs a data expansion timing signal E2050 to the print data expansion DMA controller. During printing, in accordance with the head drive timing signal E2049, the head control section E2018 reads expansion print data (RDHD) E2048 from the column buffer and outputs the read data to the print head cartridge H1000 as the head control signal E1021.

E2022 denotes a sensor signal processing section that receives the sensor signal E0104, the OnCR sensor signal E1105, the PE detection signal E1025, an ASF detection signal E1026, and the cover detection signal E1042. The sensor signal processing section E2022 then transmits these pieces of sensor information to the CPU E2102 in accordance with a mode specified under the control of the CPU E2102. Further, the sensor signal processing section E2022 outputs a sensor detection signal E2052 to the motor control section E2103. Moreover, upon receiving the encoder signal (ENC), the sensor signal processing section E2022 outputs the head drive timing signal E2049 in accordance with the mode specified under the control of the CPU E2102. The sensor signal processing section E2022 further stores, in a register, information on the position or speed of the carriage M4001 obtained from the encoder signal E1020, and provides the information to the CPU E2102. On the basis of this information, the CPU E2102 determines various parameters for the control of the CR motor E0001. Likewise, upon receiving an LF encoder sensor signal constituting the sensor signal E0104, the sensor signal processing section E2022 stores information on a feeding position or speed in a register and provides the information to the CPU E2102. On the basis of this information, the CPU E2102 determines various parameters for the control of the LF motor E0002.

E2104 denotes an A/D converter that converts analog signals such as a media determination output and an ink empty sensor output constituting the sensor signal E0104, an environment temperature detection thermistor output constituting the OnCR sensor signal E1105, reflection type sensor output, and a head temperature detection output, into digital values. The A/D converter E2104 then transmits these pieces of sensor detection information to the CPU E2102 in accordance with the mode specified under the control of the CPU E2102.

Under the control of the CPU E2102, the motor control section E2103 reads a motor drive table (RDPM) E2051 from the motor control buffer E2023 on the DRAM E2005 and outputs a motor control signal E1106. Further, depending on the operation mode, the motor control section E2013 uses various sensor detection signals as control triggers to outputs the motor control signal E1106.

E2105 denotes a panel I/F section that outputs a LED control signal constituting the panel signal E0107 under the control of the CPU E2102. The panel I/F section E2105 receives and transmits status output signals for the power key and resume key which signals constitute the panel signal, to the CPU E2102.

E2029 denotes a port control section that outputs the head power ON signal E1022, the motor power ON signal E1023, and the power control signal E1024 under the control of the CPU E2102.

(Configuration of Print Head)

Description will be given of the configuration of the head cartridge H1000 applied according to the present embodiment.

The head cartridge H1000 according to the present embodiment has the print head H1001, means on which the ink tank H1900 is mounted, and means for supplying ink from the ink tank H1900 to the print head. The head cartridge H1000 is removably mounted on the carriage M4000.

Figure 46:
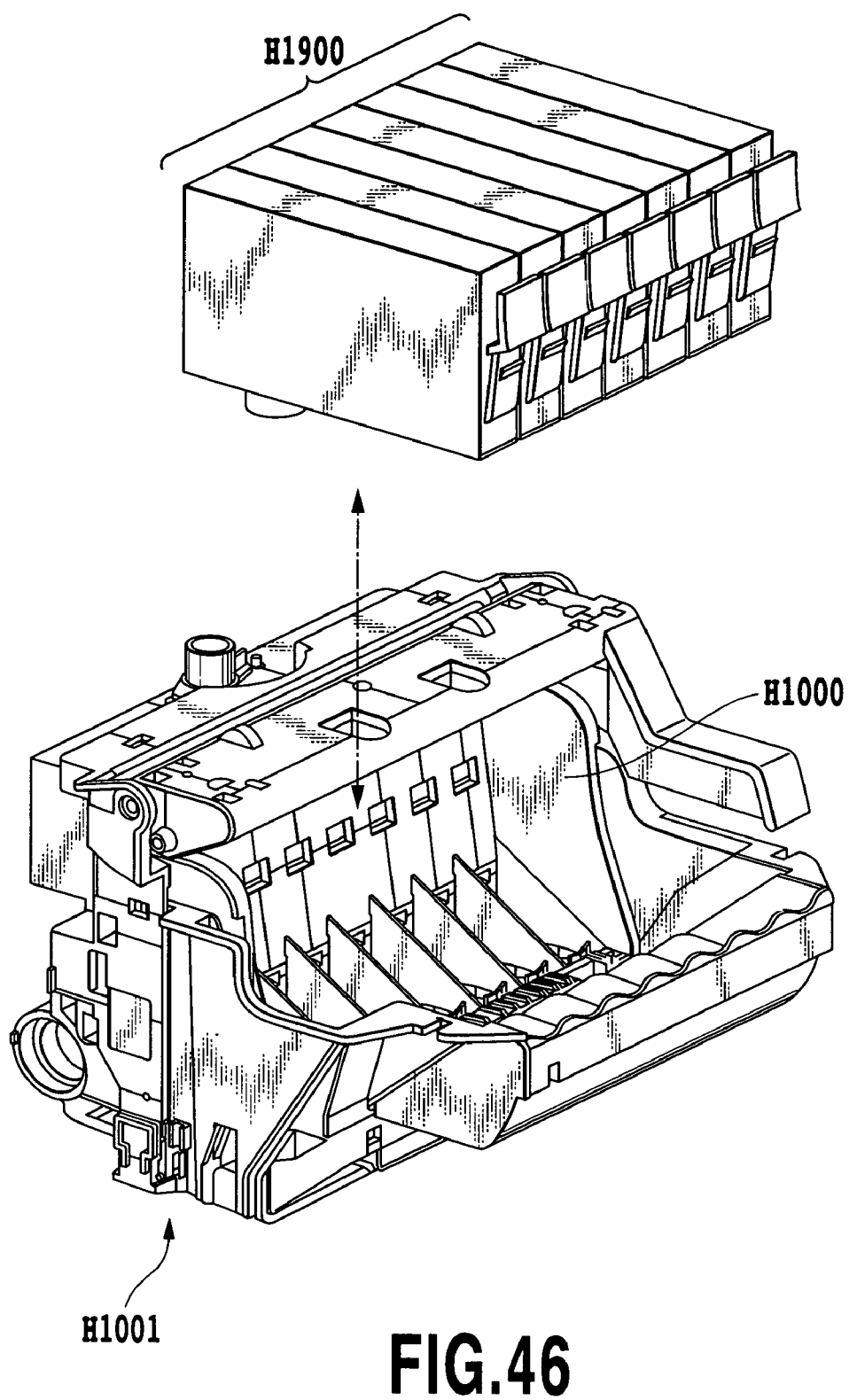
FIG. 46 is a perspective view showing that an ink tank is installed in a head cartridge applied according to the embodiment of the present invention.

FIG. 46 shows that the ink tank H1900 is installed in the head cartridge H1000 applied according to the present embodiment. The printing apparatus according to the present embodiment uses seven color inks of cyan, magenta, yellow, black, red, green, and blue to form an image. Accordingly, the ink tank H1900 is provided with independent tanks for the seven colors. As shown in the figure, each of the tanks is removable from the head cartridge H1000. The ink tank H1900 is removable from the head cartridge H1000 with the head cartridge H1000 remaining mounted on the carriage M4000.

Figure 47:
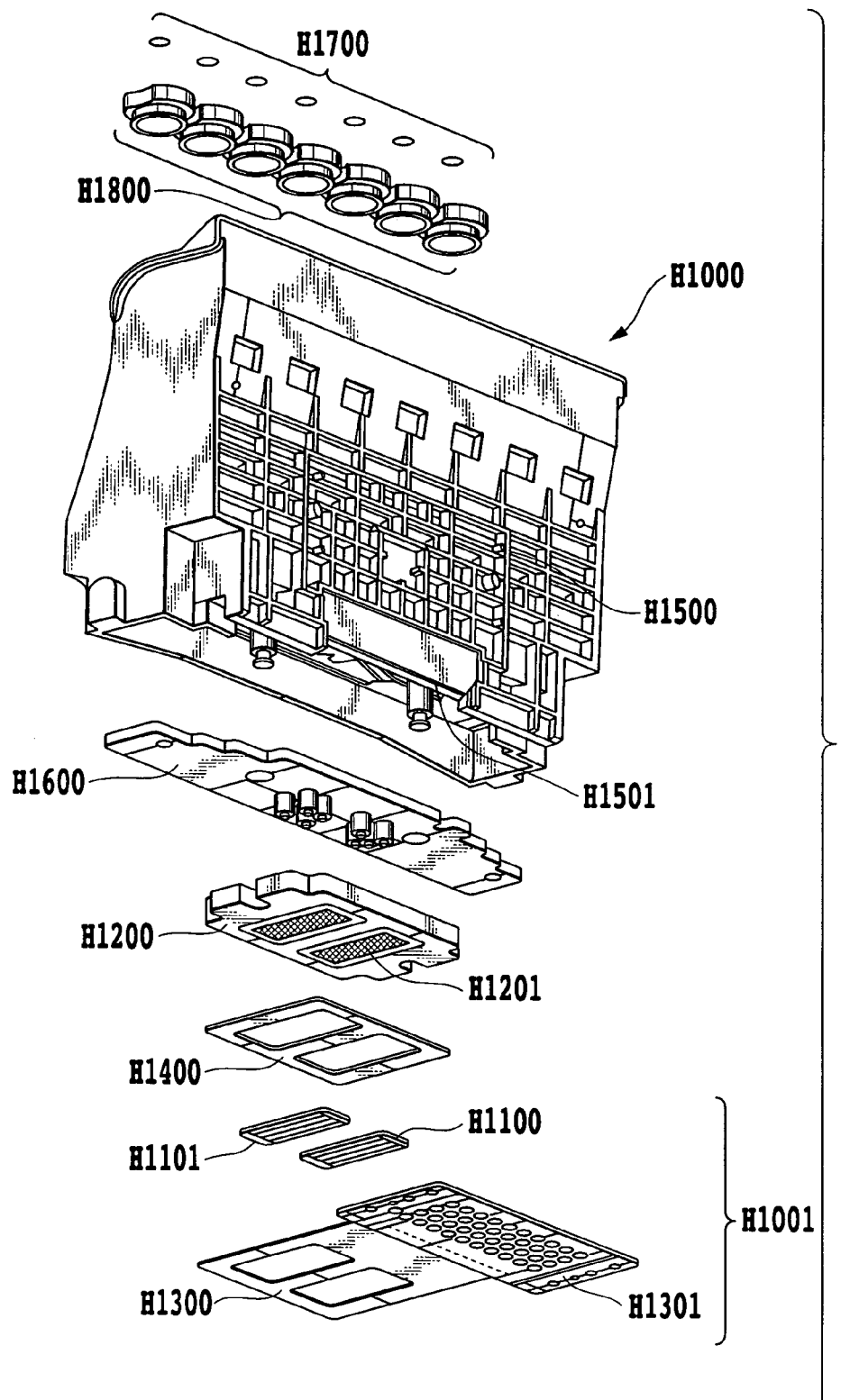
FIG. 47 is an exploded perspective view of the head cartridge applied according to the first embodiment of the present invention.

FIG. 47 is an exploded perspective view of the head cartridge H1000. In the figure, the head cartridge H1000 is composed of a first print element circuit board H1100, a second print element circuit board H1101, a first plate H1200, a second plate H1400, an electric wiring circuit board H1300, a tank holder H1500, a channel forming member H1600, a filter H1700, seal rubber H1800, and the like.

The first print element circuit board H1100 and the second print element circuit board H1101 are Si substrates each having a plurality of print elements (nozzles) formed on one side by a photolithography technique in order to eject the inks. Electric wires of Al or the like which supplies power to the print elements are formed by a film forming technique. A plurality of ink channels corresponding to the individual print elements are also formed by the photolithography technique. Moreover, ink supply ports are formed in a back surface of the circuit board to supply the inks to the plurality of ink channels.

Figure 48:
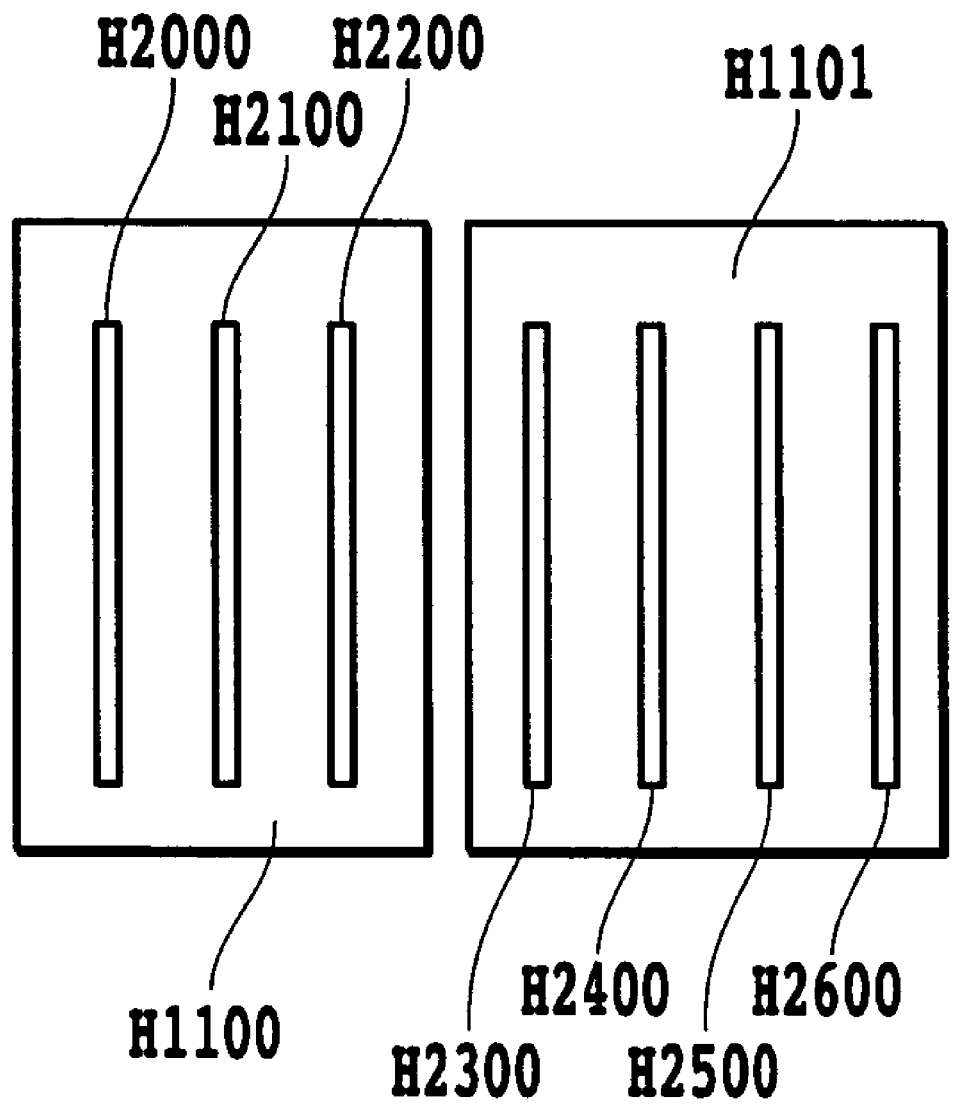
FIG. 48 is a front view of a print element circuit board in the head cartridge applied according to the first embodiment of the present invention.

FIG. 48 is an enlarged front view illustrating the configurations of the first print element circuit board H1100 and second print element circuit board H1101. H2000 to H2600 denote rows of print elements (hereinafter referred to as "nozzle rows") corresponding to the different ink colors. The first print element circuit board H1100 is provided with nozzle rows for three colors, specifically, a nozzle row H2000 to which cyan ink is supplied, a nozzle row H2100 to which magenta ink is supplied, and a nozzle row H2200 to which yellow ink is supplied. The second print element circuit board H1101 is provided with nozzle rows for four colors, specifically, a nozzle row H2300 to which black ink is supplied, a nozzle row H2400 to which red ink is supplied, a nozzle row H2500 to which green ink is supplied, and a nozzle row H2600 to which blue ink is supplied.

Each nozzle row is composed of 768 nozzles arranged in the conveying direction of the print medium at intervals of 1,200 dpi (dots/inch; reference value) to eject ink droplets of about 2 picoliters. The opening area of each nozzle ejection opening is set at about 100 nm$^2$. Further, the first print element circuit board H1100 and the second print element circuit board H1101 are fixedly glued to the first plate H1200. The first plate H1200 is formed with ink supply ports H1201 through which the inks are supplied to the first print element circuit board H1100 and the second print element circuit board H1101.

Moreover, the second plate H1400, having an opening, is fixedly glued to the first plate H1200. The second plate H1400 holds the electric wiring circuit board H1300 so as to electrically connect the electric wiring circuit board H1300 and the first print element circuit board H1100 and the second print element circuit board H1101 together.

The electric wiring circuit board H1300 applies an electric signal that causes the inks to be ejected from the nozzles formed in the first print element circuit board H1100 and second print element circuit board H1101. The electric wiring circuit board H1300 has electric wiring corresponding to the first print element circuit board H1100 and second print element circuit board H1101, and an external signal input terminal H1301 located at an end of the electric wiring to receive an electric signal from the printing apparatus main body. The external signal input terminal H1301 is fixedly positioned on a rear surface of the tank holder H1500.

On the other hand, the channel forming member H1600 is fixed by, for example, ultrasonic deposition to the tank holder H1500, holding the ink tank H1900. The channel forming member H1600 thus forms an ink channel H1501 extending from the ink tank H1900 to the first plate H1200.

A filter H1700 is provided at an ink tank-side end of the ink channel H1501 which engages with the ink tank H1900. The filter H1700 thus prevents the external entry of dusts. Further, seal rubber H1800 is installed at the engaged portion between the ink channel H1501 and the ink tank H1900 to prevent the evaporation of the inks from the engaged portion.

Moreover, the head cartridge H1000 is constructed by coupling, by gluing or the like, a tank holder section composed of the tank holder H1500, the channel forming member H1600, the filter H1700, and the seal rubber H1800 to the print head section H1001, composed of the first print element circuit board H1100, the second print element circuit board H1101, the first plate H1200, the electric wiring circuit board H1300, and the second plate H1400.

(Sequence for Printing Apparatus)

Description will be given below of a series of operations performed by the printing apparatus according to the present embodiment.

Figure 53:
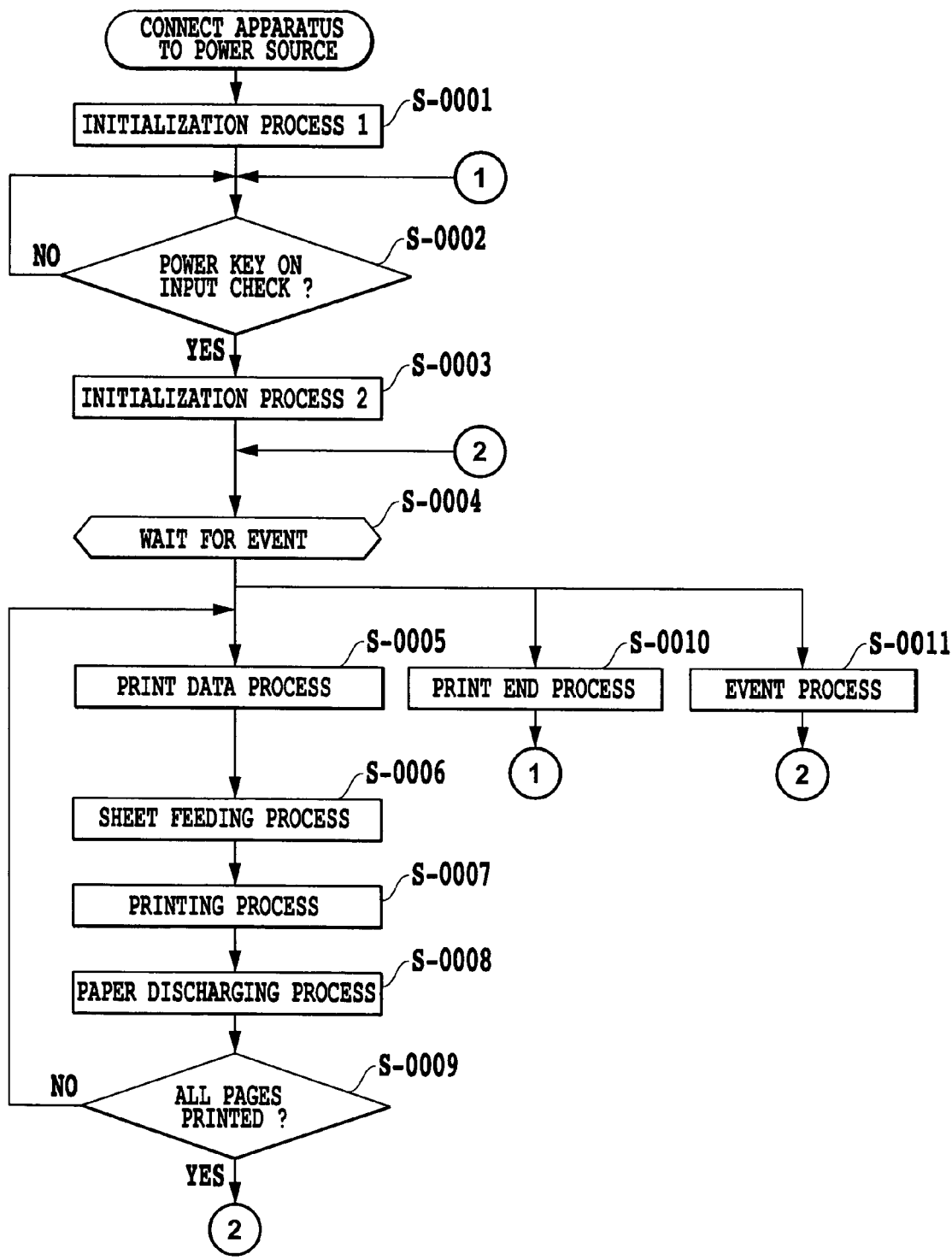

FIG. 53 is a flow chart illustrating a sequence performed by the printing apparatus according to the present embodiment when it is powered on.

When the apparatus main body is connected to an AC power source, the apparatus first undergoes a first initializing process in step S0001. During the initializing process, an electric circuit system including the ROM E1004 and DRAM E2005 of the printing apparatus is checked to determine whether or not the printing apparatus can electrically operate correctly.

In step S0002, it is determined whether or not the power key E0018, provided on the upper case M7040, has been turned on. If the power key E0018 has been depressed, the process shifts to the next step, S0003.

In step S0003, a second initializing process is executed. In this case, the various driving mechanisms of the printing apparatus and the print head H1001 are checked. Specifically, it is checked whether or not the apparatus can operate correctly when the various motors are initialized or when head information is loaded.

In step S0004, the apparatus waits for an event. Specifically, the present printing apparatus monitors an instruction event from the external I/F, a panel key event resulting from a user operation, an internal control event, and the like. When such an event occurs, the present apparatus executes a process corresponding to the event.

For example, if the apparatus receives the print instruction event from the external I/F, the process shifts to step S0005. If the power key event resulting from the user operation occurs, the process shifts to step S0010. Moreover, if another event occurs, the process shifts to step S0011.

In step S0005, print control information contained in print data from the external I/F is analyzed to determine the type of specified print media, the size of paper, the printing grade, the paper feeding method, and the like. Data on the results of the determination is stored in the DRAM E2005 in the printing apparatus. The process then proceeds to step S0006.

Then, in step S2006, paper feeding is started using the paper feeding method specified in step S0005. A print medium is fed to a print start position, and the process then proceeds to step S0007.

In step S0007, a printing operation is performed. In the printing operation, the print data (print image information) dispatched by the external I/F is stored in the reception buffer. Subsequently, the data is read from the reception buffer and subjected to various processes. The processed data is stored in the print buffer E2014. Then, the CR motor E0001 is driven to start moving the carriage M4000 in the main scan direction. At the same time, the print data stored in the print buffer E2014 is supplied to the print head H1001 to print one row of print data. Once one row of print data has been completely printed, the LF motor E0002 is driven to rotate the conveying roller M3060 to feed the print medium in the subscan direction. Subsequently, the above operation is repeated and once one page of print data from the external I/F has been completely printed, the process proceeds to step S0008.

In step S0008, the LF motor E0002 is driven and the paper discharging rollers M3100 and M3110 are driven to repeatedly convey the print medium until it is determined to have been completely fed out of the printing apparatus. Once the paper discharging is finished, the print medium is discharged onto the paper discharging tray M3160. The print medium is thus loaded on other print media (discharged sheets).

In step S0009, it is determined whether or not all the print data to be printed has bee printed. If any page remains to be printed, the process returns to step S0005. Then, the operation from step S0005 to step S0009 is repeated. Once all the data to be printed has been printed, the printing operation is finished. Subsequently, the process shifts to step S0004 to wait for a next event.

On the other hand, in step S0010, a printer ending process is executed to stop the operation of the printing apparatus. Specifically, to disconnect the power supplies to the various motors and print head, the apparatus shifts to the state in which the power supplies can be disconnected. Then, the power supplies are disconnected, and the process proceeds to step S0002 to wait for the power key to be turned on again.

In step S0011, an event different from those mentioned above is carried out. For example, a process is executed which corresponds to a recovery instruction from any of the various panel keys of the printing apparatus or the external I/F or from an internal recovery event. After the process has been finished, the process proceeds to step S0004 to wait for a next event.

Figure 54:
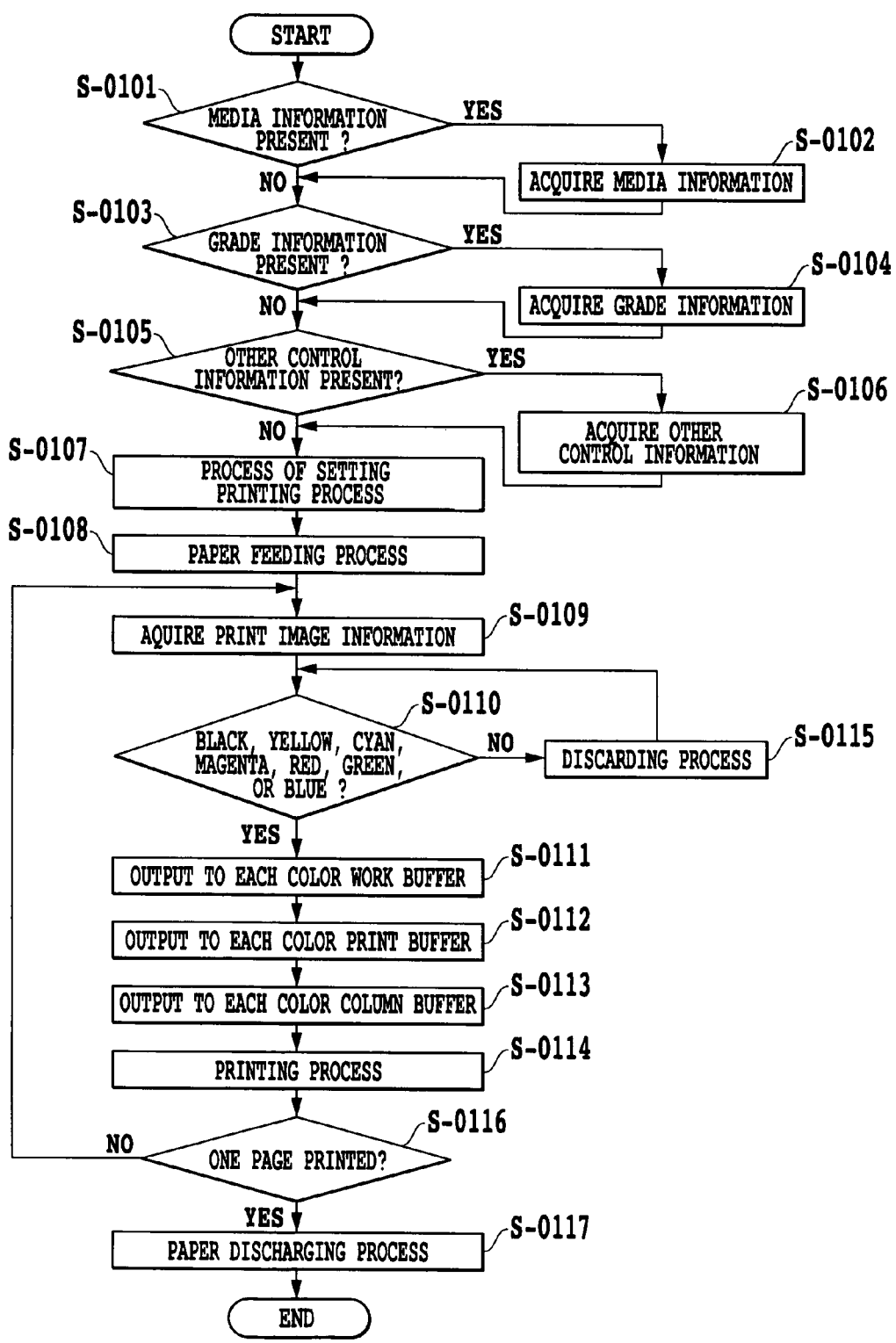
FIG. 54 is a flow chart illustrating processing executed on print data by the printing apparatus applied according to the first embodiment of the present invention.

FIG. 54 is a flow chart illustrating a process executed on print data if any particular color ink is used.

In step S0101, it is determined whether or not there is any information on print media (hereinafter referred to as media information) in print data created by the host apparatus and inputted by the external I/F. If there is any such information, the process shifts to step S0102. Otherwise, the process shifts to step S0103.

In step S0102, the media information is acquired from the reception buffer E2010 and stored in the DRAM E2005.

In step S0103, it is determined whether or not there is any printing grade information in the print data inputted by the external I/F. If there is grade information, the process shifts to step S0104. Otherwise, the process shifts to step S0105.

In step S0104, the grade information is acquired from the reception buffer E2010 and stored in the DRAM E2005.

In step S0105, it is determined whether or not there is control information other than the media and grade information in the print data inputted by the external I/F. If there is other control information, the process shifts to step S0106. Otherwise, the process shifts to step S0107.

In step S0106, the other information is acquired from the reception buffer E2010 and stored in the DRAM E2005. If there are plural pieces of control information, each piece of information is subjected to processing similar to that executed in steps S0105 and S0106.

In step S0107, the work buffer E2011, the print buffer E2014, the expansion data buffer E2016, the dot arrangement pattern shown in FIG. 35, and the mask pattern shown in FIG. 37 are determined from the media, grade, and other information stored in the DRAM E2005 and the table of control information stored in the ROM E1004. These buffers and patterns are then stored.

In step S0108, a paper feeding process is executed.

In the subsequent step, S0109, one row of print image information and color information contained in the print image information are acquired.

Moreover, in step S0110, it is sequentially determined whether or not the print image information (print image data) acquired in step S0109 is on black, yellow, cyan, magenta, red, green, and blue. If the result of the determination is "true", the process shifts to step S0111. If the result of the determination is "false", the process shifts to step S0115. Then, the print image data acquired is discarded and the process returns to step S0110.

Figure 57:
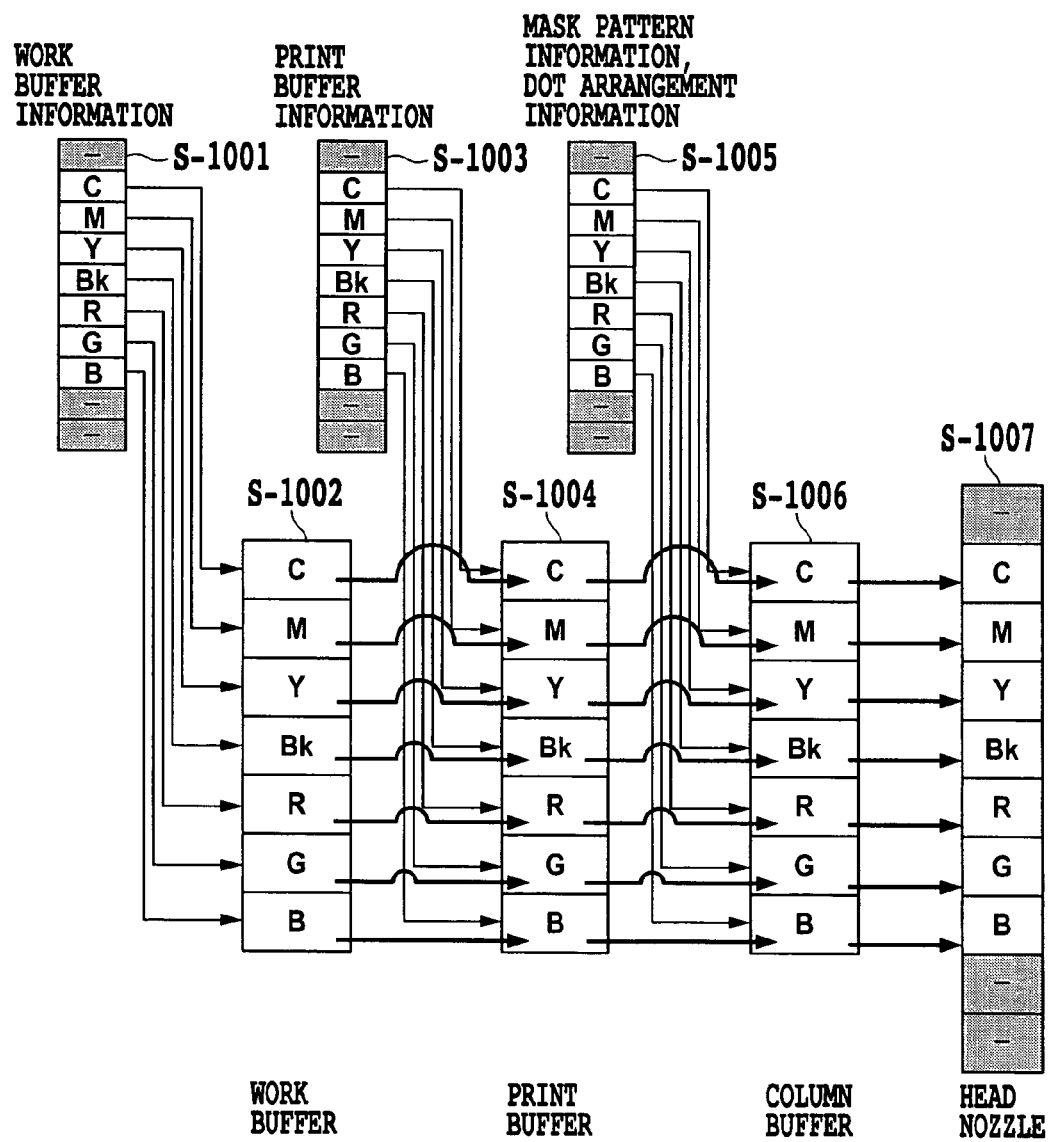
FIG. 57 is an image drawing illustrating the configuration of buffers in the printing apparatus applied according to the first embodiment of the present invention wherein the buffers correspond to the respective colors.

FIG. 57 shows the configurations of the buffers in the printing apparatus according to the present embodiment, wherein the buffers correspond to the respective colors. S1001 denotes work buffer information and S1003 denotes print buffer information. S1005 denotes mask pattern information and dot arrangement pattern information.

In step S0111, the print image data (in the present embodiment, 4-bit data on each of the colors C, M, Y, K, R, G, and B) acquired as a result of the processing in the step S109 is processed in accordance with the work buffer information S1001 as shown in FIG. 57. The processed print image data is outputted to the work buffers S1002 for the respective colors provided in the work buffer E2011.

In a step S0112, the print image data (in the present embodiment, 4-bit data on each of the colors C, M, Y, K, R, G, and B) outputted to the work buffers S1002 for the respective colors as a result of the processing in step S0111 is processed in accordance with the information in the print buffer information S1003 as shown in FIG. 57. The processed print image data is outputted to the print buffers S1004 for the respective colors provided in the print buffer E2014.

In step S0113, the print image data (in the present embodiment, 4-bit data on each of the colors C, M, Y, K, R, G, and B) outputted to the print buffers S1004 for the respective colors as a result of the processing in step S0112 is processed in accordance with the mask pattern information and dot arrangement pattern information S1005 as shown in FIG. 57. The processed print image data (1-bit data on each of the colors C, M, Y, K, R, G, and B) is outputted to the column buffers S1006 for the respective colors provided in the column buffer E2017.

The print image data outputted to the column buffers S1006 for the respective colors is outputted to control sections S1007 for the respective nozzles in the print head. In step S0114, one row of print data is printed.

In step S0116, it is determined whether or not one page of data to be printed has completely been printed. If one page of data to be printed has not completely been printed, the process returns to step S0109 to repeat the process from step S0109 to S0114 until one page of print image information is completely printed.

If it is determined in step S0116 that all the data has been printed, the process proceeds to step S0117 to execute a paper discharging process. The processing of one page is thus completed.

(Inks)

As an essential component, a color material is contained in the inks of each color yellow, magenta, cyan, and black, which are basic colors preferably applicable to the first embodiment of the present invention, and the inks of each color red, green, and blue, which are particular colors preferably applicable to the first embodiment of the present invention.

In the first embodiment, a dye or a pigment can be used as a color material for each of the inks of the basic colors (the primary colors, yellow, magenta, and cyan, as well as black). In particular, the due can be suitably used because it is excellent in reproduction of high-lightness colors. Similarly, a dye or a pigment can be used as a color material for each of the inks of the particular colors (red, green, and blue). In particular, the due can be suitably used because it is excellent in reproduction of high-lightness colors.

In particular, it is very preferable to use inks that permeate through a print medium after adhesion (dye-based inks markedly exhibit this tendency) rather than those whose the color material tends to aggregate on the surface of the print medium (pigment-based inks markedly exhibit this tendency). With the latter inks, most incident light is reflected by the uppermost ink layer, which adheres to the print medium latest. In contrast, with the former inks, incident light is reflected by each of the color ink layers formed inside the print medium. These inks are therefore expected to make the image stereoscopic or clear. Further, preferably, the particular color inks can effectively express an impactive image with a gamut enlarged by the addition of the particular color inks provided that the inks can express colors of a lightness higher than that of a color reproduction area expressed by combinations of the basic colors.

Specifically, if an image is formed using, for example, the yellow and magenta inks and the particular color ink, then on the CIE-L*a*b* color space, the color expressed by the particular color ink on the print medium has a higher lightness than the color reproduction area expressed by a combination of at least the yellow and magenta inks. Further, the hue angle of the color expressed by the particular color ink on the printed medium corresponds to red such as the one in the color reproduction area. Furthermore, preferably, the color expressed on the print medium by the red ink, which is the particular color ink, has a higher saturation than the color reproduction area.

Figure 60:
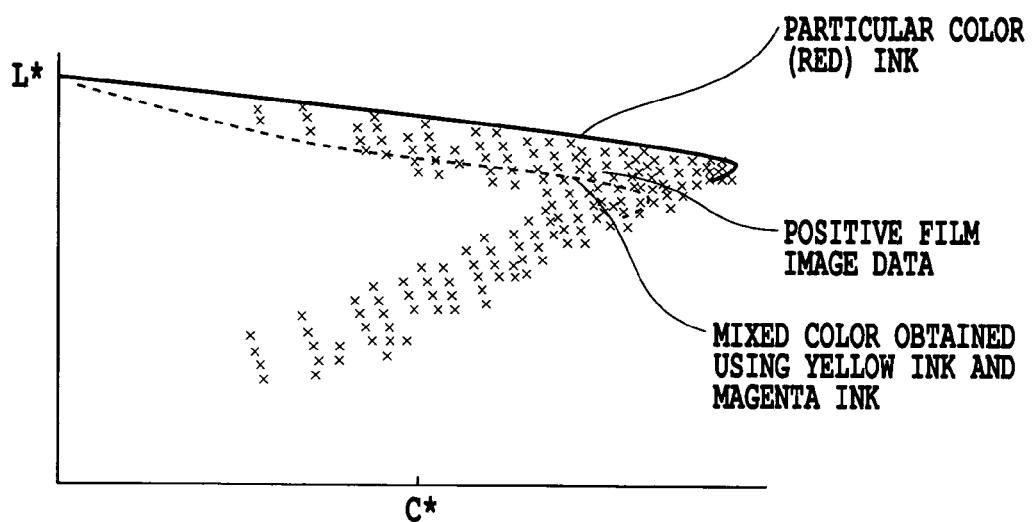
FIG. 60 is a graph schematically showing the relationship between lightness and saturation for illustrating selection or design conditions for ink colors basically employed in the present invention.

FIG. 60 schematically shows the relationship between the lightness (L*) and saturation (c*; $c* = (a*2 + b*2)^{1/2}$) of a color formed of the mixture of red, the color of the particular color ink, yellow, and magenta and of a color expressed by a positive film. The figure indicates that the use of the ink capable of expressing a high lightness color makes the color of an orange or red area more vivid. It is then possible to make the printed image clear and stereoscopic. On the other hand, with a low lightness, even if the orange or red area has an increased saturation, the printed image is insufficiently vivid, contrastive, and stereoscopic. It is thus difficult to output the target image comparable to a positive film. These conditions are also applicable to the relationship between both yellow and cyan inks and the green inks and the relationship between both magenta and cyan inks and the blue ink. According to the first embodiment, using the yellow, magenta, cyan, black, red, green, and blue inks, specific examples of the color materials for the basic inks and particular color inks are as shown below. The color materials can be selected from these groups so as to meet the above conditions.

Cyan Color Materials

C. I. direct blue: 1, 15, 22, 25, 41, 76, 77, 80, 86, 90, 98, 106, 108, 120, 158, 163, 168, 199, 226, 307

C. I. acid blue: 1, 7, 9, 15, 22, 23, 25, 29, 40, 43, 59, 62, 74, 78, 80, 90, 100, 102, 104, 112, 117, 127, 138, 158, 161, 203, 204, 221, 244

Yellow Color Material

C. I. direct yellow: 8, 11, 12, 27, 28, 33, 39, 44, 50, 58, 85, 86, 87, 88, 89, 98, 100, 110, 132, 173

C. I. acid yellow: 1, 3, 7, 11, 17, 23, 25, 29, 36, 38, 40, 42, 44, 76, 98, 99

Magenta Color Material

C. I. direct red: 2, 4, 9, 11, 20, 23, 24, 31, 39, 46, 62, 75, 79, 80, 83, 89, 95, 197, 201, 218, 220, 224, 225, 226, 227, 228, 229, 230

C. I. acid red: 6, 8, 9, 13, 14, 18, 26, 27, 32, 35, 42, 51, 52, 80, 83, 87, 89, 92, 106, 114, 115, 133, 134, 145, 158, 198, 249, 265, 289

C. I. food red: 87, 92, 94

C. I. direct violet 107

It is also possible to use, for example, compounds of the structure described in Japanese Patent Laid-Open No. 2002-069348.

Black Color Material

C. I. direct black: 17, 19, 22, 31, 32, 51, 62, 71, 74, 112, 113, 154, 168, 195

C. I. acid black: 2, 48, 51, 52, 110, 115, 156

C. I. food black 1, 2

Carbon Black

It is also possible to use, for example, compounds of the structure described in WO00/43451.

Red Color Material

C. I. acid orange 7, 10, 33, 56, 67, 74, 88, 94, 116, 142

C. I. acid red 111, 114, 266, 374

C. I. direct orange 26, 29, 34, 39, 57, 102, 118

C. I. food yellow 3

C. I. reactive orange 1, 4, 5, 7, 12, 13, 14, 15, 16, 20, 29, 30, 84

C. I. disperse orange 1, 3, 11, 13, 20, 25, 29, 30, 31, 32, 47, 55, 56

Alternatively, an appropriate mixture of the yellow color material and the magenta color material may be used.

Green Color Material

C. I. acid green 5, 6, 9, 12, 15, 16, 19, 21, 25, 28, 81, 84

C. I. direct green 26, 59, 67

C. I. food green 3

C. I. reactive green 5, 6, 12, 19, 21

C. I. disperse green 6, 9

Alternatively, an appropriate mixture of the yellow color material and the cyan color material may be used.

Blue Color Material

C. I. acid blue 62, 80, 83, 90, 104, 112, 113, 142, 203, 204, 221, 244

C. I. reactive blue 49

C. I. pigment blue 15:6

C. I. acid violet 9, 48, 49, 54, 129

C. I. direct violet 9, 35, 47, 51, 66, 93, 95, 99

C. I. reactive violet 1, 2, 4, 5, 6, 8, 9, 22, 34, 36

C. I. disperse violet 1, 4, 8, 23, 26, 28, 31, 33, 35, 38, 48, 56

Alternatively, an appropriate mixture of the magenta color material and the cyan color material may be used.

Moreover, inks used in, for example, a personal-use ink jet printing apparatus may contain water as a carrier component, a water-soluble organic solvent for preventing the ink from drying to improve reliability, and a surface active agent, a pH regulator, a preservative, and the like.

Second Embodiment

According to a second embodiment of the present invention, the printer uses the basic color inks cyan, magenta, and yellow as well as a light cyan and light magenta inks having a lower dye concentration than the cyan and magenta inks, respectively. The configuration and elements of the print system differs from the first embodiment in accordance with the inks used as described above. The differences between the first and second embodiments will be mainly described below.

(Subsequent Process)

In the subsequent process according to the present embodiment, since the printer uses the basic color inks cyan, magenta, and yellow and the particular color ink red, as well as the light cyan and light magenta inks, having a lower dye concentration than the cyan and magenta inks, respectively, color separation data is generated including color separation data Lc and Lm on these light color inks. A content of color separation table (LUT) according to the present embodiment which is used in this case is added to the above described subsequent process according to the first embodiment and is characterized as described below. The color separation data according to the present embodiment is set to join smoothly to the color separation data obtained by the subsequent process according to the first embodiment.

Figure 61A:
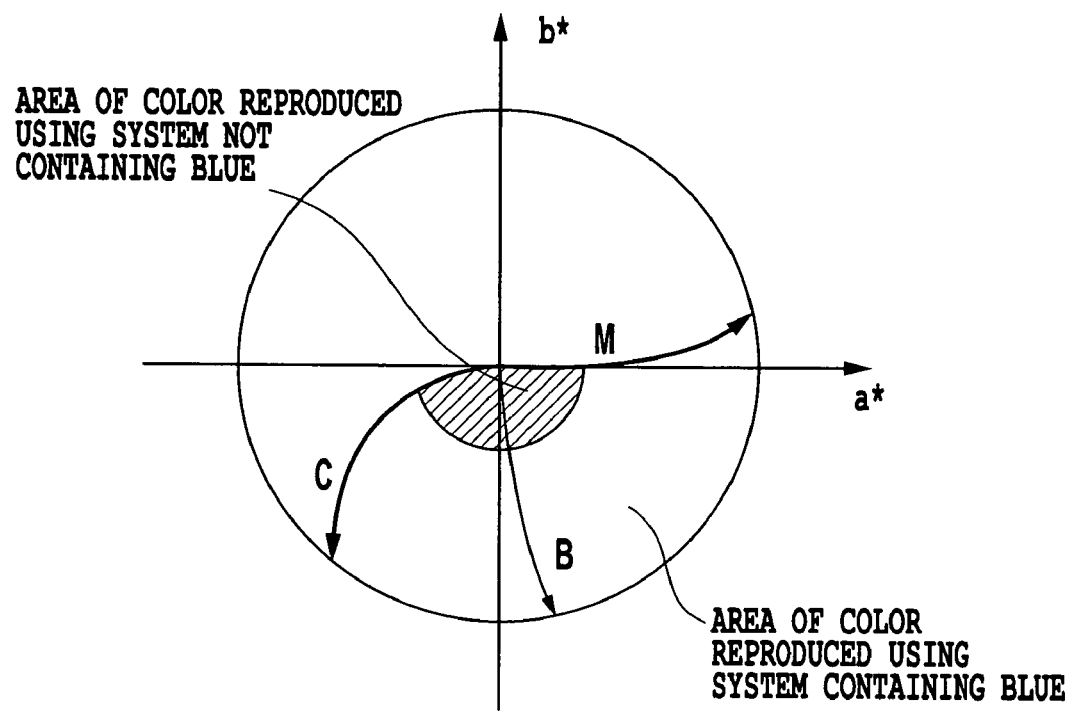
FIG. 61A is a graph showing that a low-saturation part of a particular hue is reproduced without using any particular color inks and FIG. 61B is a graph illustrating that the gamut of the low-saturation area otherwise enlarged by a particular color material cannot be effectively utilized.
Figure 61B:
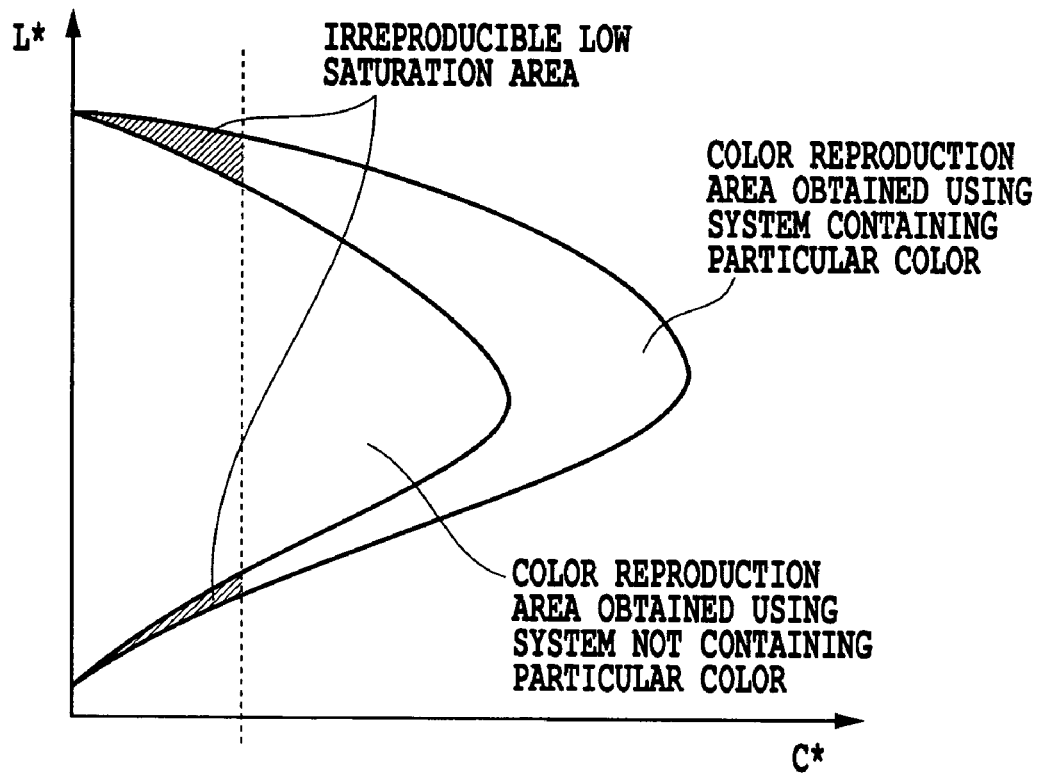

For example, the conventional technique shown in Japanese Patent Application Laid-Open No. 08-85219 (1996) reproduces a low saturation part that is shaded in FIG. 61A, without using the blue ink of the particular color material. A problem with this technique is that the gamut otherwise enlarged by the particular color material cannot be effectively utilized as shown in the shaded part in FIG. 61B. In contrast, the present embodiment uses such a color separation table as uses, for a low-saturation part of a hue that can be expressed by a particular color material, not only a low concentration color material that can express the color of the hue but also the above particular color material. This makes it possible to effectively use the gamut that can be enlarged by the particular color and to weaken a granular impression.

Figure 62:
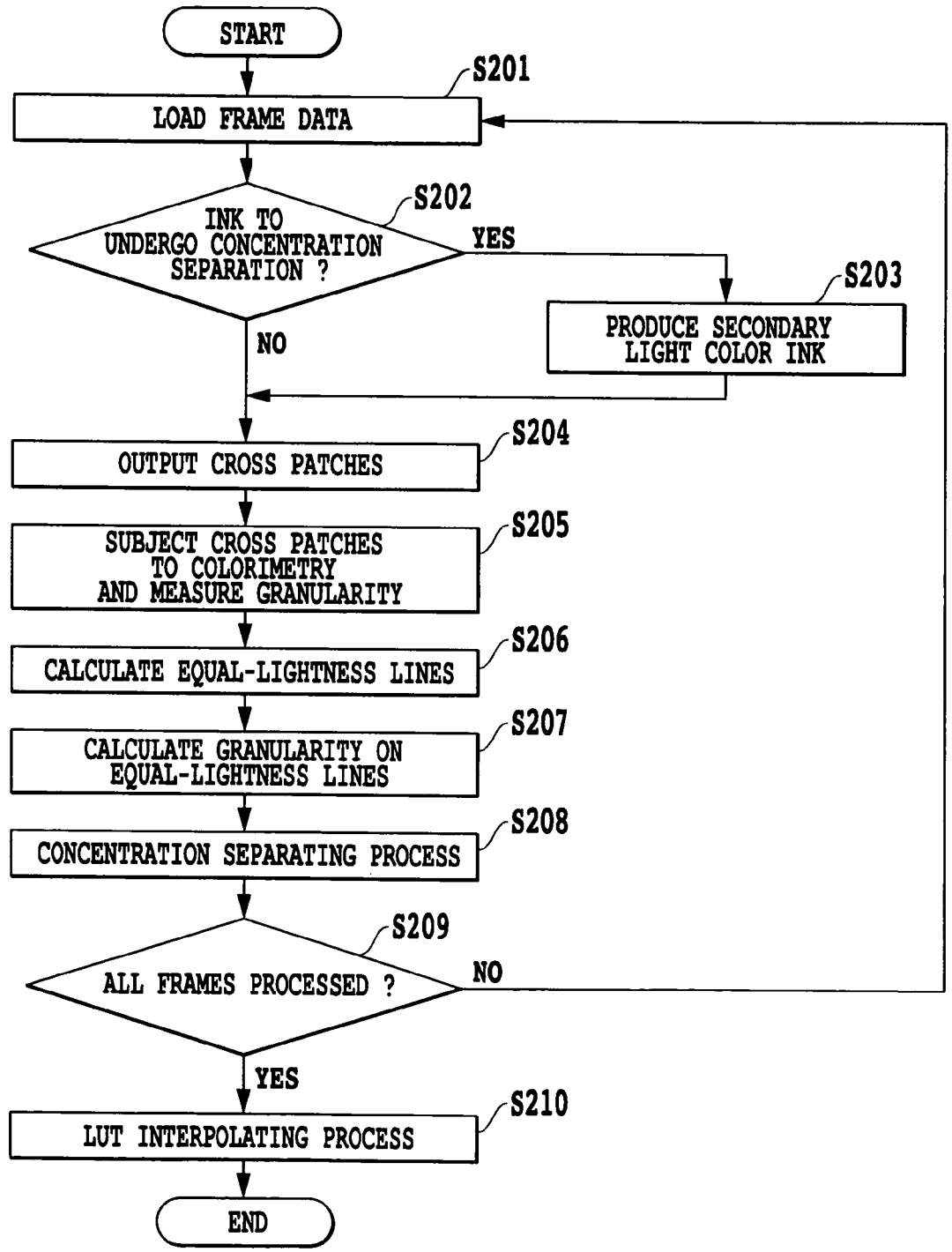
FIG. 62 is a flow chart showing a process of creating an LUT that generates color separation data containing those on light cyan and light magenta, according to the second embodiment of the present invention.

FIG. 62 is a flow chart showing a process of creating an LUT that generates color separation data including data Lc and Lm on light cyan and light magenta, respectively.

Figure 63A:
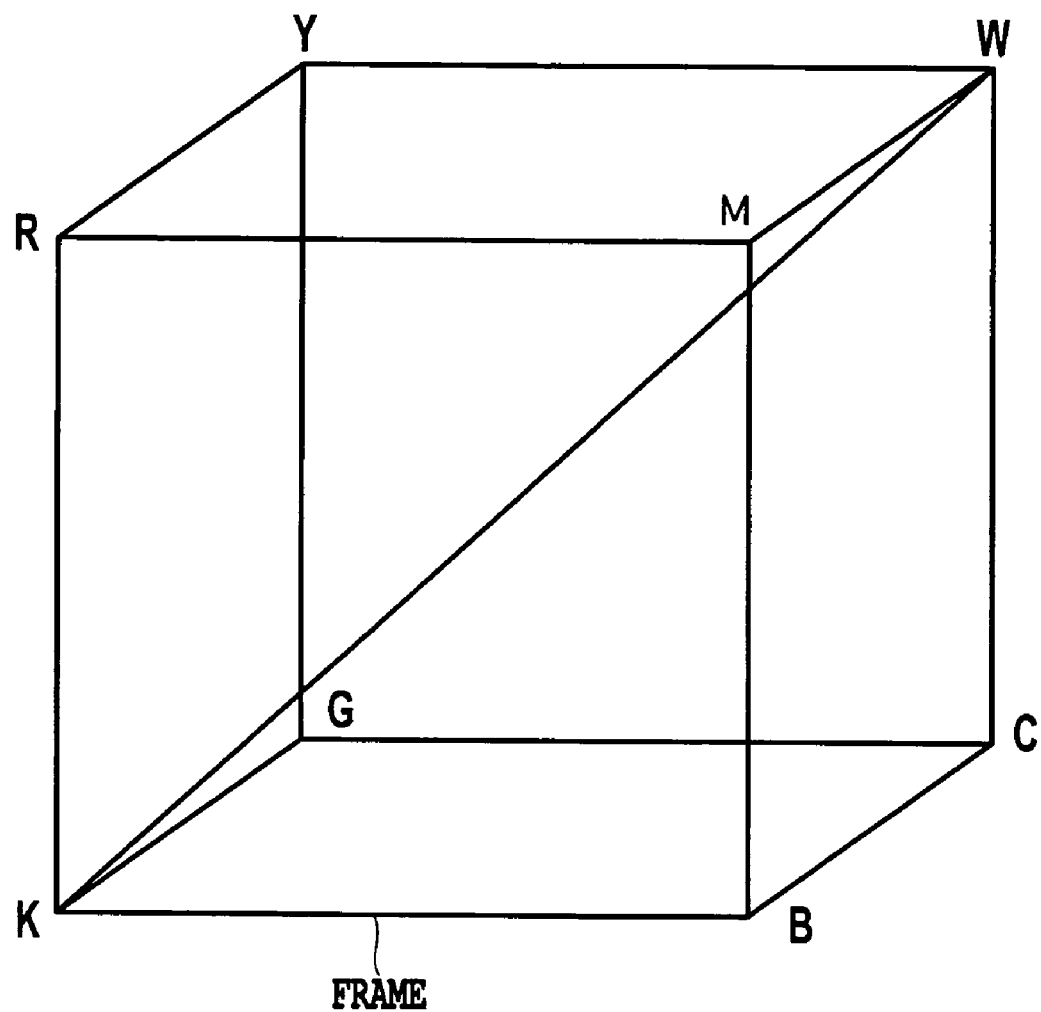
FIG. 63A is a diagram illustrating frame data used for the LUT creating process.
Figure 63B:
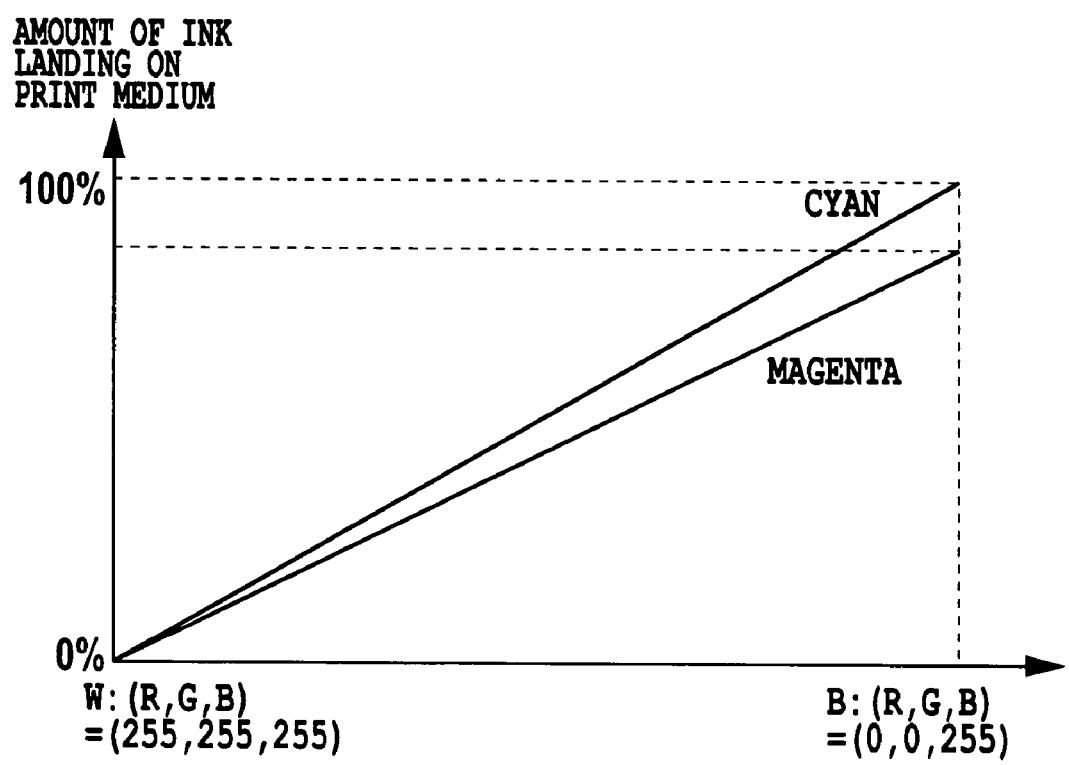
FIG. 63B is a graph showing data on one frame.

First, in step S201, frame data is loaded which is stored in a predetermined memory and which has not undergone concentration separation yet. Specifically, an LUT is created which generates color separation data Y, M, C, K, and R not including those on light cyan and light magenta. Then, the frame data from the LUT is loaded. The frame data refers to lattice point data, that is, color separation data wherein when the entire LUT is conceptually expressed as a cubic lattice such as the one shown in FIG. 63A, lattice points are present on the sides or diagonals (frames: W-R, W-G, . . . , Y-K, . . . , W-K, and so on) of the cubic lattice. For example, the color separation data on the frame W-B is as shown in FIG. 63B. Of course, the LUT from which the frame data is read need not contain lattice point data on all the lattice points including those inside the cubic lattice shown in FIG. 63A but may contain lattice point data on at least predetermined frames.

Then, in step S202, it is determined whether or not there is color separation data R on the particular color ink red, which is to undergo concentration separation. If there is the color separation data R, the process proceeds to step S203. Otherwise, the process proceeds to step S204.

Figure 64:
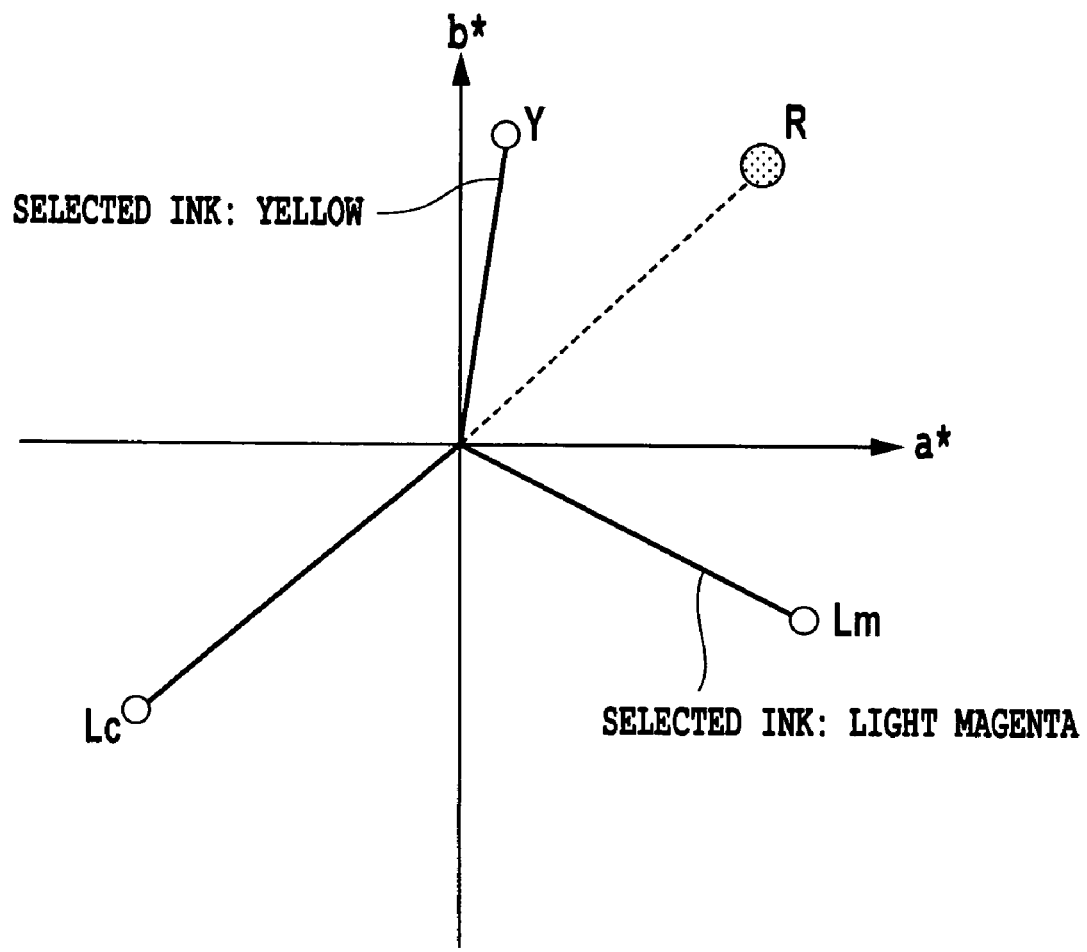
FIG. 64 is a graph illustrating a part of the LUT creating process in which color separation data on the particular color ink red is partly separated into color separation data on a yellow and light magenta inks having light colors (low dye concentrations)
Figure 65A:
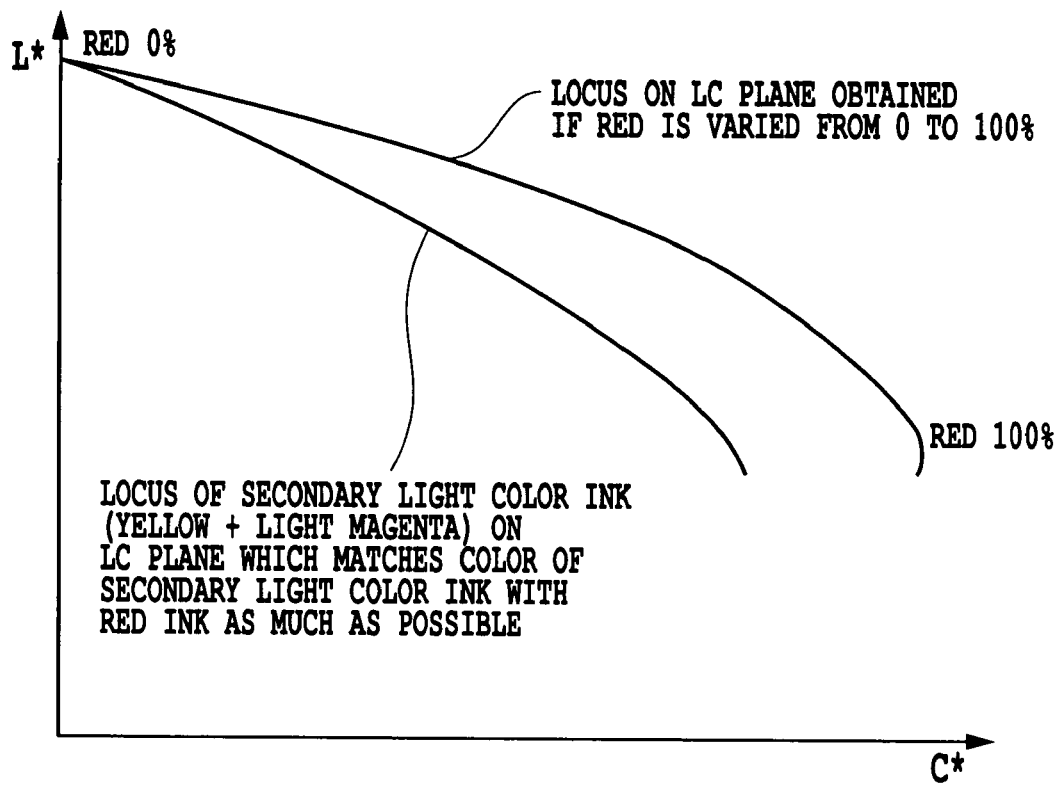
FIG. 65A is a graph illustrating a process of color matching to the particular color ink red in the color separation.
Figure 65B:
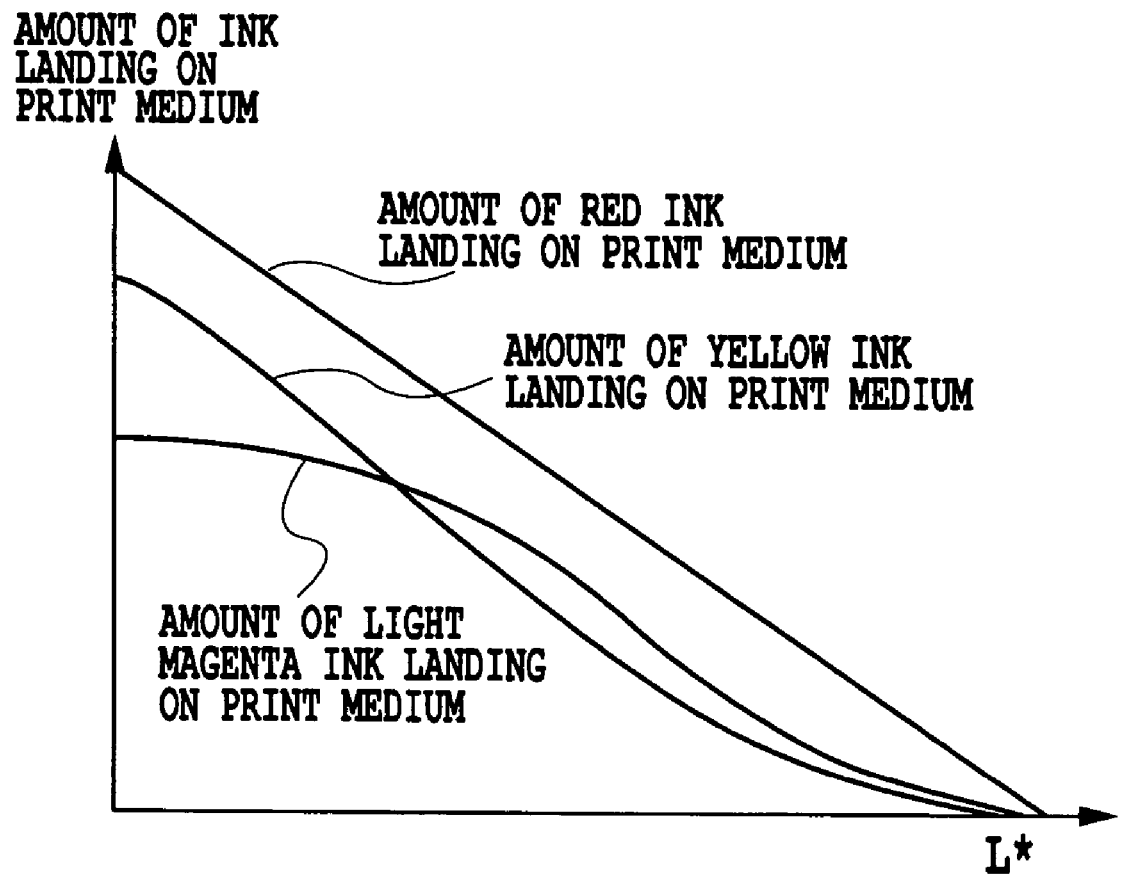
FIG. 65B is a graph showing the results of the color matching.

In step S203, the yellow, light-magenta, and red inks are used to create patch data required to obtain color separation data on these inks in order to express the color separation data R. Specifically, as shown in FIG. 64, the color separation data on the particular color ink red is separated into color separation data on yellow and light magenta inks, which are light color (low dye concentration) inks corresponding to the hues Y and Lm, between which the hue R of the particular color ink red is sandwiched. Then, patch data is created which is expressed by the above color separation data and the color separation data on the red ink. Then, patches are outputted on the basis of the patch data (step S204) and then subjected to colorimetry. On the basis of the results of the colorimetry, the process shown in steps S205 to S207 is executed to subject the color separation data to concentration separation to obtain the final color separation data on the yellow and light magenta inks. As shown in FIG. 65A, in this color separation data, the rate of the secondary color light ink (FIG. 65B) is such that the resulting color matches the particular color ink red as much as possible.

Figure 66:
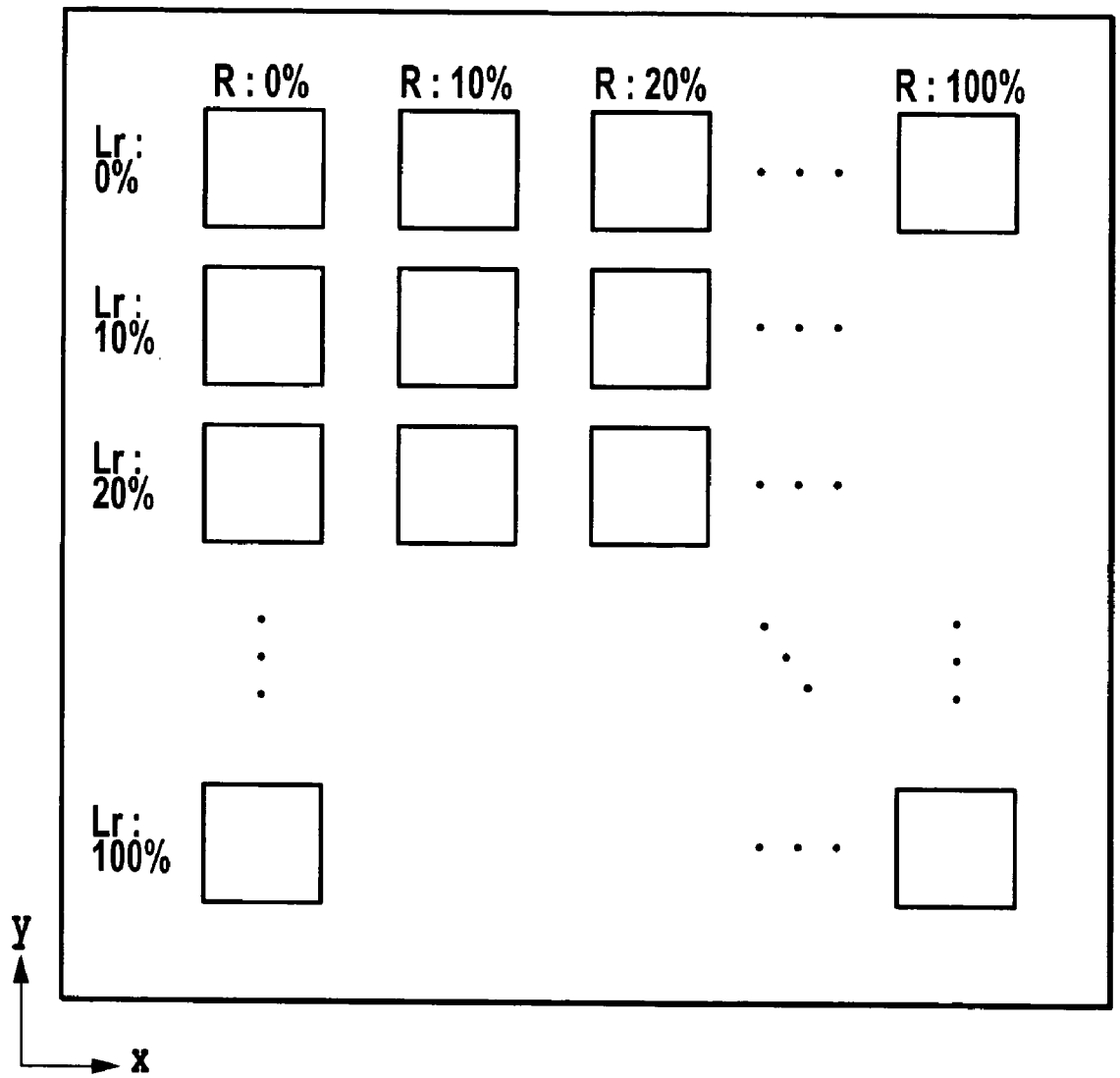
FIG. 66 is a diagram showing patch data generated during the LUT creation on the basis of the relationship between the red ink and a secondary light color ink.

Patches output in step S204 are based on the patch data created in step S203 as described above or on the patch data of the frame data per se. The patch data is created and outputted for each of the frames for the color separation data R or other color separation data for which the concentration separation is executed. Only the concentration separation process for the color separation data R is described below. As shown in FIG. 66, cross patch data is generated and outputted in which the amount of red ink that has landed R varies in the x direction at a fixed rate, while the amount of secondary light color ink, that is, yellow and light magenta inks, that has landed Lr=Y+Lm varies in the y direction at a fixed rate.

Figure 67A:
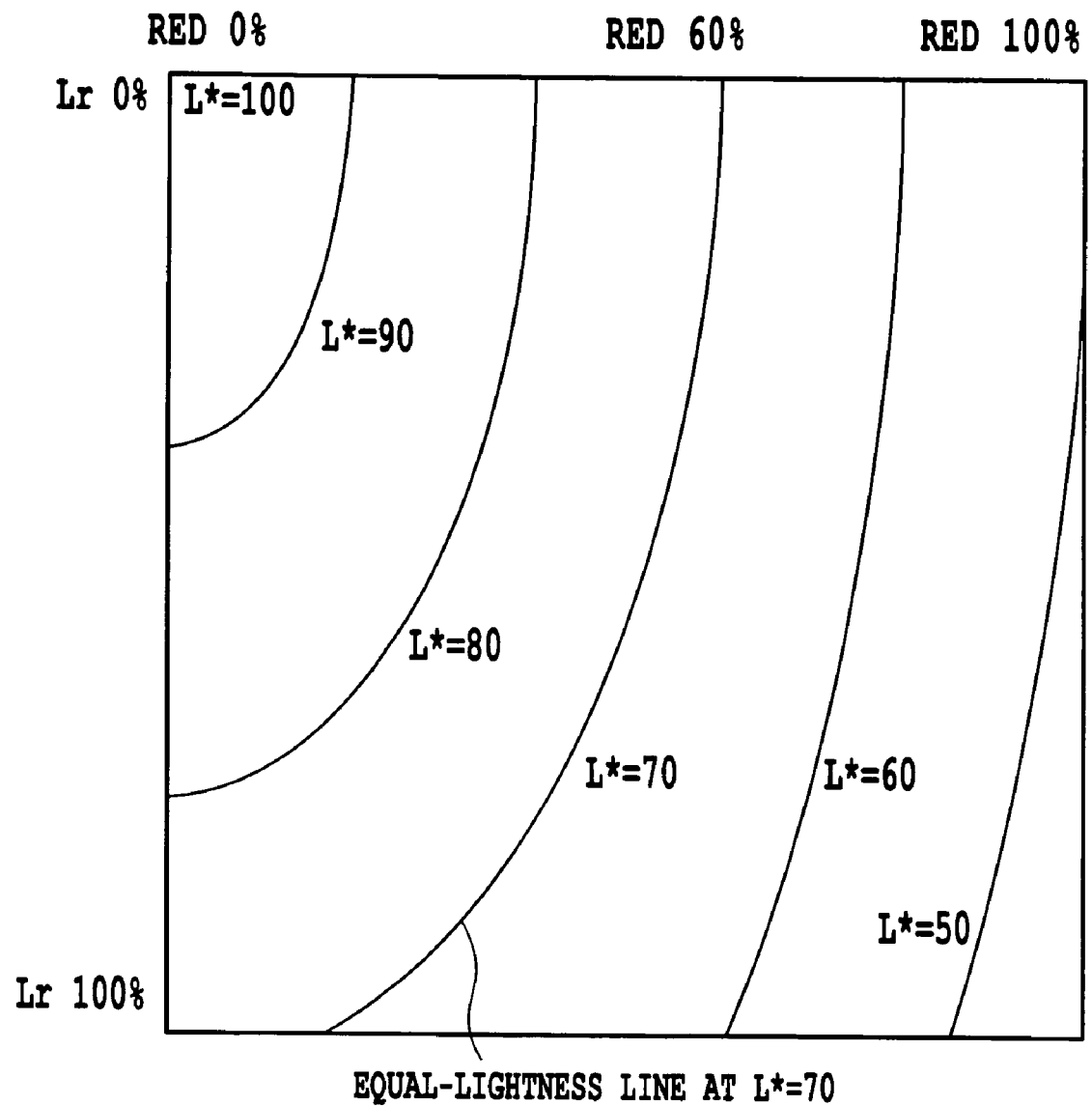
FIG. 67A is a diagram showing equal-lightness lines of the patches subjected to colorimetry in the LUT creating process.
Figure 67B:
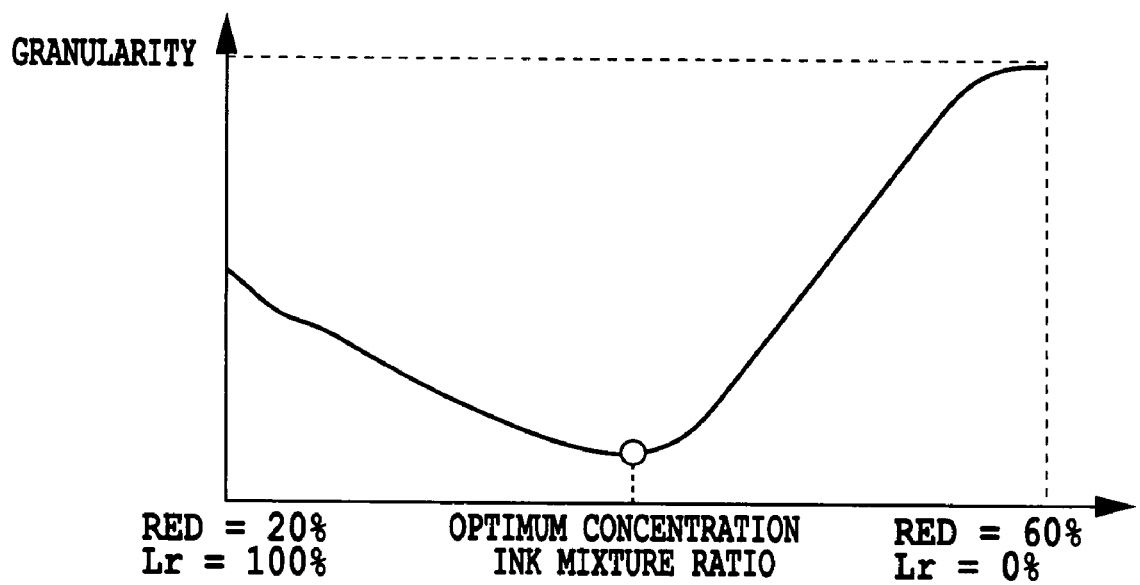
FIG. 67B is a graph illustrating the calculation of granularity for each equal-lightness line.

Then, in step S205, the cross patches are subjected to colorimetry. Further, the granularity of the cross patches is measured in terms of, for example, RMS granularity. Then, in step S206, the cross patch colorimetric information obtained in step S205 is used to calculate an equal-lightness line (the line joining (data on) patches of an equal lightness together) for the patch as shown in FIG. 67A. Moreover, in step S207, as shown in FIG. 67B, the granularity is calculated for each equal-lightness line obtained above. Specifically, FIG. 67B shows an equal-lightness line with a lightness $L^*$ of 70, shown in FIG. 67A. For each of such equal-lightness lines, color separation data is obtained which relates to the mixture ratio of the yellow ink to the light magenta ink corresponding to the best granularity (most insignificant granular impression). Then, in step S208, data on lattice points corresponding to the equal-lightness line is changed with the obtained color separation data on the mixture ratio of the yellow ink to the light magenta ink which corresponds to the best granularity, for an update. Obtaining color separation data allows the yellow and light magenta inks and the particular color ink red to be used in a low saturation part of R similar to the gamut represented by the shaded part in FIG. 12 in the above publication. This in turn enables the effective utilization of the gamut enlarged by the particular color ink.

In step S209, it is determined whether or not the concentration separation process has been finished on all the frames. If the concentration separation has been finished on all the frames, the process proceeds to step S210. Otherwise, the process returns to step S201 to execute concentration separation process on the unprocessed frames. In step S210, the lattice point data on the frames undergoing the density separation is interpolated to create an LUT containing the data obtained after the density separation.

As described above, according to the present embodiment, the particular color ink is used to effectively enlarge the gamut. Furthermore, if the particular color ink is used in addition to the basic color inks, it is possible to create a color separation LUT that weakens the granular impression of a highlight part without using a light color ink corresponding to the particular color ink. Further, since the particular color is used all over the gamut, it is possible to avoid the false contour problem resulting from a variation in the combination of inks used at the boundary between a part with the particular color ink and a part without the particular color ink as described in the above publication.

(Configuration of Print Head)

Description will be given below of the configuration of the head cartridge H1000 applied according to the present embodiment.

As in the case of the first embodiment, the head cartridge H1000 according to the present embodiment has the print head H1001, the means on which the ink tank H1900 is mounted, and the means for supplying ink from the ink tank H1900 to the print head. The head cartridge H1000 is removably mounted on the carriage M4000.

In the present embodiment, the ink tank H1900 is installed in the head cartridge H1000 in the same manner as that shown in FIG. 46, already described. However, the printing apparatus according to the present embodiment uses seven color inks, that is, cyan, magenta, yellow, black, red, light cyan, and light magenta, to form an image. Accordingly, the ink tank H1900 is provided with independent tanks for the seven colors.

Figure 49:
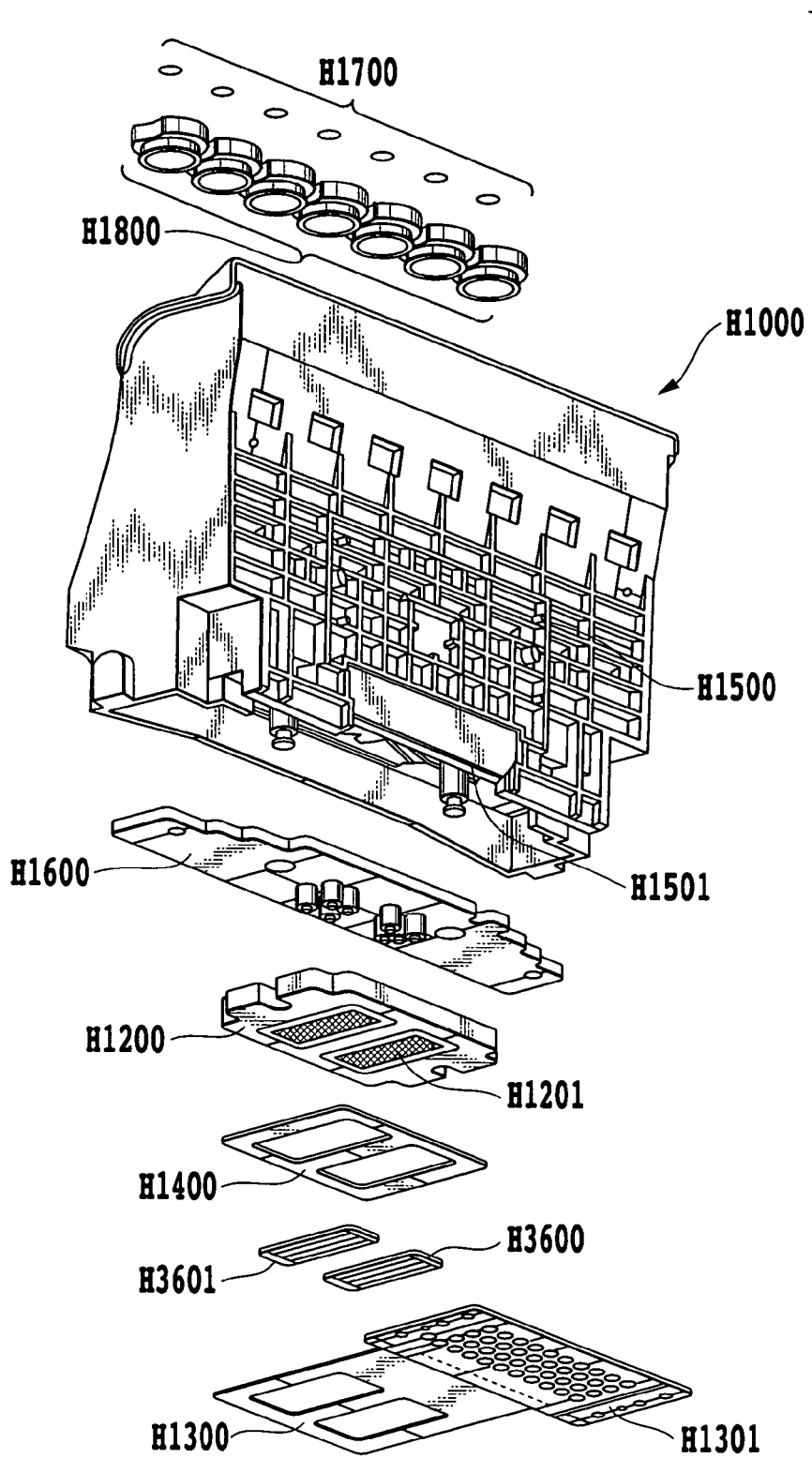
FIG. 49 is an exploded perspective view of a head cartridge applied according to a second embodiment of the present invention.

FIG. 49 is an exploded perspective view of the head cartridge H1000 according to the present embodiment. In the present embodiment, the configuration of the head cartridge H1000 is similar to that shown in FIG. 47, described in the first embodiment. Accordingly, the detailed description of the configuration of and assembly method for the head cartridge is omitted. However, in the present embodiment, inks from the ink tank H1900 for the seven colors are distributed among nine nozzle rows. Further, for example, a first print element circuit board H3600 and a second print element circuit board H3601 in which the nozzle rows are formed are different from those of the first embodiment.

Figure 50:
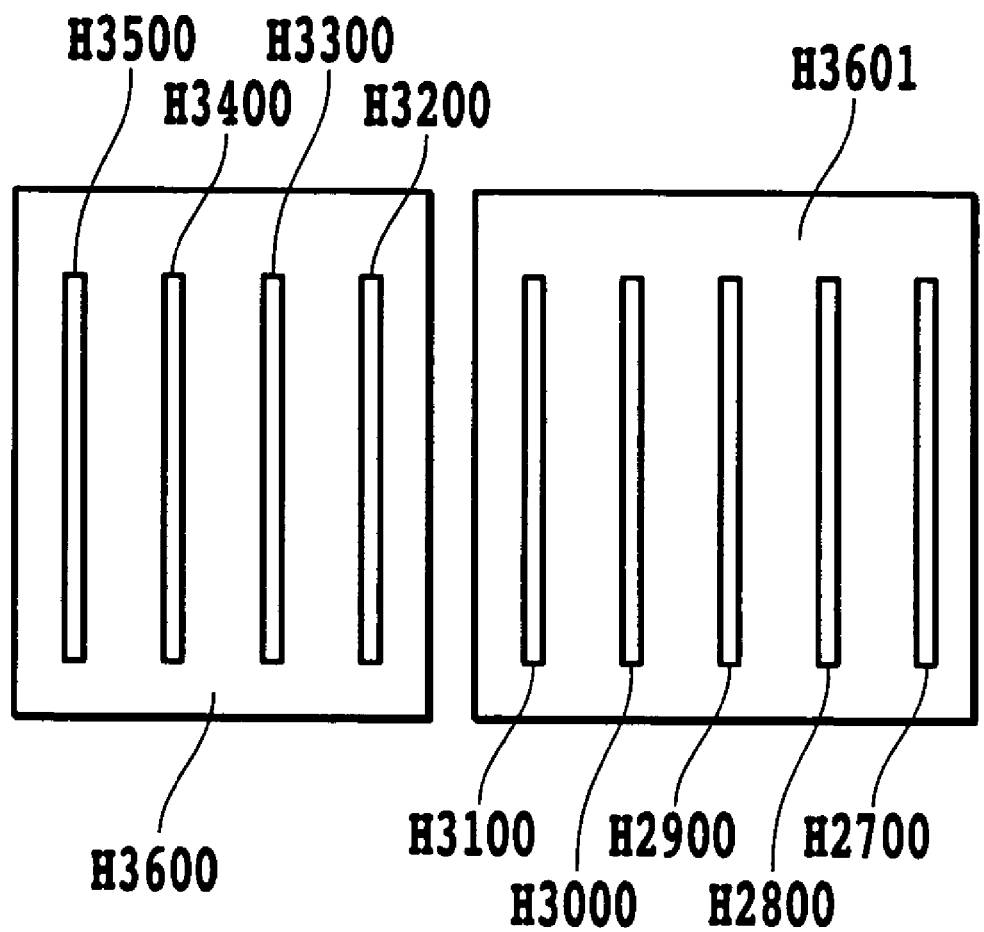
FIG. 50 is a front view of a print element circuit board in the head cartridge applied according to the second embodiment of the present invention.

FIG. 50 is an enlarged front view illustrating the configurations of the first print element circuit board H3600 and second print element circuit board H3601 according to the present embodiment. H2700 to H3500 denote nozzle rows corresponding to different color inks or the same color ink. The first print element circuit board H3600 is provided with the nozzle row H3200 to which the light cyan ink is supplied, the nozzle row H3300 to which the black ink is supplied, the nozzle row H3400 to which the red ink is supplied, and the nozzle row H3500 to which the light magenta ink is supplied.

The following five nozzle rows for the three colors are formed in the second print element circuit board H3601: the two nozzle rows H2700 and H3100 to which the cyan ink is supplied, the two nozzle rows H2800 and H3000 to which the magenta ink is supplied, and the nozzle row H2900 to which the yellow ink is supplied. The magenta nozzle rows and the cyan nozzle rows are arranged line-symmetrically with respect to the yellow ink nozzle row H2900.

When the cyan, magenta, and yellow nozzle rows are arranged symmetrically in the scan direction of the carriage M4000, the color nonuniformity of the resulting image is reduced if the carriage M4000 is used for bidirectional printing. The color nonuniformity is mainly caused by a variation in color development characteristic resulting from a variation in the order of ink colors impacting the print medium. If the two magenta nozzle rows and the two cyan nozzle rows are arranged symmetrically with respect to the yellow ink nozzle row H2900, the inks can be made to impact the print medium in a fixed order by switching the nozzle rows to be utilized, between a forward scan and a backward scan. Thus, the present embodiment is characterized in that a high grade image can be quickly formed in both directions.

The nozzle rows are preferably arranged symmetrically for all the seven rows utilized. However, to avoid increasing the size and cost of the apparatus and complicating the data processing, the present embodiment symmetrically arranges only the nozzle rows of the three colors that contribute markedly to the color nonuniformity notably during bidirectional printing, that is, cyan, magenta, and yellow.

Further, the ink channel H1501 according to the present embodiment branches into a cyan ink channel and a magenta ink channel in the middle. Accordingly, ink supplied from one ink tank can be distributed between the two nozzle rows.

(Sequence for Printing Apparatus)

Description will be given below of a series of operations performed by the printing apparatus according to the present embodiment. The sequence of operations performed by the printing apparatus according to the present embodiment when it is powered on is similar to that described with reference to the flow chart in FIG. 53.

Figure 55B:
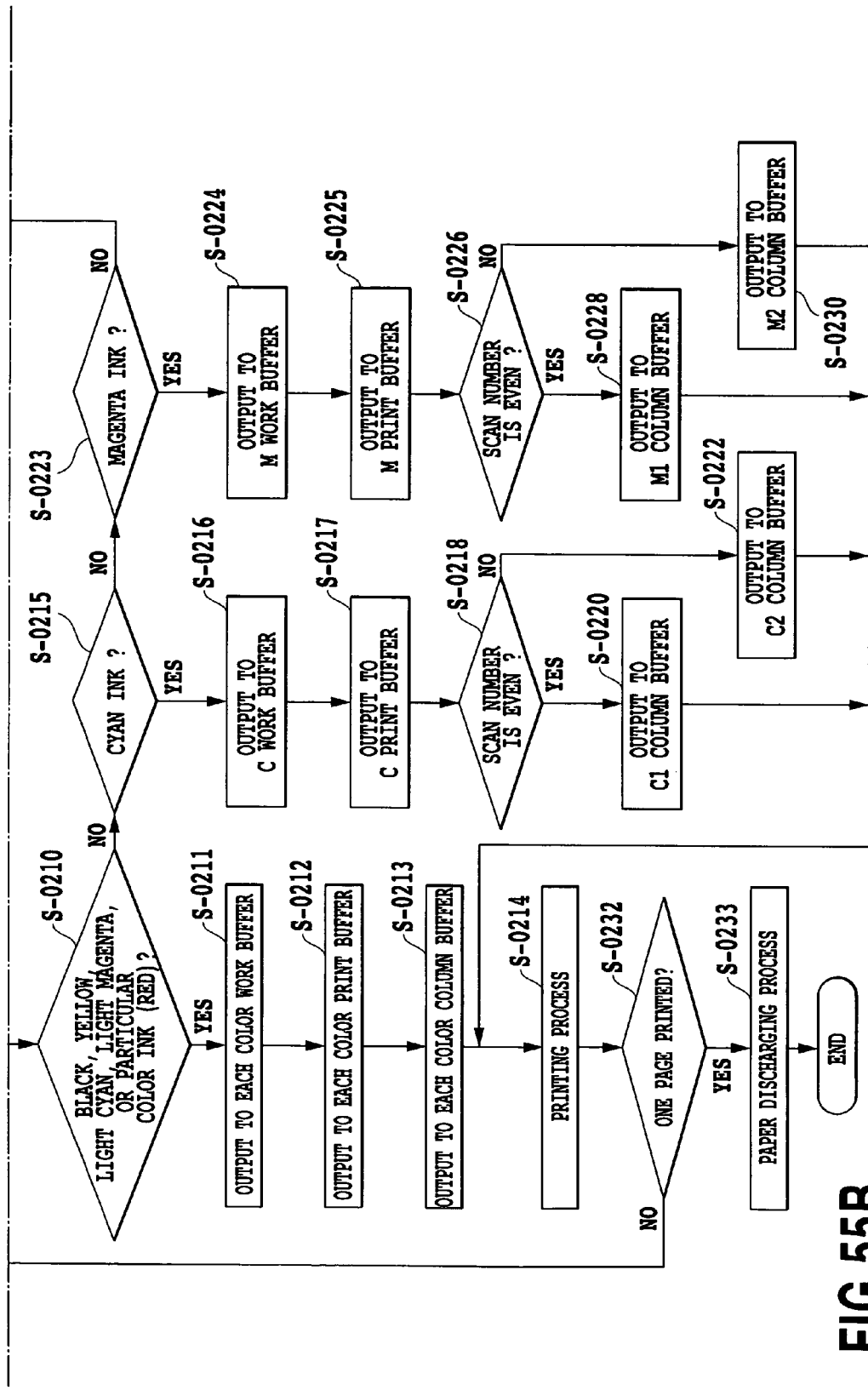
FIG. 55 is a diagram showing a relationship between FIGS. 55A and 55B, which are flow charts illustrating processing executed on print data by the printing apparatus applied according to the second embodiment of the present invention.

FIGS. 55A and 55B are flow charts illustrating processing executed on print data if six color inks according to the present embodiment are printed using seven nozzle rows. Steps S0201 to S0209 are similar to steps S0101 to 0109, described in FIG. 54 for the first embodiment. Accordingly, their description is omitted and the steps following S0210 will be described.

In step S0210, it is sequentially determined whether or not the print image information (print image data) acquired in step S0209 is on black, yellow, light cyan, light magenta, and red. If the result of the determination is "true", the process shifts to step S0211. If the result of the determination is "false", the process shifts to step S0215.

Figure 58:
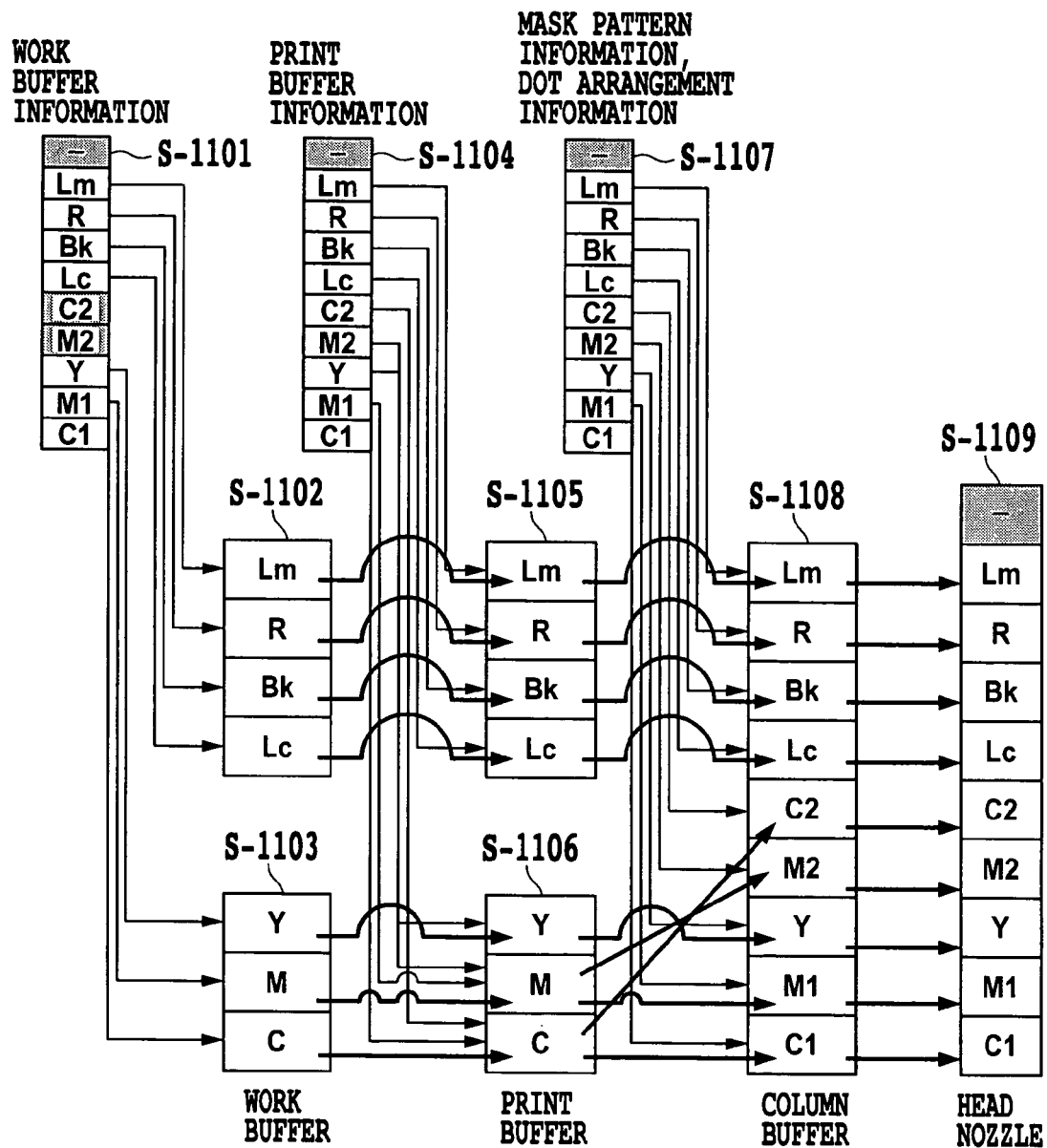
FIG. 58 is an image drawing illustrating the configuration of buffers in the printing apparatus applied according to the second embodiment of the present invention wherein the buffers correspond to the respective colors.

FIG. 58 shows the configurations of the buffers in the printing apparatus according to the present embodiment, wherein the buffers correspond to the respective colors. S1101 denotes work buffer information and S1104 denotes print buffer information. S1107 denotes mask pattern information and dot arrangement pattern information.

In step S0211, the print image data acquired as a result of the processing in step S209 is processed in accordance with the work buffer information S1101 as shown in FIG. 58. The processed print image data is outputted to work buffers S1102 and S1103 for the respective colors provided in the work buffer E2011.

In step S0212, the print image data outputted to the work buffers S1102 and S1103 as a result of the processing in step S0211 is processed in accordance with the information in the print buffer information S1104 as shown in FIG. 58. The processed print image data is outputted to the print buffers S1105 and S1106 for the respective colors provided in the print buffer E2014.

In step S0213, the print image data in the print buffers S1105 and S1106 for the respective colors provided in the print buffer E2014 in step S0212 is processed in accordance with the mask pattern information and dot arrangement pattern information S1007 stored in step S0207 as shown in FIG. 57. The processed print image data is outputted to the column buffers S1108 for the respective colors provided in the column buffer E2017.

The print image data outputted to the column buffers S1108 for the respective colors is outputted to control sections S1109 for the respective nozzles in the print head.

Of the print image data acquired in step S0209, information on cyan and magenta is processed in step S0215 and the subsequent steps.

In step S0215, it is determined whether or not the information acquired in step S0209 is print image information on the cyan ink. If the result is "true", the process proceeds to step S0216. If the result is "false", the process proceeds to step S0223.

In step S0216, the cyan image information acquired in step S0209 is processed in accordance with the work buffer information S1101 stored in step S0207, as shown in FIG. 58. The processed print image data is outputted to a cyan area of the work buffer S1103 provided in the work buffer E2011.

In step S0217, the cyan image data outputted to the work buffer S1103 in step S0216 is processed in accordance with the print buffer information S1104 stored in step S0207, as shown in FIG. 58. The processed print image data is outputted to a cyan area of the print buffer S1106 provided in the print buffer E2014.

In step S0218, it is determined whether a printing scan to print the next row has an even or odd ordinal number. If the printing scan has an even ordinal number, the process proceeds to step S0220. If the printing scan has an odd ordinal number, the process proceeds to step S0222.

In step S0220, the print image data outputted to the cyan area of the print buffer S1106 in step S0217 is processed in accordance with the mask pattern information and dot arrangement information S1107 stored in step S0207. Then, the print image data is outputted to an area C1 of the column buffer S1108 provided in the column buffer E2017. Here, C1 refers to one of the two nozzle rows provided for the cyan ink.

In step S0220, the print image data outputted to the area C1 in the column buffer S1108 is outputted to the control section S1109 for the nozzle row C1 in the print head.

On the other hand, in step S0222, the print image data outputted to the cyan area of the print buffer S1106 in step S0217 is processed in accordance with the mask pattern information and dot arrangement information S1107 stored in step S0207. Then, the print image data is outputted to an area C2 of the column buffer S1108 provided in the column buffer E2017. Here, C2 refers to one of the two nozzle rows provided for the cyan ink which is different from the nozzle row C1.

In step S0222, the print image data outputted to the area C2 in the column buffer S1108 is outputted to the control section S1109 for the nozzle row C2 in the print head.

If the result of the determination is "false" in step S0215, the process proceeds to step S0223 to determine whether or not the information acquired in step S0209 is print image information on the magenta ink. If the result of the determination is "true", the process shifts to step S0224. If the result is "false", the image data acquired is discarded and the process then returns to step S0209.

In step S0224, the magenta image information acquired in step S0209 is processed in accordance with the work buffer information S1101 stored in step S0207, as shown in FIG. 58. The processed print image data is outputted to a magenta area of the work buffer S1103 provided in the work buffer E2011.

In step S0225, the magenta image data outputted to the work buffer S1103 in step S0224 is processed in accordance with the print buffer information S1104 stored in step S0207, as shown in FIG. 58. The processed print image data is outputted to a magenta area of the print buffer S1106 provided in the print buffer E2014.

In step S0226, it is determined whether a printing scan to print the next row has an even or odd ordinal number. If the printing scan has an even ordinal number, the process proceeds to step S0228. If the printing scan has an odd ordinal number, the process proceeds to step S0230.

In step S0228, the print image data outputted to the magenta area of the print buffer S1106 in step S0225 is processed in accordance with the mask pattern information and dot arrangement information S1107 stored in step S0207. Then, the print image data is outputted to an area M1 of the column buffer S1108 provided in the column buffer E2017. Here, M1 refers to one of the two nozzle rows provided for the magenta ink.

In step S0228, the print image data outputted to the area M1 in the column buffer S1108 is outputted to the control section S1109 for the nozzle row M1 in the print head.

On the other hand, in step S0230, the print image data outputted to the magenta area of the print buffer S1106 in step S0225 is processed in accordance with the mask pattern information and dot arrangement information S1107 stored in step S0207. Then, the print image data is outputted to an area M2 of the column buffer S1108 provided in the column buffer E2017. Here, M2 refers to one of the two nozzle rows provided for the magenta ink which is different from the nozzle row M1.

In step S0230, the print image data outputted to the area M2 in the column buffer S1108 is outputted to the control section S1109 for the nozzle row M2 in the print head.

The print image data outputted to the control section S1109 for each nozzle row in the print head is printed for one row in step S0214.

In the subsequent step, S0232, it is determined whether or not one page of data to be printed has completely been printed. If one page of data to be printed has not completely been printed, the process returns to step S0209 to repeat the process steps S0209 to S0214 until one page of print image information is completely printed.

If it is determined in step S0232 that all the data has been printed, the process proceeds to step S0233 to execute a paper discharging process.

The printing of one page is thus completed.

(Inks)

The second embodiment, employing yellow, magenta, cyan, black, red, light magenta, and light cyan inks, may use specific examples of color materials for yellow, magenta, cyan, black, and red which are similar to those of the first embodiment. Specific examples of the light-magenta and cyan color materials can be selected from the cyan and magenta color materials described in the above first embodiment, so as to meet the above conditions. The color material for light cyan may be the same as or different from the color material for cyan. This also applies to magenta.

The light cyan and magenta inks have lower color material densities than the cyan and magenta inks, respectively, which are simultaneously used in combination. Moreover, inks used in, for example, a personal-use ink jet printing apparatus may contain water as a carrier component, a water-soluble organic solvent for preventing the ink from drying to improve reliability, and a surface active agent, a pH regulator, a preservative, and the like.

The above description is also applicable to a third embodiment described below.

Third Embodiment

The third embodiment of the present invention uses the same inks as those of the above second embodiment but has a structure different from that of the second embodiment. For example, the arrangement of the ejection openings in the print head varies depending on the inks. The printing sequence correspondingly varies depending on the inks. These differences will be described below.

(Configuration of Print Head)

Description will be given below of the configuration of the head cartridge H1000 applied according to the present embodiment.

As in the case of the above embodiments, the head cartridge H1000 according to the present embodiment has the print head H1001, the means on which the ink tank H1900 is mounted, and the means for supplying ink from the ink tank H1900 to the print head. The head cartridge H1000 is removably mounted on the carriage M4000.

In the present embodiment, the ink tank H1900 is installed in the head cartridge H1000 in the same manner as that shown in FIG. 46, already described. The printing apparatus according to the present embodiment also uses seven color inks, namely, cyan, magenta, yellow, black, red, light cyan, and light magenta, to form an image. Accordingly, the ink tank H1900 is provided with independent tanks for the seven colors.

Figure 51:
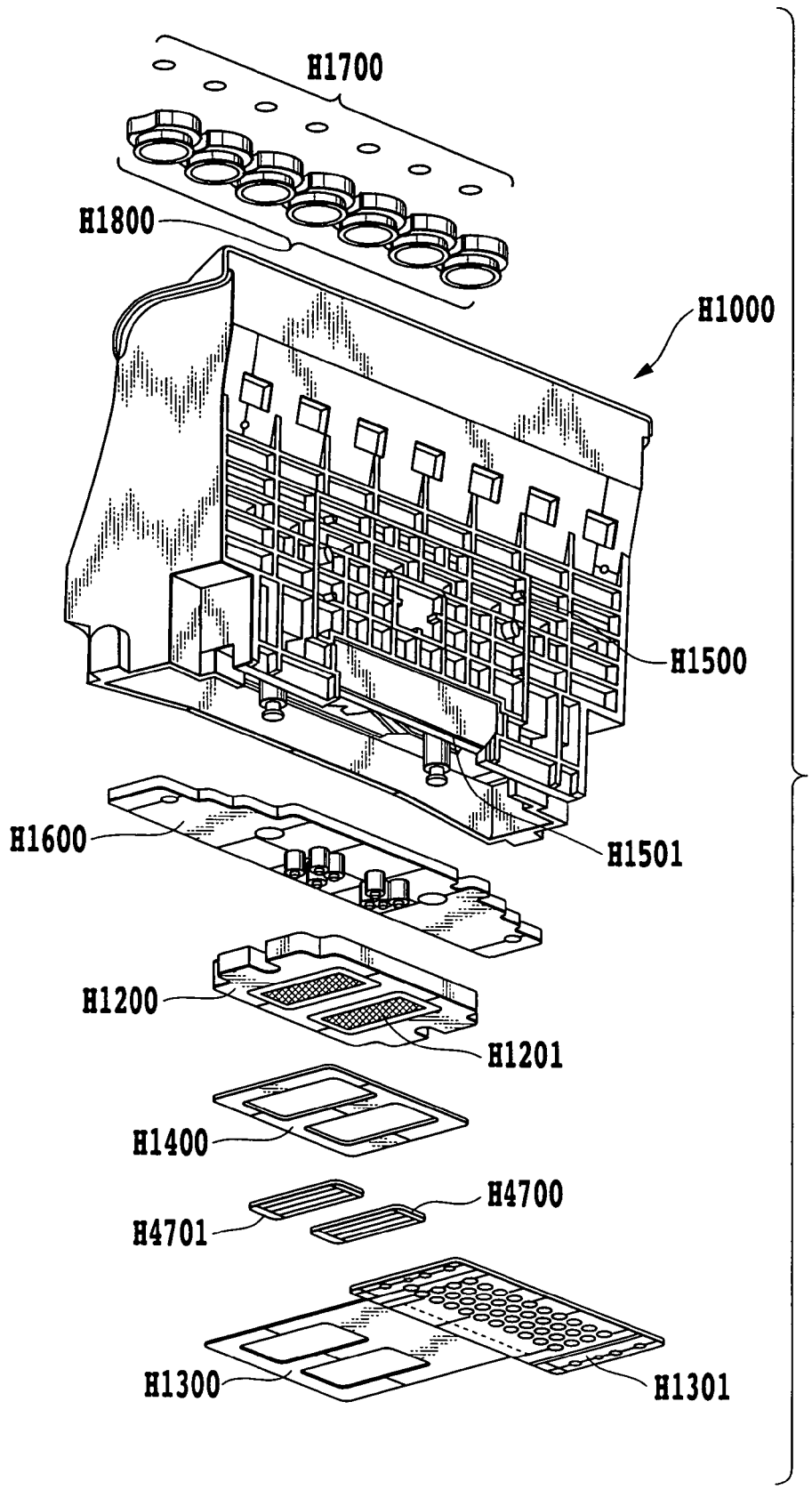
FIG. 51 is an exploded perspective view of a head cartridge applied according to a third embodiment of the present invention.

FIG. 51 is an exploded perspective view of the head cartridge H1000 according to the present embodiment. In the present embodiment, the configuration of the head cartridge H1000 is almost similar to that shown in the figure described in the above embodiments. Accordingly, the detailed description of the configuration of and assembly method for the head cartridge is omitted. However, in the present embodiment, for example, a first print element circuit board H4700 and a second print element circuit board H4701 in which the nozzle rows are formed are different from those of the first embodiment.

Figure 52:
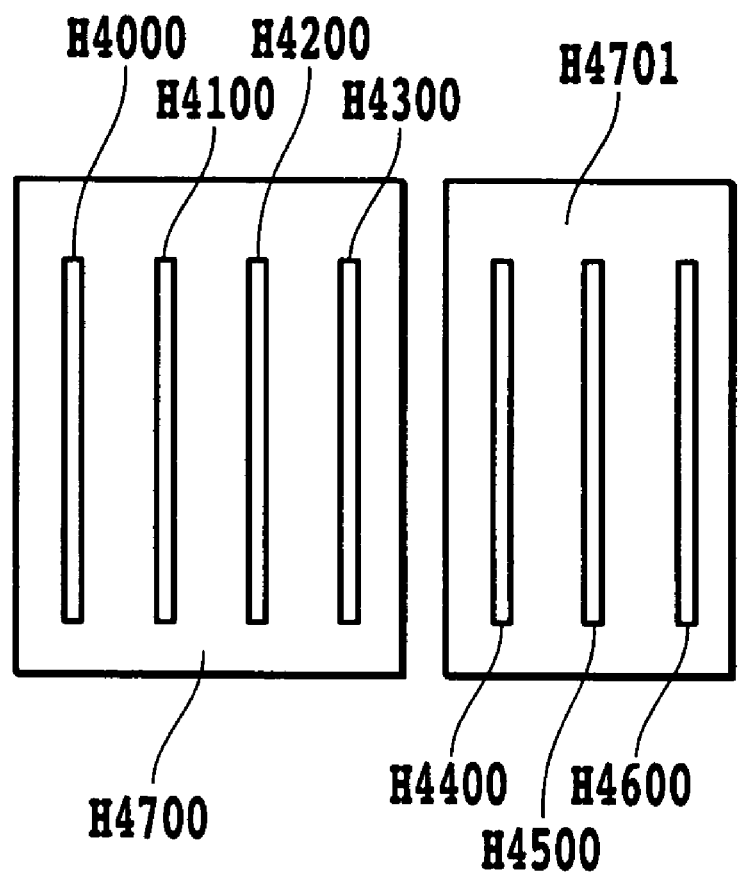
FIG. 52 is a front view of a print element circuit board in the head cartridge applied according to the third embodiment of the present invention.

FIG. 52 is an enlarged front view illustrating the configurations of the first print element circuit board H4700 and second print element circuit board H4701 according to the present embodiment. H4000 to H4600 denote nozzle rows corresponding to different color inks. The first print element circuit board H4700 is provided with the nozzle row H4000 to which the light magenta ink is supplied, the nozzle row H4100 to which the red ink is supplied, the nozzle row H4200 to which the black ink is supplied, and the nozzle row H4300 to which the light cyan ink is supplied.

The following nozzle rows for three colors are formed in the second print element circuit board H4701: nozzle row H4400, to which cyan ink is supplied, nozzle row H4500, to which magenta ink is supplied, and nozzle row H4600, to which yellow ink is supplied.

(Sequence for Printing Apparatus)

Description will be given below of a series of operations performed by the printing apparatus according to the present embodiment. The sequence of operations performed by the printing apparatus according to the present embodiment when it is powered on is similar to that described with reference to the flow chart in FIG. 53.

Figure 56:
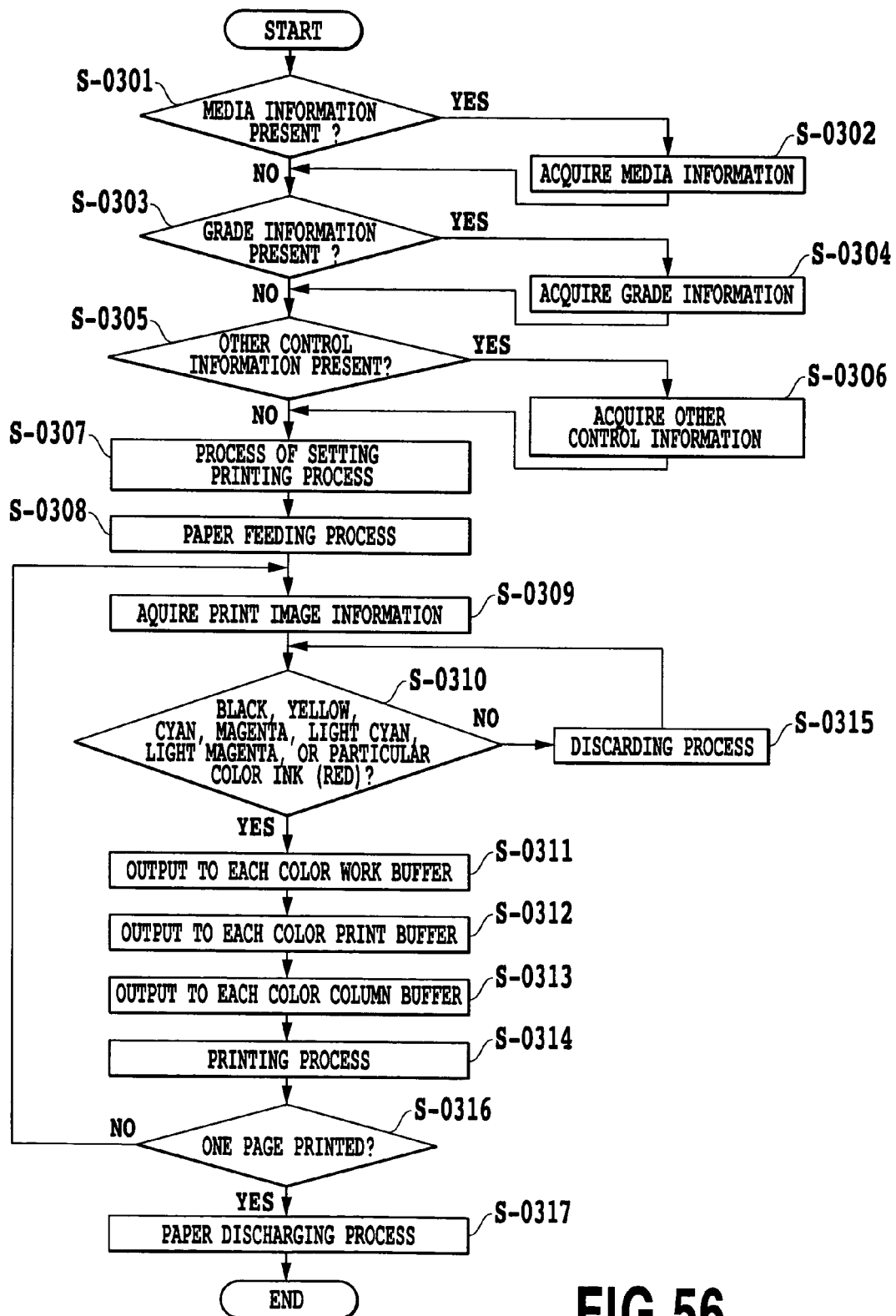
FIG. 56 is a flow chart illustrating processing executed on print data by the printing apparatus applied according to the third embodiment of the present invention.

FIG. 56 is a flow chart illustrating processing executed on print data according to the present embodiment. Steps S0301 to S0309 are similar to steps S0101 to 0109, described in FIG. 54 for the first embodiment. Accordingly, their description is omitted and the steps following S0310 will be described. In step S0310, it is determined whether or not the image acquired in step S0309 contains print image information on black, yellow, light cyan, light magenta, and red. If the result of the determination is "true", the process shifts to step S0311. If the result of the determination is "false", the process shifts to step S0315. Then, the image data acquired is discarded and the process returns to step S0310. Here, it is assumed that there is print image data on all the seven colors C, M, Y, K, R, LC, and LM.

Figure 59:
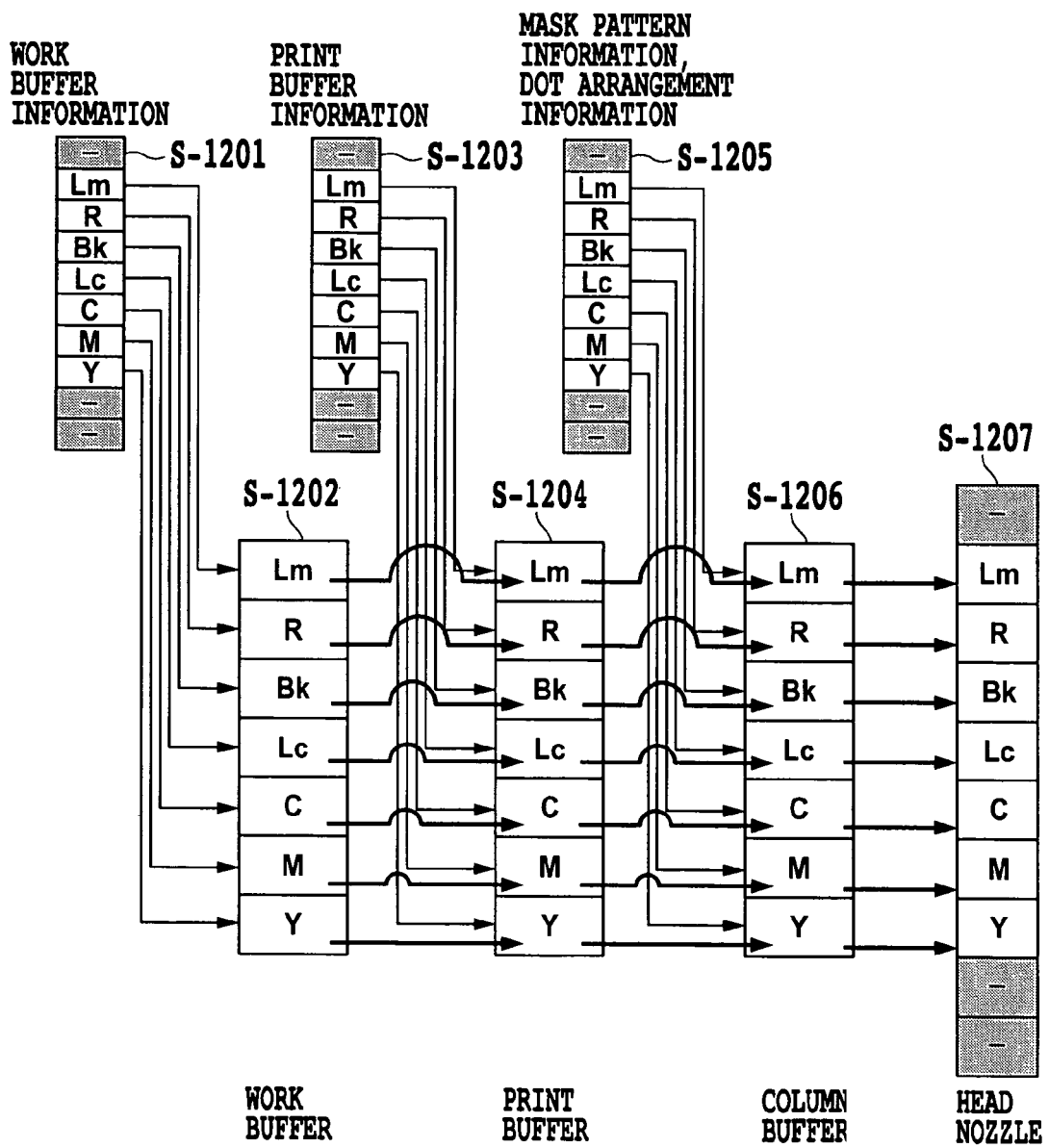
FIG. 59 is an image drawing illustrating the configuration of buffers in the printing apparatus applied according to the third embodiment of the present invention wherein the buffers correspond to the respective colors.

FIG. 59 shows the configurations of the buffers in the printing apparatus according to the present embodiment, wherein the buffers correspond to the respective colors. S1201 denotes work buffer information and S1203 denotes print buffer information. S1205 denotes mask pattern information and dot arrangement pattern information.

In step S0311, the print image data (4-bit data on each of the colors C, M, Y, K, R, LC, and LM) acquired in step 0309 is processed in accordance with the work buffer information S1001 stored in step S0307, as shown in FIG. 57. The processed print image data is outputted to the work buffers S1202 for the respective colors provided in the work buffer E2011.

In step 0312, the print image data outputted to the work buffers S1202 for the respective colors as a result of the processing in step S0311 is processed in accordance with the print buffer information S1203 stored in step S0307, as shown in FIG. 59. The processed print image data is outputted to the print buffers S1204 for the respective colors provided in the print buffer E2014.

In step 0313, the print image data outputted to the print buffers S1204 for the respective colors as a result of the processing in step S0312 is processed in accordance with the mask pattern information and dot arrangement pattern information S1205 stored in step S0307, as shown in FIG. 59. The processed print image data (1-bit data for each of the colors C, M, Y, K, R, LC, and LM) is outputted to the column buffers S1206 for the respective colors provided in the column buffer E2017.

The print image data outputted to the column buffer S1206 for the respective colors is outputted to the control sections S1207 for the nozzle rows in the print head. In step S0314, one row of print data is printed.

In step S0136, it is determined whether or not one page of data to be printed has completely been printed. If one page of data to be printed has not completely been printed, the process returns to step S0309 to repeat the process of steps S0309 to S0314 until one page of print image information is completely printed.

If it is determined in step S0316 that all the data has been printed, the process proceeds to step S0317 to execute a paper discharging process.

The printing of one page is thus completed.

Other Embodiments

As described above, the present invention is applicable to a system composed of plural pieces of equipment (for example, a host computer, an interface apparatus, a reader, and a printer) or to an apparatus composed of one piece of equipment (for example, a copier or a facsimile machine).

Further, it is possible to supply software program codes required to realize the functions of the previously described embodiments, to a computer in an apparatus or a system which is connected to various devices in order to operate them so as to realize the functions and operating the various devices in accordance with a program stored in the computer (CPU or MPU) of the system or apparatus.

In this case, the software program codes themselves executing the processes shown in FIG. 1 realize the functions of the previously described embodiments. The program codes themselves, and means for supplying the program codes to the computer, for example, a storage medium storing the program codes, constitute the present invention.

The storage medium storing the program codes may be, for example, a floppy (registered trade mark) disk, a hard disk, an optical disk, a magneto-optic disk, a CD-ROM, a magnetic tape, a nonvolatile memory card, or a ROM.

Further, not only if the functions of the previously described embodiments are realized by allowing the computer to execute the supplied program codes but also if the functions of the previously described embodiments are realized by the program codes in cooperation with an OS (Operating System) running on the computer, another application software, or the like, the program codes are of course included in the embodiments of the present invention.

The present invention also includes the case in which the supplied program codes are stored in an expanded board in the computer or an expanded unit connected to the computer and in which a CPU or the like provided in the expanded board or unit then executes a part or all of the actual process on the basis of instructions in the program codes so as to realize the functions of the previously described embodiments.

Furthermore, the image processing apparatus executing the processes shown in FIG. 1 is not limited to a PC such as the previously described one. For example, if any printer executes these processes, it operates as an image processing apparatus. Accordingly, in the application of the present invention, an apparatus that executes these processes or a system composed of plural such apparatuses is considered to be an image processing apparatus.

The present invention has been described in detail with respect to the preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2003-291871, filed Aug. 11, 2003, which is hereby incorporated by reference herein.

What is claimed is:

1. A color separation data generation method for generating color separation data for a printing apparatus that prints input colors on a print medium by using printing materials respectively corresponding to yellow, magenta and cyan, which are basic colors, and a printing material of a particular color,
    wherein the color separation data includes color component data respectively corresponding to yellow, magenta, cyan and the particular color, wherein the particular color indicates a hue angle in the color reproduction area,
    wherein a hue of the particular color is reproducible by mixing both first and second printing materials among the printing materials of the basic colors,
    wherein a first color has a maximum saturation at the hue of the particular color and is reproducible with the printing material of the particular color, and a second color has a maximum saturation at the hue of the particular color and is reproducible by mixing both the first and second printing materials, and
    wherein a lightness or saturation of the first color is higher than a lightness or saturation of the second color,
    the method comprising:
    obtaining the input colors, and
    using at least one processor to generate the color separation data corresponding to the input colors,
    wherein the generated color separation data for all hues between the hues of the first and second printing materials, including the hue of the particular color, include the color component data corresponding to the first printing material, the color component data corresponding to the second printing material and the color component data corresponding to the printing material of the particular color, the respective color component data having values greater than zero, and wherein the hue of the particular color is selected from one of hues between hues of yellow and magenta, hues between hues of magenta and cyan, and hues between hues of cyan and yellow.

2. A method as claimed in claim 1, further comprising the step of generating the color separation data on a line connecting the color, which has the maximum saturation at the hue of the particular color and being reproducible with the printing material of the particular color, and black, the color separation data including the color component data corresponding to a printing material other than the first, second and particular color printing materials, the respective color component having values greater than zero.

3. A method as claimed in claim 1, wherein the printing material of the particular color printing material is red ink.

4. A method as claimed in claim 1, wherein the printing material of the particular color printing material is blue ink.

5. A method as claimed in claim 1, wherein the printing material of the particular color printing material is green ink.

6. A method as claimed in claim 1, wherein the printing material of the particular color printing material is red ink and the first and second printing materials are magenta ink and yellow ink respectively.

7. A method as claimed in claim 1, wherein the method generates the color separation data using a table having the color separation data as a lattice point data.

8. A method as claimed in claim 1, wherein the printing apparatus further uses a third printing material corresponding to black,
further comprising the step of generating the color separation data including respective color component data corresponding to the printing materials, the respective color component data corresponding to a point of white, and each of the respective color component data having a value of zero, and generating the color separation data including component data corresponding to the third printing material, the color component data corresponding to a point of black, and the color component data having a value greater than zero.

9. A method as claimed in claim 1, wherein the method generates the color separation data for colors from the color having the maximum saturation at the hue of the particular color and being reproducible with the printing material of the particular color to black, the color separation data including the color component data corresponding to the printing material other than the first and second printing materials, the color component data having values greater than zero.

10. A method as claimed in claim 1, wherein the method generates the color separation data for colors from white to the color having the maximum saturation at the hue of the particular color and being reproducible with the printing material of the particular color, the color separation data including the color component data corresponding to the first printing material, the color component data corresponding to the second printing material and the color component data corresponding to the printing material of the particular color, the respective color component data having values greater than zero, and generates the color separation data for colors from the color having the maximum saturation at the hue of the particular color and being reproducible with the printing material of the particular color to black, the color separation data including the color component data corresponding to the first printing material, the color component data corresponding to the second printing material, the color component data corresponding to the particular color, the color component data corresponding to the printing material of the basic color other than the first and second printing materials, and the color component data corresponding to the black, the respective color component data having values greater than zero.

11. A method as claimed in claim 1, wherein the color component data corresponding to the particular color has a greater value than that of each of the color component data corresponding to the first and second printing material.

12. An image processing method as claimed in claim 1, wherein the generated color separation data for the hue of the first printing material includes the color component data corresponding to the second printing material, and the color component data having a value of zero.

13. An image processing method as claimed in claim 1, wherein the generated color separation data for the hue of the second printing material includes the color component data corresponding to the first printing material, and the color component data having a value of zero.

14. An image processing method as claimed in claim 12 or 13, wherein the generated color separation data for the both hues of the first and second printing material include the color component data corresponding to the printing material of the particular color, and the color component data having a value of zero.

15. An image processing apparatus that generates color separation data for a printing apparatus that prints input colors on a print medium by using printing materials respectively corresponding to yellow, magenta and cyan, which are basic colors, and a printing material of a particular color,
wherein the color separation data includes color component data respectively corresponding to yellow, magenta, cyan and the particular color, wherein the particular color indicates a hue angle in the color reproduction area,
wherein a hue of the particular color is reproducible by mixing both first and second printing materials among the printing materials of the basic colors,
wherein a first color has a maximum saturation at the hue of the particular color and is reproducible with the printing material of the particular color, and a second color has a maximum saturation at the hue of the particular color and is reproducible by mixing both the first and second printing materials, and
wherein a lightness or saturation of the first color is higher than a lightness or saturation of the second color,
the image processing apparatus comprising:
means for obtaining the input colors, and
means for generating the color separation data corresponding to the input colors,
wherein the generated color separation data for all hues between the hues of the first and second printing materials, including the hue of the particular color, include the color component data corresponding to the first printing material, the color component data corresponding to the second printing material and the color component data corresponding to the printing material of the particular color, the respective color component data having values greater than zero, and wherein the hue of the particular color is selected from one of hues between hues of yellow and magenta, hues between hues of magenta and cyan, and hues between hues of cyan and yellow.

16. An image processing apparatus as claimed in claim 15, further comprising means for generating the color separation data on a line connecting the color, which has the maximum saturation at the hue of the particular color and being reproducible with the printing material of the particular color, and black, the color separation data including the color component data corresponding to a printing material other than the first, second and particular color printing materials, the respective color component data having values greater than zero.

17. An image processing apparatus as claimed in claim 15, wherein the printing material of the particular color printing material is red ink.

18. An image processing apparatus as claimed in claim 15, wherein the printing material of the particular color printing material is blue ink.

19. An image processing apparatus as claimed in claim 15, wherein the printing material of the particular color printing material is green ink.

20. An image processing apparatus as claimed in claim 15, wherein the printing material of the particular color printing material is red ink and the first and second printing materials are magenta ink and yellow ink respectively.

21. An image processing apparatus as claimed in claim 15, wherein the apparatus generates the color separation data using a table having the color separation data as a lattice point data.

22. An image processing apparatus as claimed in claim 15, wherein the printing apparatus further uses a third printing material corresponding to black,
further comprising means for generating the color separation data including respective color component data corresponding to the printing materials, the respective color component data corresponding to a point of white, and each of the respective color component data having a value of zero, and generating the color separation data including component data corresponding to the third printing material, the color component data corresponding to a point of black, and the color component data having a value greater than zero.

23. An image processing apparatus as claimed in claim 15, wherein the apparatus generates the color separation data for colors from the color having the maximum saturation at the hue of the particular color and being reproducible with the printing material of the particular color to black, the color separation data including the color component data corresponding to the printing material other than the first and second printing materials, the color component data having values greater than zero.

24. An image processing apparatus as claimed in claim 15, wherein the apparatus generates the color separation data for colors from white to the color having the maximum saturation at the hue of the particular color and being reproducible with the printing material of the particular color, the color separation data including the color component data corresponding to the first printing material, the color component data corresponding to the second printing materials and the color component data corresponding to the printing material of the particular color, the respective color component data having values greater than zero, and generates the color separation data for colors from the color having the maximum saturation at the hue of the particular color and being reproducible with the printing material of the particular color to black, the color separation data including the color component data corresponding to the first printing material, the color component data corresponding to the second printing material, the color component data corresponding to the particular color, the color component data corresponding to the printing material of the basic color other than the first and second printing materials, and the color component data corresponding to the black, the respective color component data having values greater than zero.

25. An image processing apparatus as claimed in claim 15, wherein the color component data corresponding to the particular color has a greater value than that of each of the color component data corresponding to the first and second printing material.

26. An image processing apparatus as claimed in claim 15, wherein the generated color separation data for the hue of the first printing material includes the color component data corresponding to the second printing material, and the color component data having a value of zero.

27. An image processing apparatus as claimed in claim 15, wherein the generated color separation data for the hue of the second printing material includes the color component data corresponding to the first printing material, and the color component data having a value of zero.

28. An image processing apparatus as claimed in claim 26 or 27, wherein the generated color separation data for the both hues of the first and second printing material include the color component data corresponding to the printing material of the particular color, and the color component data having a value of zero.

29. A non-transitory computer-readable storage medium encoded with a program which a computer reads out that is used in a information processing apparatus, for executing color separation data generation process that generates color separation data for a printing apparatus that prints input colors on a print medium by using printing materials respectively corresponding to yellow, magenta and cyan, which are basic colors, and a printing material of a particular color, wherein the color separation data includes color component data respectively corresponding to yellow, magenta, cyan and the particular color, wherein the particular color indicates a hue angle in the color reproduction area, wherein a hue of the particular color is reproducible by mixing both first and second printing materials among the printing materials of the basic colors, wherein a first color has a maximum saturation at the hue of the particular color and is reproducible with the printing material of the particular color, and a second color has a maximum saturation at the hue of the particular color and is reproducible by mixing both the first and second printing materials, and wherein a lightness or saturation of the first color is higher than a lightness or saturation of the second color, the process comprising:

obtaining the input colors, and generating the color separation data corresponding to the input colors, wherein the generated the color separation data for all hues between the hues of the first and second printing materials, including the hue of the particular color, include the color component data corresponding to the first printing material, the color component data corresponding to the second printing material and the color component data corresponding to the printing material of the particular color, the respective color component data having values greater than zero, and wherein the hue of the particular color is selected from one of hues between hues of yellow and magenta, hues between hues of magenta and cyan, and hues between hues of cyan and yellow.

* * * * *